(12) United States Patent
Thaik et al.

(10) Patent No.: US 7,966,479 B1
(45) Date of Patent: Jun. 21, 2011

(54) CONCURRENT VS. LOW POWER BRANCH PREDICTION

(75) Inventors: Richard Win Thaik, San Jose, CA (US); John Gregory Favor, Scotts Valley, CA (US); Joseph Byron Rowlands, Santa Clara, CA (US); Leonard Eric Shar, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 288 days.

(21) Appl. No.: 11/880,859

(22) Filed: Jul. 23, 2007

Related U.S. Application Data

(63) Continuation-in-part of application No. 11/535,971, filed on Sep. 27, 2006, now Pat. No. 7,546,420, and a continuation-in-part of application No. 11/535,972, filed on Sep. 27, 2006, now Pat. No. 7,676,634, and a continuation-in-part of application No. 11/535,977, filed on Sep. 27, 2006, now Pat. No. 7,606,975, and a continuation-in-part of application No. 11/553,453, filed on Oct. 26, 2006, now Pat. No. 7,587,585, and a continuation-in-part of application No. 11/553,455, filed on Oct. 26, 2006, now Pat. No. 7,568,088, and a continuation-in-part of application No. 11/553,458, filed on Oct. 26, 2006, now Pat. No. 7,568,089, and a continuation-in-part of application No. 11/591,024, filed on Oct. 31, 2006.

(60) Provisional application No. 60/721,385, filed on Sep. 28, 2005, provisional application No. 60/730,550, filed on Oct. 26, 2005, provisional application No. 60/730,810, filed on Oct. 27, 2005, provisional application No. 60/731,962, filed on Oct. 31, 2005, provisional application No. 60/731,785, filed on Oct. 31, 2005, provisional application No. 60/732,438, filed on Nov. 1, 2005, provisional application No. 60/832,848, filed on Jul. 23, 2006, provisional application No. 60/832,822, filed on Jul. 23, 2006, provisional application No. 60/862,609, filed on Oct. 24, 2006, provisional application No. 60/866,205, filed on Nov. 16, 2006, provisional application No. 60/866,203, filed on Nov. 16, 2006.

(51) Int. Cl.
*G06F 9/30* (2006.01)
(52) U.S. Cl. ...................... 712/239; 712/234
(58) Field of Classification Search .................. 712/234, 712/239
See application file for complete search history.

(56) References Cited

U.S. PATENT DOCUMENTS 4,912,707 A   3/1990   Kogge et al.

(Continued)

OTHER PUBLICATIONS

Patel, S., Lumetta, S., "rePlay: A Hardware Framework for Dynamic Optimization", IEEE Transactions on Computers, vol. 50, No. 6, Jun. 2001 (19 pages).

(Continued)

*Primary Examiner* — Aimee J Li
(74) *Attorney, Agent, or Firm* — Osha • Liang LLP

(57) ABSTRACT

An instruction processing circuit includes a decoder circuit, a basic block builder circuit, a multi-block builder circuit, first and second predictor circuits, and a sequencer circuit, where the sequencer circuit is operable, in a first environment, to cause the first predictor circuit to generate a prediction for a particular conditional branch op concurrently with the second predictor circuit generating a prediction for another particular conditional branch op, where the sequencer circuit is also operable, in a second environment, to cause the first predictor circuit to generate a prediction for the particular conditional branch op sequentially with the second predictor circuit generating a prediction for the another particular conditional branch operation.

4 Claims, 23 Drawing Sheets

U.S. PATENT DOCUMENTS

| | | | |
|---|---|---|---|
| 5,369,757 A | 11/1994 | Spiro et al. | |
| 5,381,533 A | 1/1995 | Peleg et al. | |
| 5,428,786 A | 6/1995 | Sites | |
| 5,432,918 A | 7/1995 | Stamm | |
| 5,491,793 A | 2/1996 | Somasundaram et al. | |
| 5,568,380 A | 10/1996 | Brodnax et al. | |
| 5,632,023 A | 5/1997 | White et al. | |
| 5,644,742 A | 7/1997 | Shen et al. | |
| 5,649,136 A | 7/1997 | Shen et al. | |
| 5,673,408 A | 9/1997 | Shebanow et al. | |
| 5,793,947 A | 8/1998 | Sakamoto | |
| 5,838,943 A | 11/1998 | Ramagopal et al. | |
| 5,860,104 A | 1/1999 | Witt et al. | |
| 5,913,925 A | 6/1999 | Kahle et al. | |
| 5,944,841 A | 8/1999 | Christie | |
| 5,960,198 A | 9/1999 | Roediger et al. | |
| 6,014,742 A | 1/2000 | Krick et al. | |
| 6,018,786 A | 1/2000 | Krick et al. | |
| 6,031,992 A | 2/2000 | Cmelik et al. | |
| 6,052,769 A | 4/2000 | Huff et al. | |
| 6,055,630 A * | 4/2000 | D'Sa et al. | 712/240 |
| 6,073,213 A * | 6/2000 | Peled et al. | 711/125 |
| 6,076,144 A * | 6/2000 | Peled et al. | 711/125 |
| 6,115,809 A * | 9/2000 | Mattson et al. | 712/239 |
| 6,170,038 B1 * | 1/2001 | Krick et al. | 711/125 |
| 6,170,040 B1 | 1/2001 | Lee et al. | |
| 6,185,660 B1 | 2/2001 | Mulla et al. | |
| 6,185,675 B1 | 2/2001 | Kranich et al. | |
| 6,189,141 B1 | 2/2001 | Benitez et al. | |
| 6,205,545 B1 | 3/2001 | Shah et al. | |
| 6,216,206 B1 * | 4/2001 | Peled et al. | 711/133 |
| 6,339,822 B1 | 1/2002 | Miller | |
| 6,351,844 B1 | 2/2002 | Bala | |
| 6,389,446 B1 | 5/2002 | Torii | |
| 6,442,674 B1 | 8/2002 | Lee et al. | |
| 6,449,714 B1 | 9/2002 | Sinharoy | |
| 6,493,837 B1 | 12/2002 | Pang et al. | |
| 6,538,997 B1 | 3/2003 | Wang et al. | |
| 6,557,095 B1 | 4/2003 | Henstrom | |
| 6,604,060 B1 | 8/2003 | Ryan et al. | |
| 6,609,189 B1 | 8/2003 | Kuszmaul et al. | |
| 6,671,766 B1 | 12/2003 | Vandenbergh et al. | |
| 6,675,376 B2 | 1/2004 | Ronen et al. | |
| 6,694,427 B1 | 2/2004 | Mericas et al. | |
| 6,694,457 B2 | 2/2004 | McKee | |
| 6,738,926 B2 | 5/2004 | Mathiske et al. | |
| 6,779,087 B2 | 8/2004 | Saulsbury et al. | |
| 6,785,890 B2 | 8/2004 | Kalafatis et al. | |
| 6,799,263 B1 * | 9/2004 | Morris et al. | 712/207 |
| 6,826,182 B1 | 11/2004 | Parthasarathy | |
| 6,857,060 B2 | 2/2005 | Elias et al. | |
| 6,874,138 B1 | 3/2005 | Ziegler et al. | |
| 6,889,318 B1 | 5/2005 | Wichman | |
| 6,895,460 B2 | 5/2005 | Desoli et al. | |
| 6,950,924 B2 | 9/2005 | Miller et al. | |
| 6,968,476 B2 | 11/2005 | Barowski et al. | |
| 6,981,104 B2 | 12/2005 | Prabhu | |
| 6,988,190 B1 * | 1/2006 | Park | 712/241 |
| 7,003,629 B1 | 2/2006 | Alsup | |
| 7,010,648 B2 | 3/2006 | Kadambi et al. | |
| 7,062,631 B1 | 6/2006 | Klaiber et al. | |
| 7,085,955 B2 | 8/2006 | Prabhu | |
| 7,133,969 B2 | 11/2006 | Alsup et al. | |
| 7,136,922 B2 | 11/2006 | Maiyuran et al. | |
| 7,136,992 B2 | 11/2006 | Maiyuran et al. | |
| 7,139,902 B2 | 11/2006 | Lee | |
| 7,188,368 B2 | 3/2007 | Swimmer et al. | |
| 7,213,126 B1 | 5/2007 | Smaus et a | |
| 7,269,706 B2 | 9/2007 | Agarwal et al. | |
| 7,360,024 B2 * | 4/2008 | Hironaka et al. | 711/131 |
| 7,366,875 B2 | 4/2008 | Rasche et al. | |
| 7,415,598 B2 | 8/2008 | Dos Remedios | |
| 7,487,341 B2 | 2/2009 | Wang et al. | |
| 7,496,735 B2 | 2/2009 | Yourst et al. | |
| 7,516,366 B2 | 4/2009 | Lev et al. | |
| 7,536,591 B2 | 5/2009 | Varadarajan et al. | |
| 7,546,420 B1 | 6/2009 | Shar et al. | |
| 7,568,089 B1 | 7/2009 | Favor et al. | |
| 7,571,304 B2 | 8/2009 | Chaudhry et al. | |
| 7,577,690 B2 | 8/2009 | Chandrasekaran et al. | |
| 7,594,111 B2 | 9/2009 | Kiriansky et al. | |
| 7,600,221 B1 | 10/2009 | Rangachari | |
| 7,606,975 B1 | 10/2009 | Shar et al. | |
| 2001/0032307 A1 | 10/2001 | Rohlman et al. | |
| 2002/0013938 A1 | 1/2002 | Duesterwald et al. | |
| 2002/0095553 A1 | 7/2002 | Mendelson et al. | |
| 2002/0144101 A1 | 10/2002 | Wang et al. | |
| 2002/0147890 A1 | 10/2002 | Saulsbury et al. | |
| 2003/0005271 A1 | 1/2003 | Hsu et al. | |
| 2003/0009620 A1 | 1/2003 | Solomon et al. | |
| 2003/0084375 A1 | 5/2003 | Moore et al. | |
| 2004/0015627 A1 | 1/2004 | Desoli et al. | |
| 2004/0034757 A1 | 2/2004 | Gochman et al. | |
| 2004/0083352 A1 | 4/2004 | Lee | |
| 2004/0107336 A1 | 6/2004 | Douglas et al. | |
| 2004/0154011 A1 | 8/2004 | Wang et al. | |
| 2004/0193857 A1 * | 9/2004 | Miller et al. | 712/240 |
| 2004/0230778 A1 | 11/2004 | Chou et al. | |
| 2005/0012079 A1 | 1/2005 | Roberts et al. | |
| 2005/0097110 A1 | 5/2005 | Nishanov et al. | |
| 2005/0108719 A1 | 5/2005 | Need et al. | |
| 2005/0120179 A1 | 6/2005 | Akkary et al. | |
| 2005/0125632 A1 | 6/2005 | Alsup et al. | |
| 2005/0289324 A1 | 12/2005 | Miller et al. | |
| 2005/0289529 A1 | 12/2005 | Almog et al. | |
| 2006/0053245 A1 | 3/2006 | Solomon et al. | |
| 2006/0053347 A1 | 3/2006 | van Ingen et al. | |
| 2006/0080190 A1 | 4/2006 | Furukawa et al. | |
| 2006/0179346 A1 | 8/2006 | Bishop et al. | |
| 2006/0184771 A1 | 8/2006 | Floyd et al. | |
| 2007/0038844 A1 | 2/2007 | Valentine et al. | |
| 2007/0157007 A1 | 7/2007 | Jourdan et al. | |
| 2008/0034350 A1 | 2/2008 | Conti | |
| 2009/0222596 A1 | 9/2009 | Flynn et al. | |
| 2010/0031000 A1 | 2/2010 | Flynn et al. | |

OTHER PUBLICATIONS

Tanenbaum, A.S., "Structured Computer Organization", Prentice-Hall, 2nd Edition, 1984, p. 11 (1 page).

Almog, Y. et al., Specialized Dynamic Optimizations for High-Performance Energy-Efficient Microarchitecture, Proceedings of the International Symposium on Code Generation and Optimization, 2004 (12 pages).

Chaparro, P. et al., Distributing the Fronted for Temperature Reduction, Proceedings of the 11th Symposium on High-Performace Computer Architecture, Feb. 12-16, 2005 (10 pages).

Colwell, R. P. et al., A VLIW Architecture for a Trace Scheduling Compiler, 1987, pp. 180-192 (13 pages).

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimizations for Trace Cache Microprocessors, Proceedings of the 31st Annual ACM/IEEE International Symposium on Microarchitecture, Nov. 30—Dec. 2, 1998, pp. 173-181 (9 pages).

Grunwald, D. and Ghiasi, S., Microarchitectural Denial of Service : Insuring Microarchitectural Fairness, Proceedings of the 35th Annual IEEE/ACM International Symposium on Microarchitecture, Nov. 18-22, 2002 (10 pages).

Hinton, G. et al., The Microarchitecture of the Pentium 4 Processor, Intel Technology Journal Q1, 2001 (12 pages).

IBM Technical Disclosure Bulletin, Grouping of Instructions, v. 38, n. 8, Aug. 1, 1995, pp. 531-534 (4 pages).

Katevenis, E. G., Reduced Instruction Set Computer Architectures for VLSI, Berkley, California 1983, pp. 67-68 and 190 (7 pages).

Rotenberg, E., Bennett, S., and Smith, J. E., Trace Cache: a Low Latency Approach to High Bandwidth Instruction Fetching, in Proceedings of the 29th Annual International Symposium on Microarchitecture, Dec. 2-4, 1996, Paris, France (11 pages).

Slechta, B. et al, Dynamic Optimization of Micro-Operations, Proceedings of the 9th International Symposium on High-Performance Computer Architecture, Feb. 8-12, 2003 (12 pages).

Smith, J. E. And Pleszkun, A. R., Implementation of Precise Interrupts in Pipelined Processors, Proc. Computer Architecture, 1985 (15 pages).

Tremblay, M., High-Performance Fault-Tolerant VLSI Systems Using Micro Rollback, Los Angeles, California, Sep. 1991, pp. 72-74, 81, 89-90, 102-104 and 246 (14 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

Patel S. J. et al., Improving Trace Cache Effectiveness with Branch Promotion and Trace Packing, IEEE, 1998, pp. 262-271.

Tanenbaum, A. S., Structured Computer Organization, Second Edition, Prentice Hall, Inc. 1984, pp. 10-12.

Eric Rotenberg, James E. Smith, Control Independence in Trace Processors, Proceedings of the 32nd Annual ACM/IEEE International Symposium on Microarchitecture, p. 4-15, Nov. 16-18, 1999, Haifa, Israel.

Eric Rotenberg, Quinn Jacobson, Yiannakis Sazeides, Jim Smith, Trace Processors, Proceedings of the 30th Annual ACM/IEEE International Symposium on Microarchitecture, p. 138-148, Dec. 1-3, 1997, Research Triangle Park, North Carolina, United States.

Quinn Jacobson, Eric Rotenberg, James E. Smith, Path-Based Next Trace Prediction, Proceedings of the 30th Annual ACM/IEEE International Symposium on Microarchitecture, p. 14-23, Dec. 1-3, 1997, Research Triangle Park, North Carolina, United States.

Notice of Allowance for U.S. Appl. No. 12/030,857, mailed on Apr. 23, 2010 (12 pages).

U.S. Notice of Allowance for U.S. Appl. No. 11/923,638, mailed on May 12, 2010 (28 pages).

U.S. Notice of Allowance for U.S. Appl. No. 12/030,857, mailed on Apr. 23, 2010 (16 pages).

US Office Action issued in U.S. Appl. No. 12/030,858, mailed Sep. 1, 2010, 13 pages.

US Office Action issued in U.S. Appl. No. 12/030,862, mailed Sep. 17, 2010, 18 pages.

US Office Action issued in U.S. Appl. No. 12/030,859, mailed Sep. 17, 2010, 18 pages.

US Office Action issued in U.S. Appl. No. 12/030,855, mailed Jul. 28, 2010, 28 pages.

US Office Action issued in U.S. Appl. No. 12/030,846, mailed Sep. 3, 2010, 16 pages.

US Office Action issued in U.S. Appl. No. 12/030,851, mailed Sep. 1, 2010, 15 pages.

Office Action in U.S. Appl. No. 11/535,971 mailed Oct. 8, 2008 (11 pages).

Notice of Allowance in U.S. Appl. No. 11/535,971 mailed Mar. 11, 2009 (4 pages).

Office Action in U.S. Appl. No. 11/535,972 mailed Mar. 4, 2009 (13 pages).

Office Action in U.S. Appl. No. 11/535,972 mailed Aug. 18, 2009 (8 pages).

Notice of Allowance in U.S. Appl. No. 11/535,972 mailed Oct. 9, 2009 (4 pages).

Notice of Allowance in U.S. Appl. No. 11/535,972 mailed Dec. 7, 2009 (4 pages).

Office Action in U.S. Appl. No. 11/535,977 mailed Mar. 10, 2009 (15 pages).

Notice of Allowance in U.S. Appl. No. 11/535,977 mailed Aug. 5, 2009 (4 pages).

Office Action in U.S. Appl. No. 11/553,453 mailed Sep. 25, 2008 (13 pages).

Office Action in U.S. Appl. No. 11/553,453 mailed Feb. 25, 2009 (4 pages).

Notice of Allowance in U.S. Appl. No. 11/553,453 mailed Apr. 22, 2009 (7 pages).

Office Action in U.S. Appl. No. 11/553,455 mailed Sep. 30, 2008 (13 pages).

Office Action in U.S. Appl. No. 11/553,455 mailed Feb. 25, 2009 (4 pages).

Notice of Allowance in U.S. Appl. No. 11/553,455 mailed May 12, 2009 (5 pages).

Notice of Allowance in U.S. Appl. No. 11/553,455 mailed Jun. 2, 2009 (3 pages).

Office Action in U.S. Appl. No. 11/553,458 mailed Sep. 25, 2008 (19 pages).

Office Action in U.S. Appl. No. 11/553,458 mailed Feb. 25, 2009 (4 pages).

Notice of Allowance in U.S. Appl. No. 11/553,458 mailed May 11, 2009 (5 pages).

Office Action in U.S. Appl. No. 11/591,024 Mailed Feb. 24, 2009 (8 pages).

Office Action in U.S. Appl. No. 11/591,024 mailed Jul. 10, 2009 (8 pages).

Advisory Action in U.S. Appl. No. 11/591,024 mailed Oct. 6, 2009 (1 page).

Notice of Allowance in U.S. Appl. No. 11/591,024 mailed Feb. 25, 2010 (12 pages).

Office Action in U.S. Appl. No. 11/781,937 mailed Mar. 15, 2010 (41 pages).

Office Action in U.S. Appl. No. 11/923,638 mailed Dec. 3, 2009 (18 pages).

Notice of Allowance in U.S. Appl. No. 11/923,640 mailed Mar. 3, 2010 (8 pages).

Notice of Allowance in U.S. Appl. No. 11/923,640 mailed Jul. 20, 2010 (4 pages).

Notice of Allowance in U.S. Appl. No. 11/923,640 mailed Oct. 18, 2010 (4 pages).

Notice of Allowance in U.S. Appl. No. 11/941,900 mailed Aug. 6, 2010 (16 pages).

Office Action in U.S. Appl. No. 11/941,908 mailed Sep. 1, 2010 (17 pages).

Office Action in U.S. Appl. No. 12/030,852 Issued Jun. 11, 2010 (13 pages).

Notice of Allowance in U.S. Appl. No. 12/030,852 mailed Sep. 28, 2010 (9 pages).

Office Action in U.S. Appl. No. 12/030,865 mailed Oct. 19, 2010 (11 pages).

Office Action in U.S. Appl. No. 11/880,864 issued Oct. 4, 2010 (12 pages).

Office Action in U.S. Appl. No. 11/880,882 mailed Nov. 26, 2010 (20 pages).

Notice of Allowance in U.S. Appl. No. 11/880,862 mailed Dec. 3, 2010 (6 pages).

Notice of Allowance in U.S. Appl. No. 11/880,861 mailed Dec. 2, 2010 (6 pages).

Notice of Allowance in U.S. Appl. No. 11/782,140 mailed Nov. 15, 2010 (4 pages).

Notice of Allowance in U.S. Appl. No. 11/880,863 mailed Dec. 10, 2010 (10 pages).

Office Action in U.S. Appl. No. 11/880,864 mailed Apr. 12, 2010 (3 pages).

Office Action in U.S. Appl. No. 11/880,864 mailed Jun. 21, 2010 (12 pages).

Advisory Action in U.S. Appl. No. 11/880,864 mailed Dec. 3, 2010 (3 pages).

Office Action in U.S. Appl. No. 11/880,875 mailed Dec. 10, 2009 (7 pages).

Office Action in U.S. Appl. No. 11/880,875 mailed Mar. 8, 2010 (6 pages).

Office Action in U.S. Appl. No. 11/880,875 mailed Sep. 3, 2010 (7 pages).

Office Action in U.S. Appl. No. 11/880,875 mailed Nov. 26, 2010 (3 pages).

Office Action in U.S. Appl. No. 12/030,855, mailed Nov. 24, 2010, (29 pages).

Office Action in U.S. Appl. No. 11/782,163 mailed Dec. 20, 2010 (8 pages).

Notice of Allowance in U.S. Appl. No. 12/030,852 mailed Dec. 1, 2010 (9 pages).

Notice of Allowance in U.S. Appl. No. 11/782,140 mailed on Feb. 1, 2011 (4 pages).

Office Action in U.S. Appl. No. 12/030,846 mailed Feb. 18, 2011 (8 pages).

Office Action in U.S. Appl. No. 12/030,851 mailed Feb. 18, 2011 (6 pages).

Office Action in U.S. Appl. No. 12/030,862 mailed Mar. 7, 2011 (6 pages).

* cited by examiner

CONCURRENT VS. LOW POWER BRANCH PREDICTION

CROSS REFERENCE TO RELATED APPLICATIONS

This application claims the benefit of priority document U.S. Provisional Application No. 60/721,385, filed on Sep. 28, 2005, entitled "Efficient Trace Cache Management During Self-Modifying Code Processing," by Leonard Shar et al., and further claims the benefit of priority document U.S. Provisional Application No. 60/730,550, filed on Oct. 26, 2005, entitled "Checkpointing Status Flags for Atomic Traces," by John Gregory Favor et al., and further claims the benefit of priority document U.S. Provisional Application No. 60/730,810, filed on Oct. 27, 2005, entitled "Allocation and Deallocation of Shadow Registers used by Atomic Traces," by John Gregory Favor et al., and further claims the benefit of priority document U.S. Provisional Application No. 60/731,962, filed on Oct. 31, 2005, entitled "Determining the Highest Priority Abort Trigger in an Atomic Trace," by John Gregory Favor et al., and further claims the benefit of priority document U.S. Provisional Application No. 60/731,785, filed on Oct. 31, 2005, entitled "Maintaining Memory Coherency within a Trace Cache," by Richard W. Thaik, and further claims the benefit of priority document U.S. Provisional Application No. 60/732,438, filed Nov. 1, 2005, entitled "Zero-Cycle Execution of Clear Operation and Automatic Register Free," by John Gregory Favor et al., and further claims the benefit of priority document U.S. Provisional Application No. 60/832,848, filed on Jul. 23, 2006, entitled "Microprocessor with Caches for Instructions, Basic Blocks, and Traces," by Don Alpert et al., and further claims the benefit of priority document U.S. Provisional Application No. 60/832,822, filed on Jul. 23, 2006, entitled "Microprocessor with Coherent Caches for Basic Blocks and Traces," by Don Alpert et al., and further claims the benefit of priority document U.S. Provisional Application No. 60/862,609, filed Oct. 24, 2006, entitled "Exception Handling for Atomic Traces," by Christopher P. Nelson, and further claims the benefit of priority document U.S. Provisional Application No. 60/866,205, filed Nov. 16, 2006, entitled "Processor with Optimized Operation Sequences for Basic Block and Multi-Block Trace Caches," by John Gregory Favor, and further claims the benefit of priority document U.S. Provisional Application No. 60/866,203, filed Nov. 16, 2006, entitled "Processor with Basic Block and Multi-Block Trace Caches," by Matt Ashcraft et al. John Gregory Favor is also known as John Favor or as Greg Favor. Each of the above named priority documents is hereby incorporated by reference.

This application is a continuation-in-part of U.S. patent application Ser. No. 11/535,971, filed Sep. 27, 2006, entitled "Efficient Trace Cache Management During Self-Modifying Code Processing," by Leonard Eric Shar et al., and is a continuation-in-part of U.S. patent application Ser. No. 11/535,972, filed Sep. 27, 2006, entitled "Selective Trace Cache Invalidation for Self-Modifying Code Via Memory Aging," by Leonard Eric Shar et al., is a continuation-in-part of U.S. patent application Ser. No. 11/535,977, filed Sep. 27, 2006, entitled "Trace Cache for Efficient Self-Modifying Code Processing," by Leonard Eric Shar, is a continuation-in-part of U.S. patent application Ser. No. 11/553,453, filed Oct. 26, 2006, entitled "Checkpointing Status Flags for Atomic Traces," by Greg Favor et al., and is a continuation-in-part of U.S. patent application Ser. No. 11/553,455, filed Oct. 26, 2006, entitled "Checkpointing Flags On-Demand for Atomic Traces," by John Gregory et al., and is a continuation-in-part of U.S. patent application Ser. No. 11/553,458, filed Oct. 26, 2006, entitled "Flag Restoration from Checkpoints for Aborts of Atomic Traces," by John Gregory Favor et al., and is a continuation-in-part of U.S. patent application Ser. No. 11/591,024, filed Oct. 31, 2006, entitled "Maintaining Memory Coherency within a Trace Cache," by John Gregory Favor. John Gregory Favor is also known as John Favor an Greg Favor. Each of the above named applications for which this application is a continuation in part is hereby incorporated by reference.

BACKGROUND OF THE INVENTION

Processors have evolved throughout recent decades by becoming smaller in size, more sophisticated in design and exhibiting faster performance. Such an evolution has resulted for various reasons, one of which is portability of systems incorporating processors. Portability introduces demands on processors such as smaller size, reduced power and efficient performance.

While processors have experienced tremendous advancements, the code or software program used to program them essentially uses the same code as that of its origin. The original PC-based code is referred to as the "x86" instruction code. Thus, the x86 instruction code remains the code largely used for programming even in the most advanced processors.

Applications of processors are, for example, in personal computers (PCs), workstations, networking equipment and portable devices. Examples of portable devices include laptops, which are portable PCs, and hand-held devices.

More advanced processors use a sequencer to sequence operations, which are translated from sequences of x86 instructions, to improve throughput and increase performance. However, current sequencing techniques leave room for improvement, as the performance improvement realized thereby does not meet the demands imposed on future processors.

Moreover, power consumption is of vital importance to systems using processors, particularly to portable systems, such as laptops or hand-held electronic devices. While power consumption has been reduced in recent processor designs, nevertheless, a need for further reduction in power consumption remains.

Due to the wide use of code based on the x86 instruction set, particularly by software programmers who have become well accustomed to this code and are not likely to readily adapt to another code, backward compatibility of code is key in the architecture of a new processor. That is, the user of a newly-designed processor must enjoy the ability to use the same code utilized in a previous processor design without experiencing any problems.

In light of the foregoing, there is a need for a processor having a trace unit (or front end) for efficiently and in an improved manner sequencing traces, to be executed by an execution unit (or back end), while improving power consumption and maintaining code backward compatibility.

SUMMARY OF THE INVENTION

To overcome the limitations in the prior art described above, and to overcome other limitations that will become apparent upon reading and understanding the present specification, the present invention discloses a method and corresponding structures for an improved trace unit.

Briefly, an embodiment of the present invention includes an instruction processing circuit includes a decoder circuit operable to receive at least one sequence of instructions and to decode the at received least one sequence of instructions into a first type of a sequence of operations, a basic block builder circuit operable to receive at least one sequence of operations of the first type and to generate therefrom a second type of sequence of operations, a basic block cache circuit operable to store the sequence of operations of the second type that represents a first portion of the received sequence of instructions, a multi-block cache circuit operable to store a third type of sequence of operations that represents a second portion of the received sequence of instructions, and a sequencer circuit operable to select a next sequence of operations from among the sequence of operations of the first type and the sequence of operations of the second type, and the sequence of operations of the third type, where the sequencer circuit includes multiple components, each corresponding to one of multiple types of conditional branches, where at least one of the components is operable to generate a prediction for the particular conditional branch op concurrently with another at least one of the components generating a prediction for the particular conditional branch op, where at least one of the components is also operable to generate a prediction for the particular conditional branch op sequentially with another at least one of the components generating a prediction for the particular conditional branch operation.

These and other objects and advantages of the present invention will no doubt become apparent to those skilled in the art after having read the following detailed description of the preferred embodiments illustrated in the several figures of the drawing.

IN THE DRAWINGS

FIG. 3(*a*) shows further details of the interaction between the sequencer circuit 29, the branch predictor circuit 30 and one of the cache circuits, in accordance with an embodiment of the present invention.

FIG. 3(*b*) shows an example of a basic block trace 'ABC', where ABC represents operations, in the basic block cache circuit 22.

FIG. 10(*a*) shows, in flow chart form, the steps 100 performed, by the sequencer circuit 29, when sequencing operations for a current trace.

FIG. 10(*b*) shows a flow chart of the steps 140 performed by the sequencer circuit 29 in promoting traces.

Figure 10:
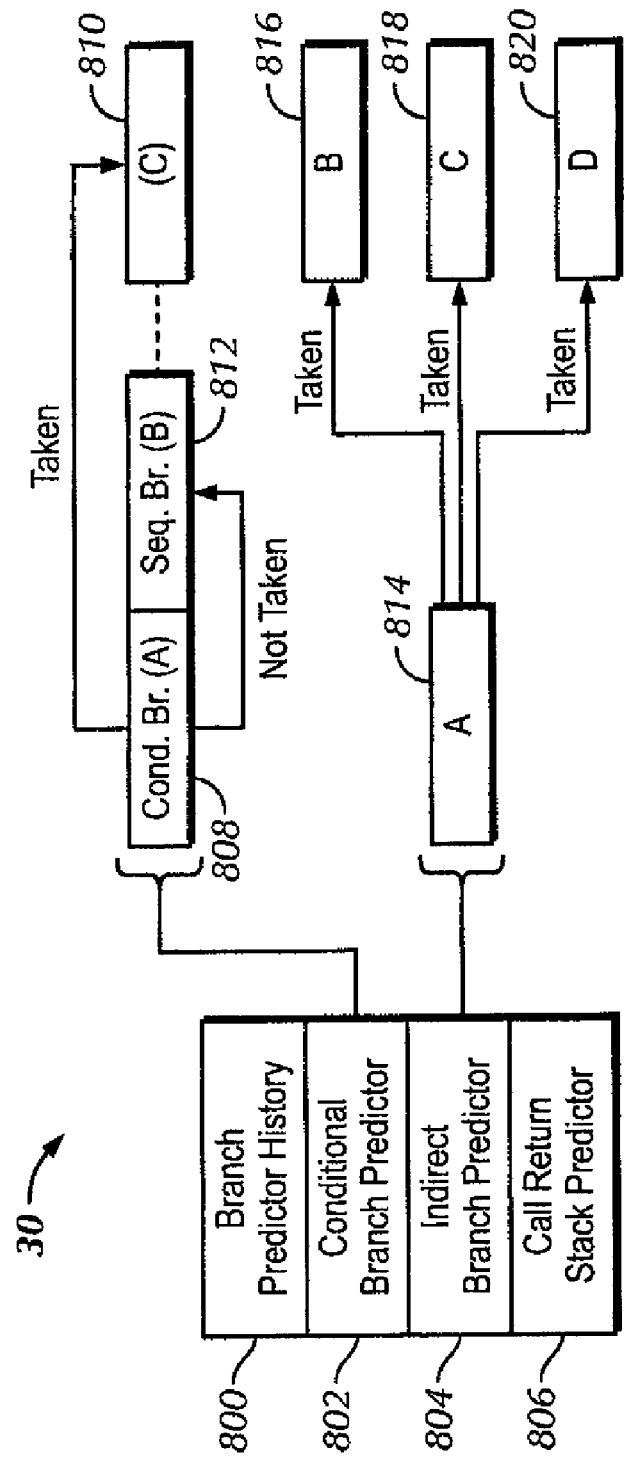
FIG. 10 shows further details of the branch predictor circuit, in accordance with an embodiment of the present invention.

FIGS. 10(*c*) and (*d*) show examples of building multi-block trace.

FIG. 10(*e*) shows a flow chart of the steps 220 performed by the sequencer circuit 29 and the operation fetcher circuit 28 for adding or entering a trace to the sequence buffer 32 and fetching operations to be sent to the execution unit 14.

FIG. 10(*f*) shows a flow of information through various structures of the trace unit 12 in decoding instructions and building basic block traces.

FIG. 10(*g*) shows the address or pointer correspondence between the basic block cache circuit 22 and the PTB 91.

FIG. 10(*h*) shows a flow of steps performed by various structures of the trace unit 12 in verifying the address translations that were used to build a trace when that trace is sequenced for execution.

FIG. 10(*i*) shows a flow chart of steps 121 performed, by the sequencer circuit 29, during an SMC snooping event.

Figure 11:
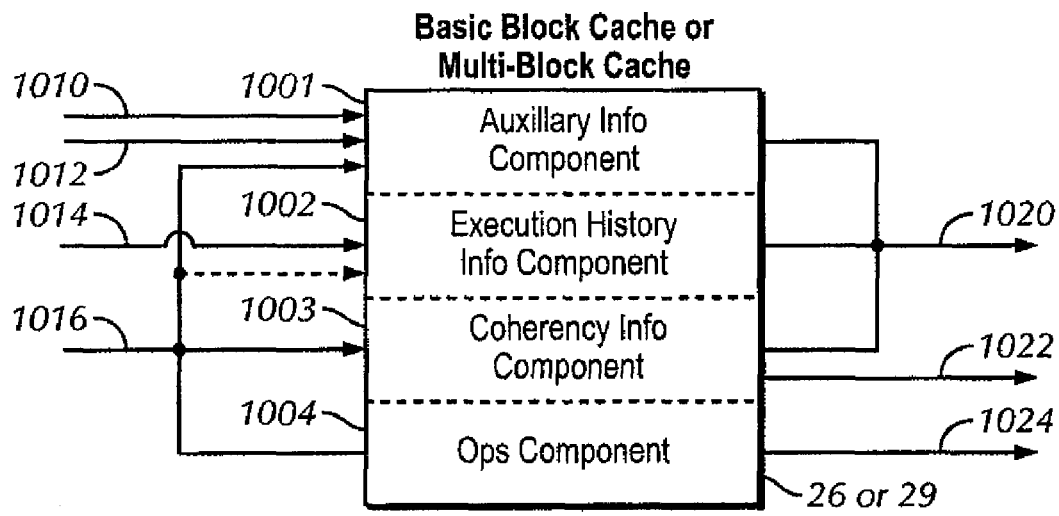

FIG. 11 shows exemplary contents of either of the basic block cache circuit or the multi block cache circuit, in accordance with an embodiment of the present invention.

Figure 12:
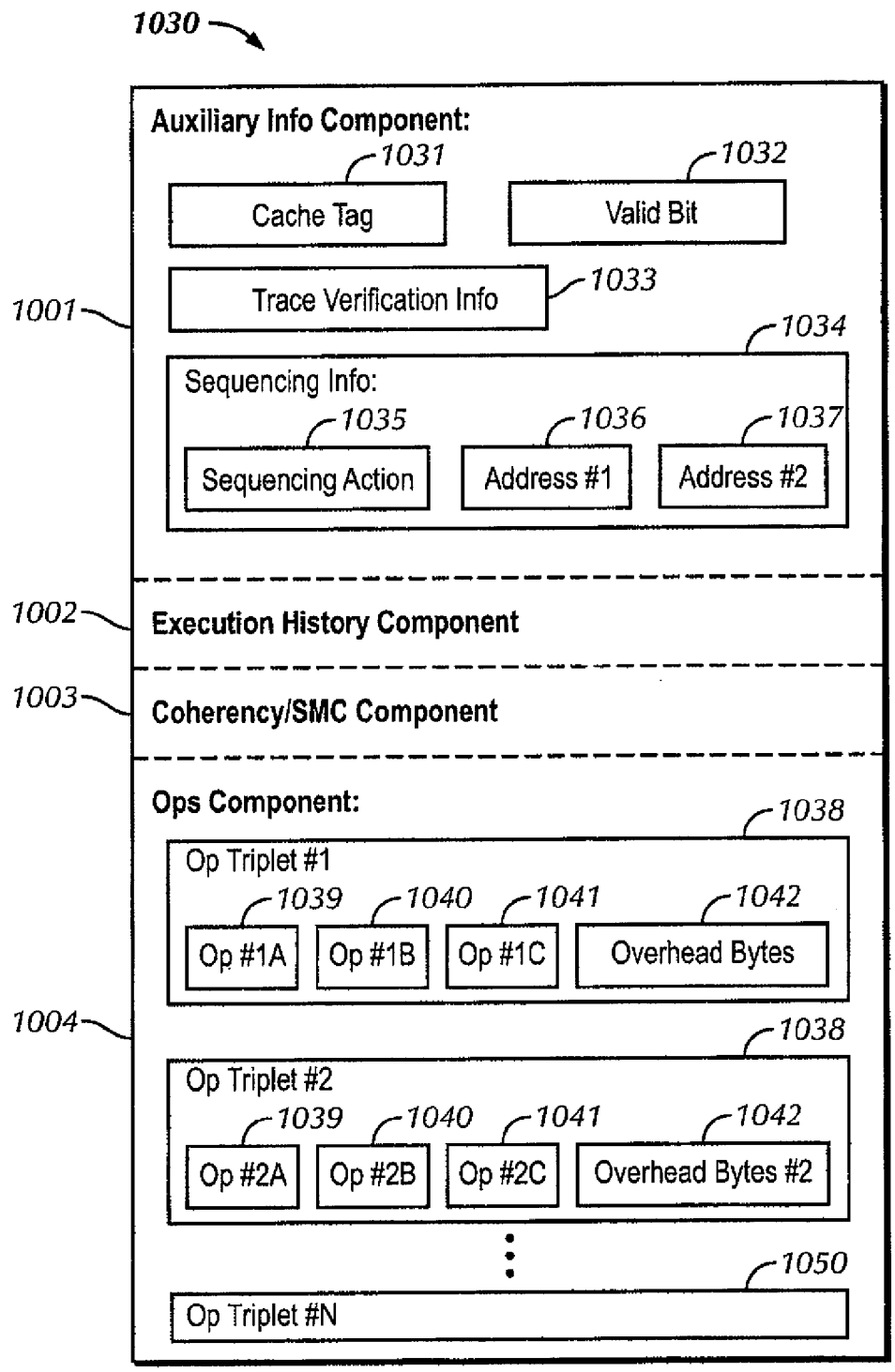

FIG. 12 shows a basic block cache entry, in accordance with an embodiment of the present invention.

Figure 13:
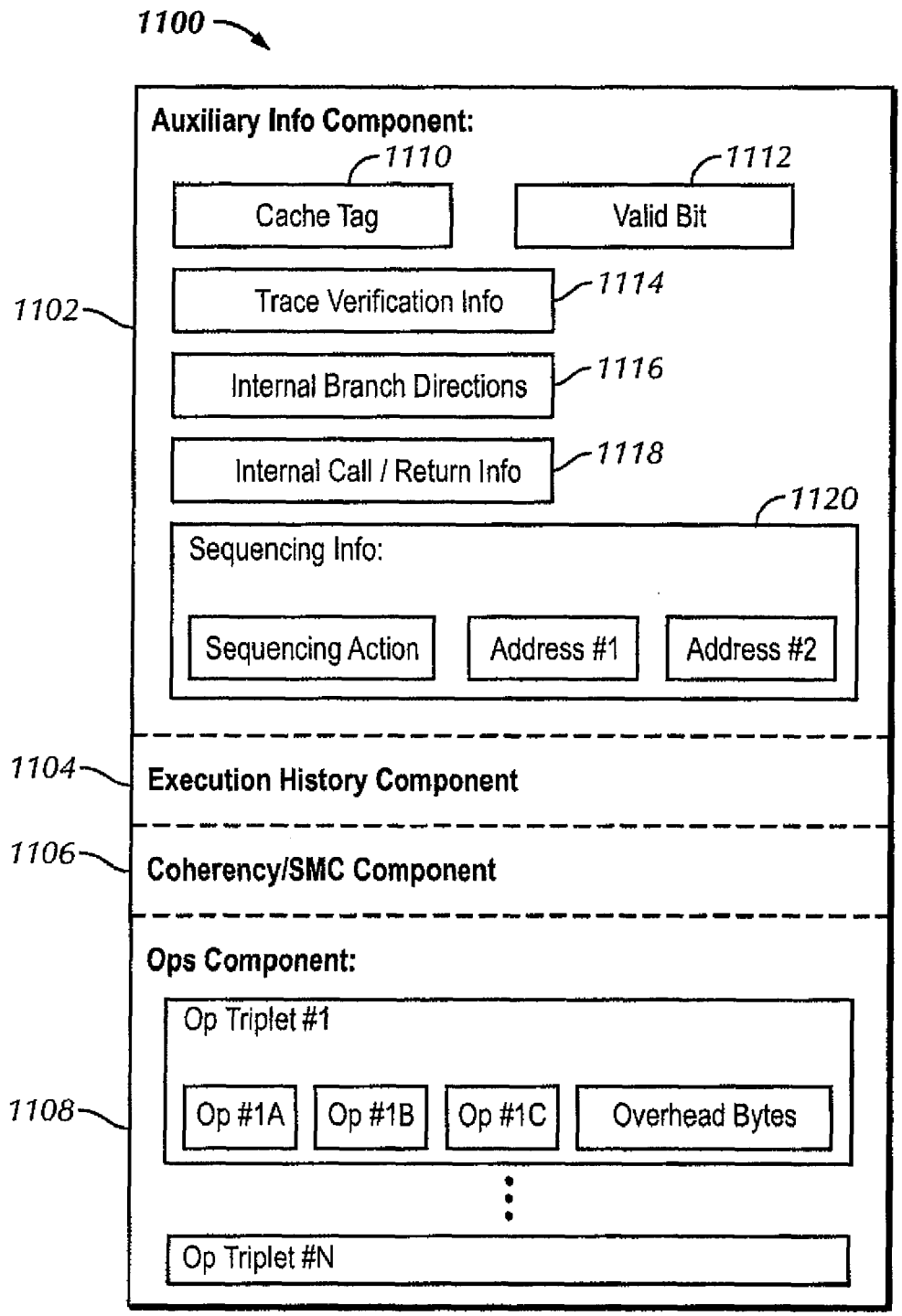

FIG. 13 shows a multi-block cache entry, in accordance with an embodiment of the present invention.

Figure 14:
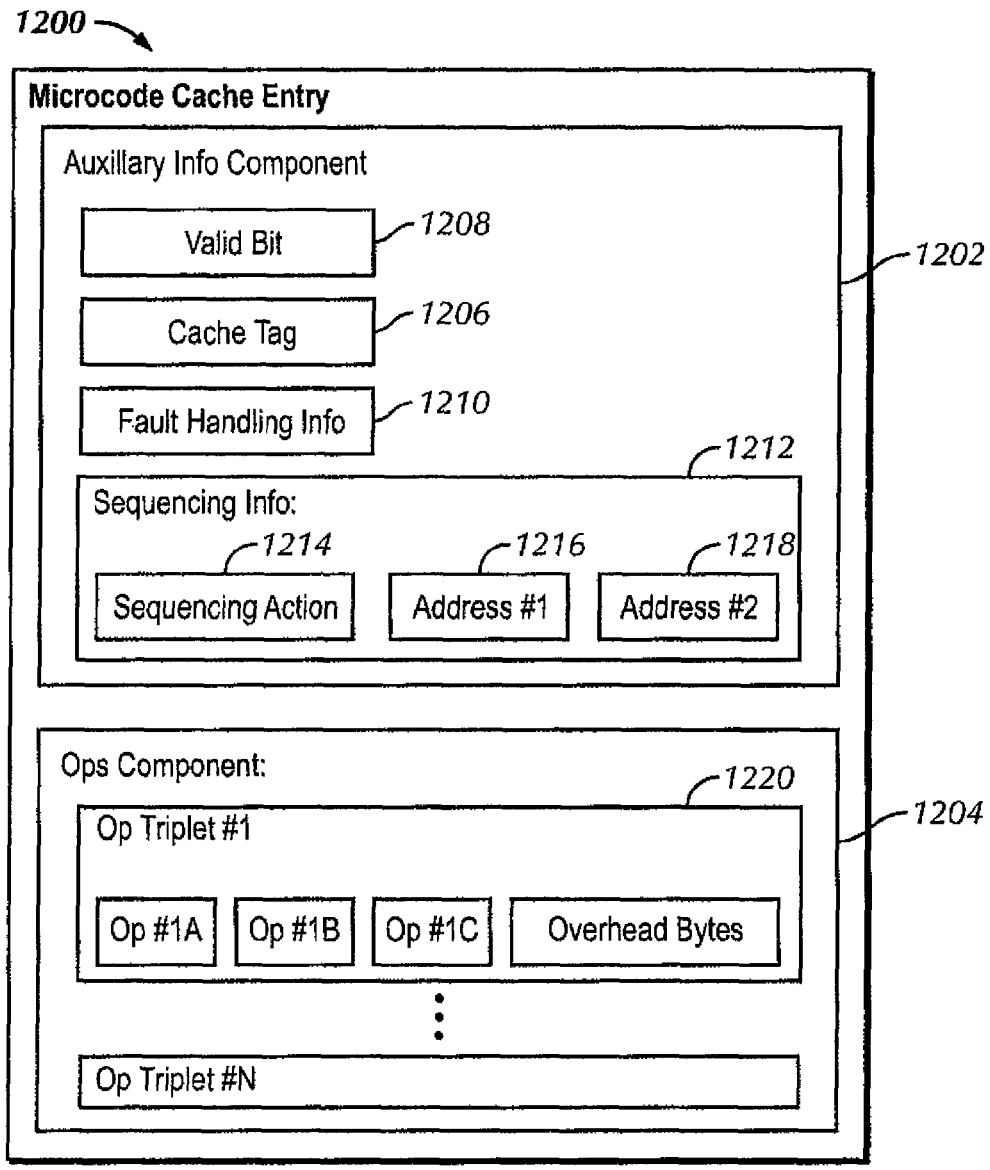

FIG. 14 shows a microcode cache entry, in accordance with an embodiment of the present invention.

Figure 15:
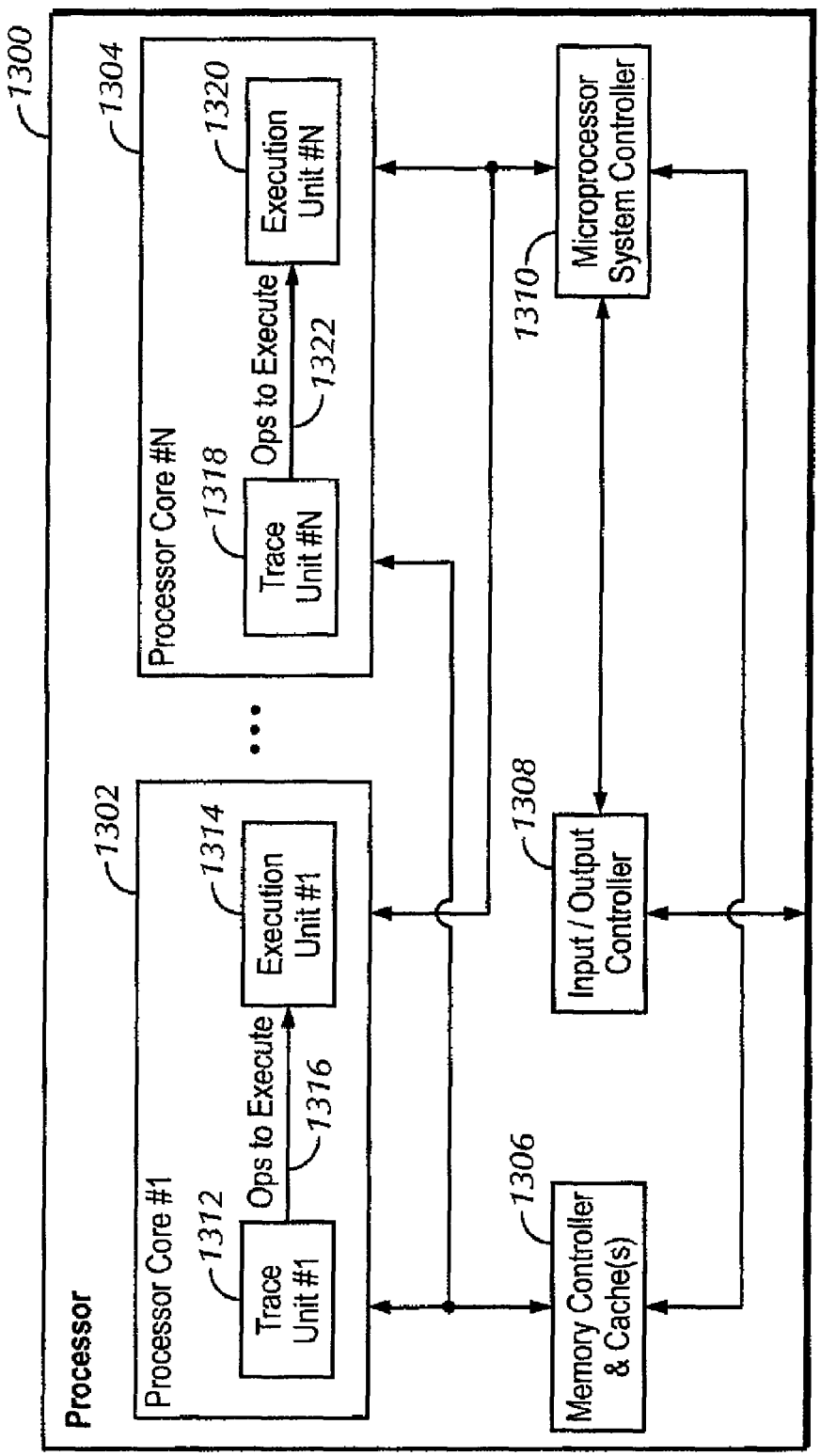

FIG. 15 shows a processor having multiple processor cores, in accordance with an embodiment of the present invention.

Figure 16:
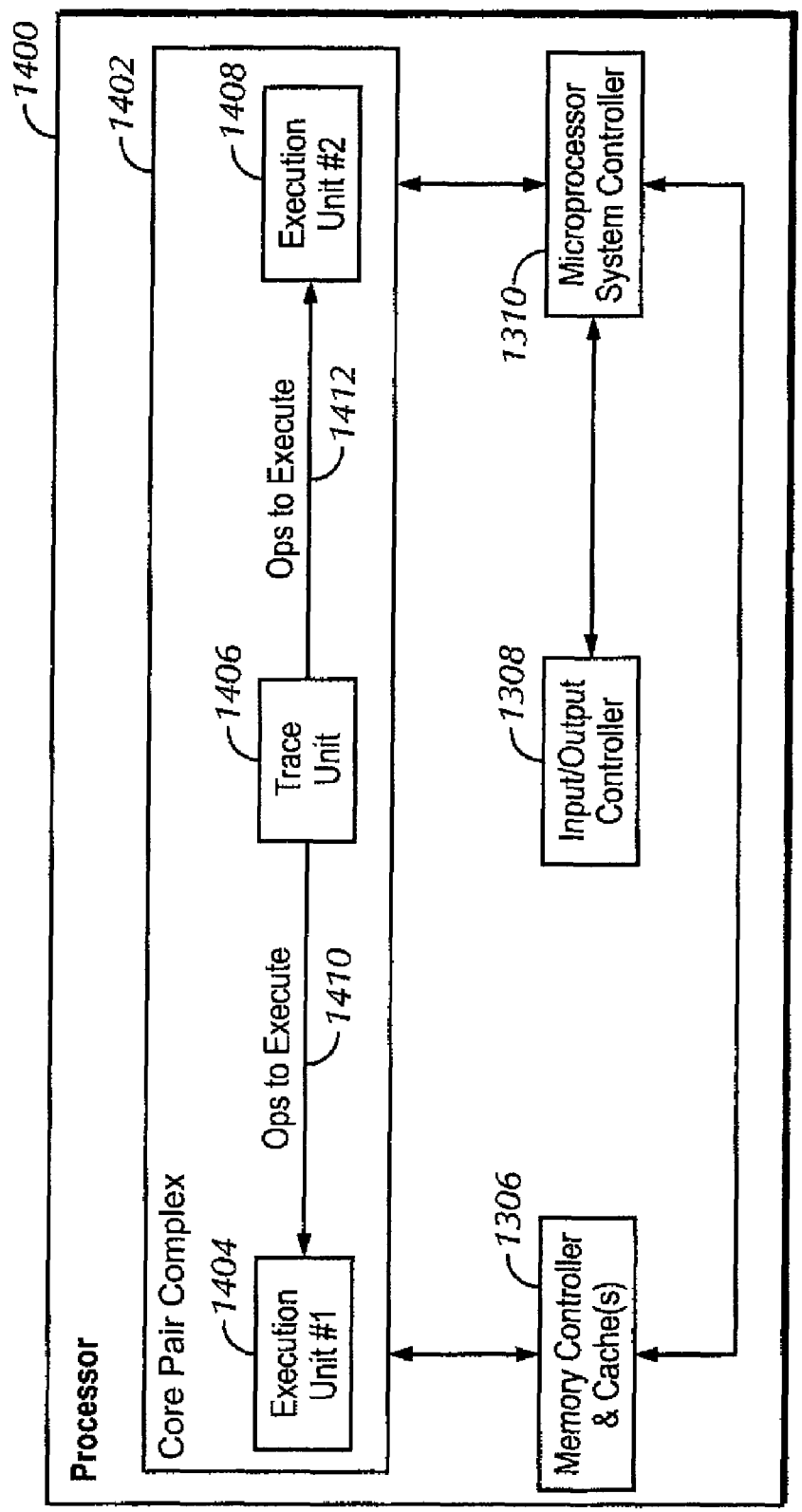

FIG. 16 shows a processor sharing a trace unit among execution units, in accordance with another embodiment of the present invention.

Figure 17:
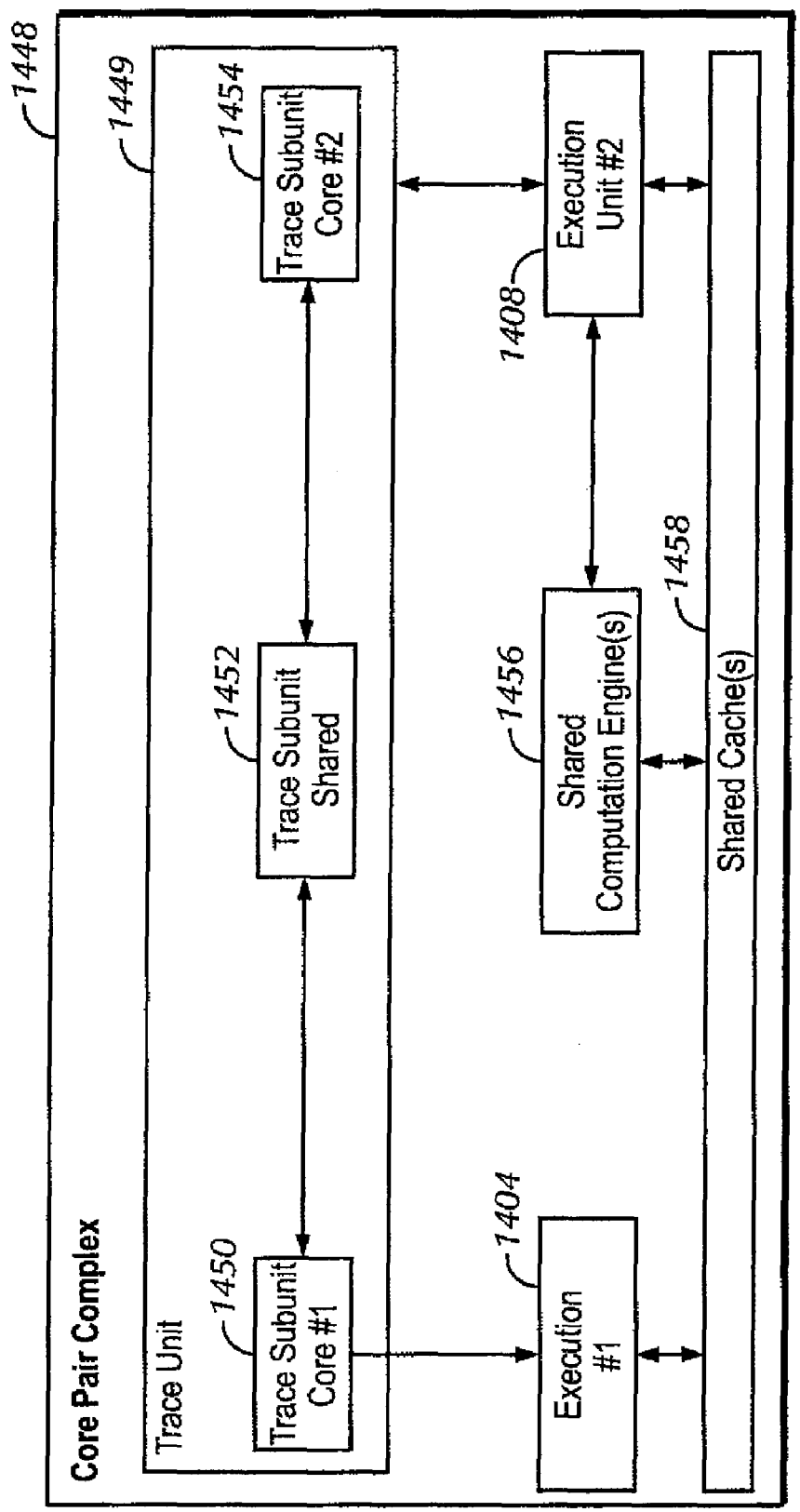

FIG. 17 shows a processor having a trace unit that is shared, only in part, with multiple execution units, in accordance with yet another embodiment of the present invention.

Figure 18:
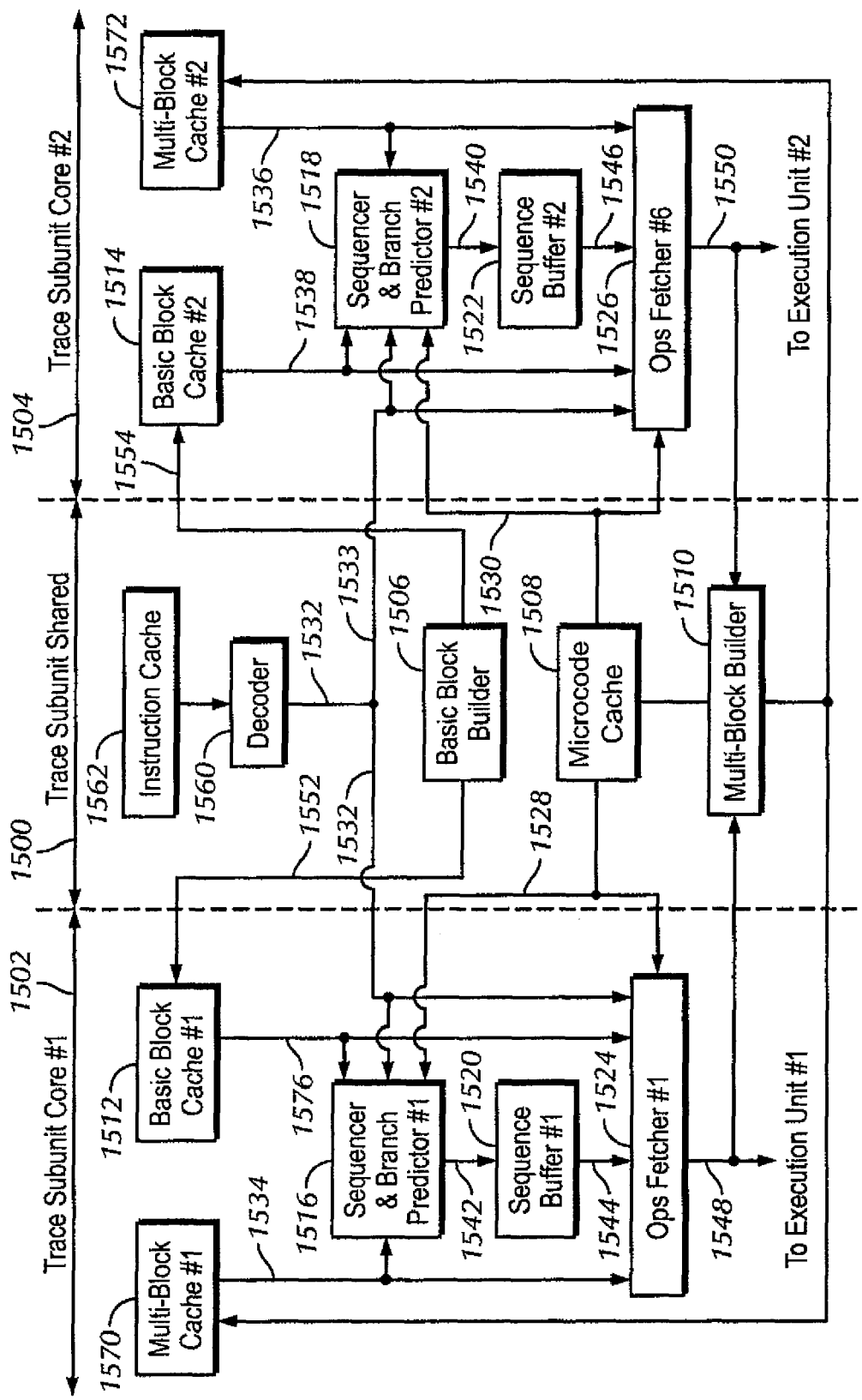

FIG. 18 shows a trace sub-unit core and another trace sub-unit core that are collectively a part of the same trace unit and a shared trace sub-unit, in accordance with an embodiment of the present invention.

Figure 19:
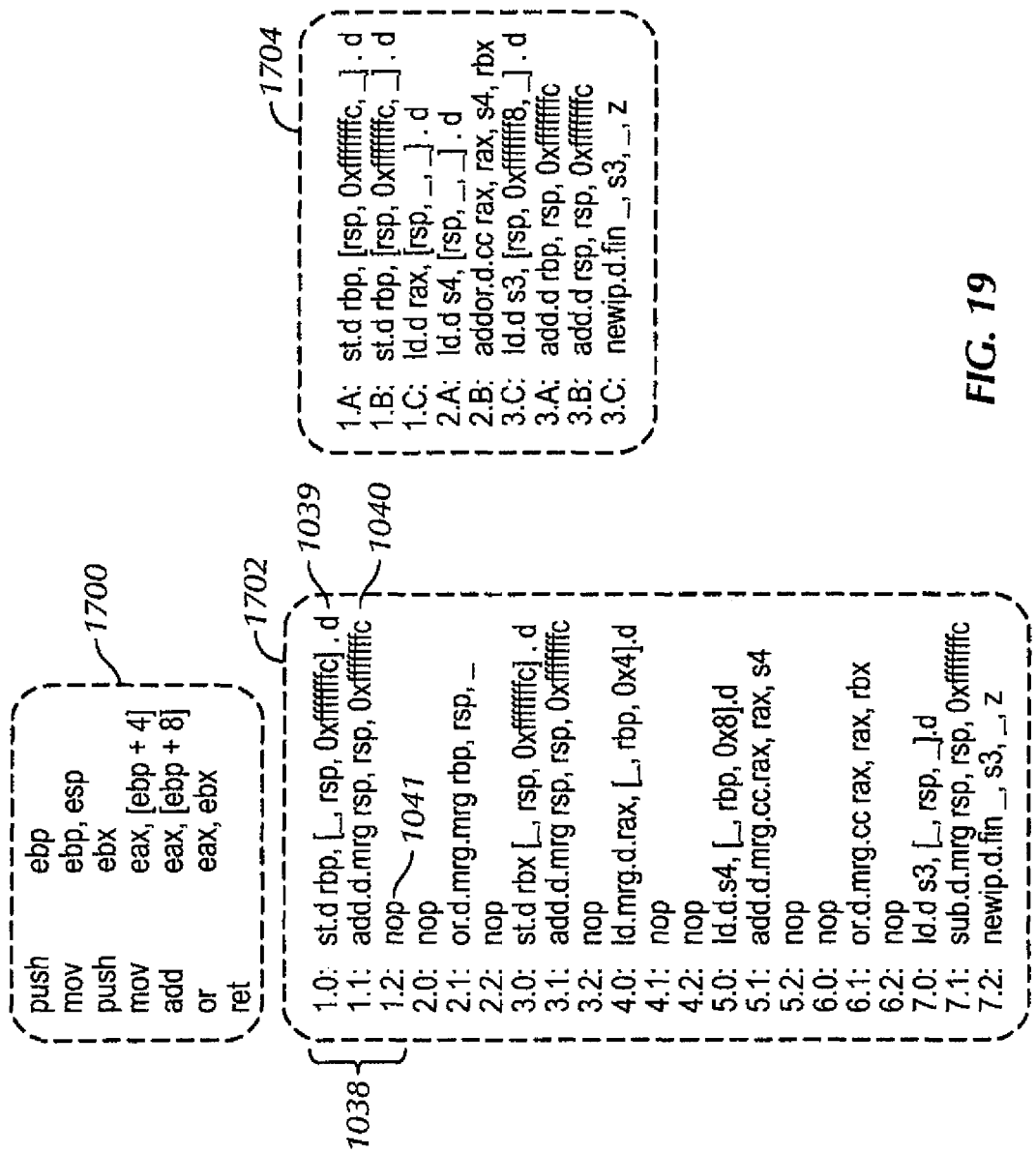

FIG. 19 shows an example of sequence of instructions 1700 decoded into a decoder trace 1702 from which a basic block trace 1704 is built.

Appendix A describes how to determine the highest priority abort trigger in an atomic trace.

Appendix B describes exception and abortion handling of atomic traces in an execution unit.

Appendix C describes some of the wide variety of ways of optimizing basic block and multi-block traces by the trace unit.

Appendix D describes a processor with optimized operation sequences for basic block and multi-block trace caches.

Appendix E describes a processor with basic block and multi-block trace caches.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

Figure 1:
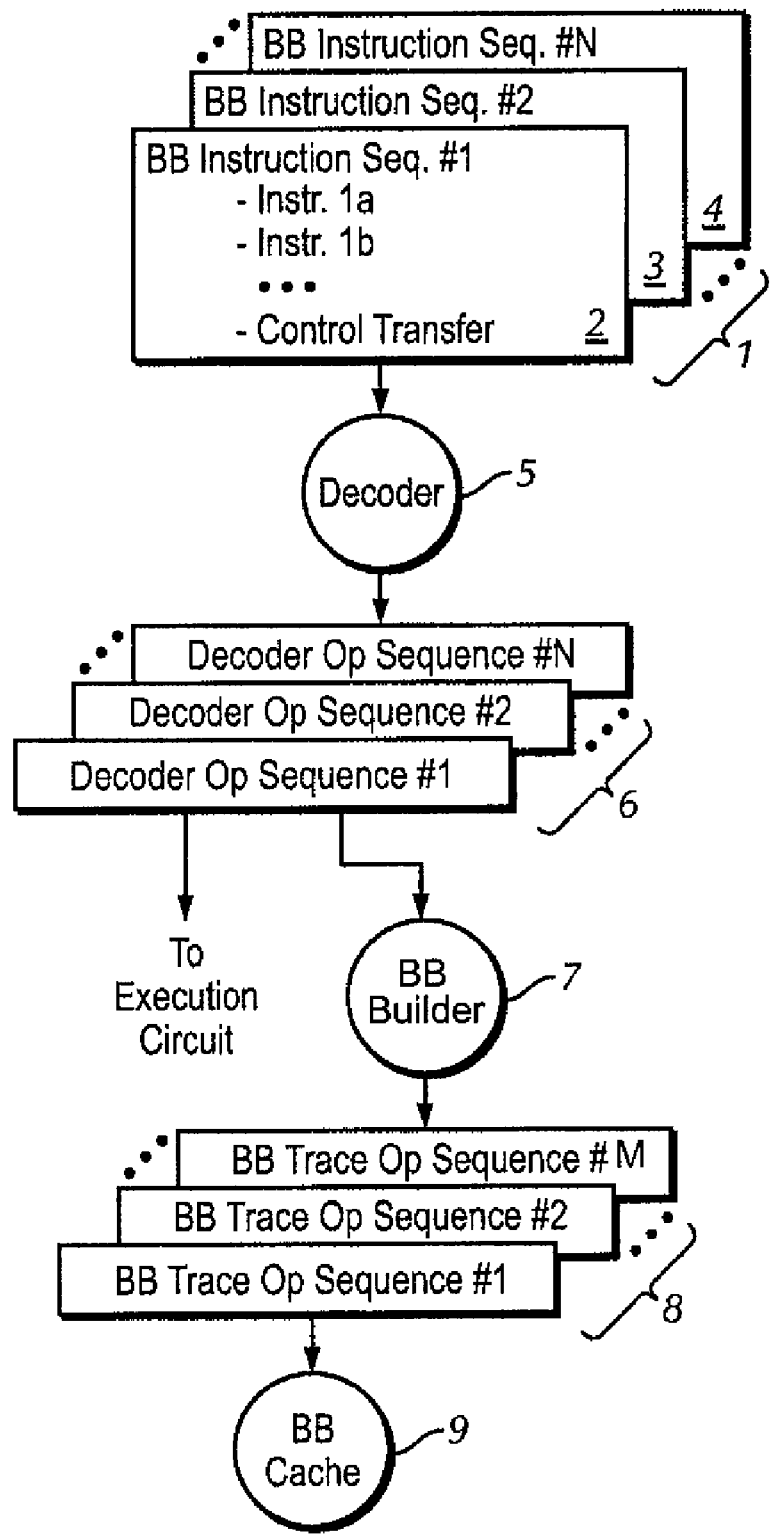
FIG. 1 shows a trace unit including basic block sequences of instructions, a decoder circuit, decoder sequences of operations, a basic block builder circuit, and basic block sequences of operations, in accordance with an embodiment of the present invention.

Referring now to FIG. 1, a trace unit is shown to include basic block sequences of instructions 1, a decoder circuit 5, decoder sequences of operations 6, a basic block builder circuit 7 and basic block sequences of operations 8, in accordance with an embodiment of the present invention. A "trace unit", as used herein, is synonymously referred to as an "instruction processing circuit" or a "front end". A "sequence of operations", as used herein, is synonymously referred to as a "trace".

The basic block sequences of instructions 1 is shown to include 'N' number of basic block sequence of instructions 2-4, with 'N' being an integer value. Each of the basic block sequence of instructions, of the basic block sequences of instructions 1, ends with, at most, one control transfer. In fact, detection of a control transfer ends a sequence of operations or a portion thereof. A sequence of operation that is based on a sequence of instruction having at most a control transfer is a basic block. A basic block sequence of instructions alternatively ends due to capacity constraints, as discussed in further detail below.

The decoder circuit 5 receives the sequence of instructions 2-4 of the basic block sequences of instructions 1. Upon receiving the sequence of instructions 2, the decoder circuit 5 decodes the received sequence of instructions into a decoder sequence of operations (or decoder trace), which includes a sequencing action. The decoder trace is either provided to an execution unit (not shown in FIG. 1) or provided to the basic block builder 7 or both. If the decoder trace is provided to the execution unit, other than the decoding operation performed by the decoder circuit 5, no further optimization of the operations is performed. An example of the result of the decode operation performed on a sequence of instructions is provided by the trace 1702 in FIG. 19. If the decoder trace is provided to the basic block builder circuit 7, further optimization of the operations, which are now included, at least in part, in a sequence of operations (or decoder trace), is performed.

The basic block builder circuit 7 builds a basic block trace (or basic block sequence of operations), which is one of the basic block traces of the M number of basic block traces 8, based on the decoder trace received from the decoder circuit 5. M is an integer value that may be the same as the value N, in which case the number of basic block sequence of instructions is the same as the number of basic block sequence of operations. Alternatively, M and N are different in value where the number of basic block sequence of instructions is different than the number of basic block sequence of operations.

While the built basic block trace includes operations from the decoder trace, various other information is included in the basic block trace, which is advantageously used to effectuate faster sequencing of operations resulting in higher trace unit performance. Furthermore, operations within a basic block trace are advantageously grouped to further increase performance.

In some cases, a basic block trace, such as one of the basic block sequence of operations 8 only include operations of one instruction, in which case the trace is referred to as a single-instruction trace.

Figure 2:
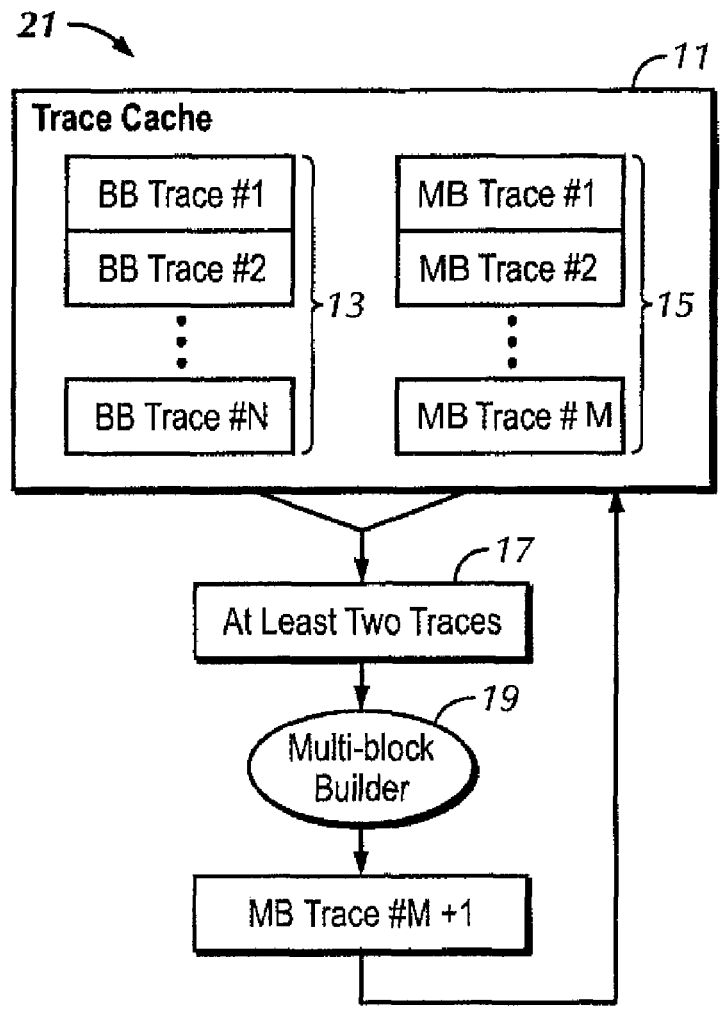
FIG. 2 shows a trace unit to include a trace cache circuit and a multi-block builder circuit, in accordance with an embodiment of the present invention.

FIG. 2 shows a trace unit 21 to include a trace cache circuit 11 and a multi-block builder circuit 19, in accordance with an embodiment of the present invention. The trace cache circuit 11 is shown to cache 'N' number of basic block traces 13 and 'M' number of multi-block traces 15, where 'N' and 'M' are each integer values. In one embodiment of the present invention, the basic block traces 13 are the basic block traces 8 of FIG. 1. However, there is no correlation between the N and M used in FIG. 1 and the N and M used in FIG. 2. That is, while the same notation is used, they may or may not be the same value and are accordingly independent of each other.

At least two traces 17 that are any combination of the basic block traces 13 and/or the multi-block traces 15 are used to build a multi-block trace by the multi-block builder circuit 19. The built multi-block trace is cached in the trace cache circuit 11.

While the built multi-block trace includes operations from one or more basic block traces and/or one or more multi-block traces or a combination thereof, various other information is included in the multi-block trace, which is advantageously used to effectuate faster sequencing of operations and therefore achieve higher trace unit performance. Furthermore, operations within a multi-block trace are advantageously grouped to further increase performance.

Figure 3:
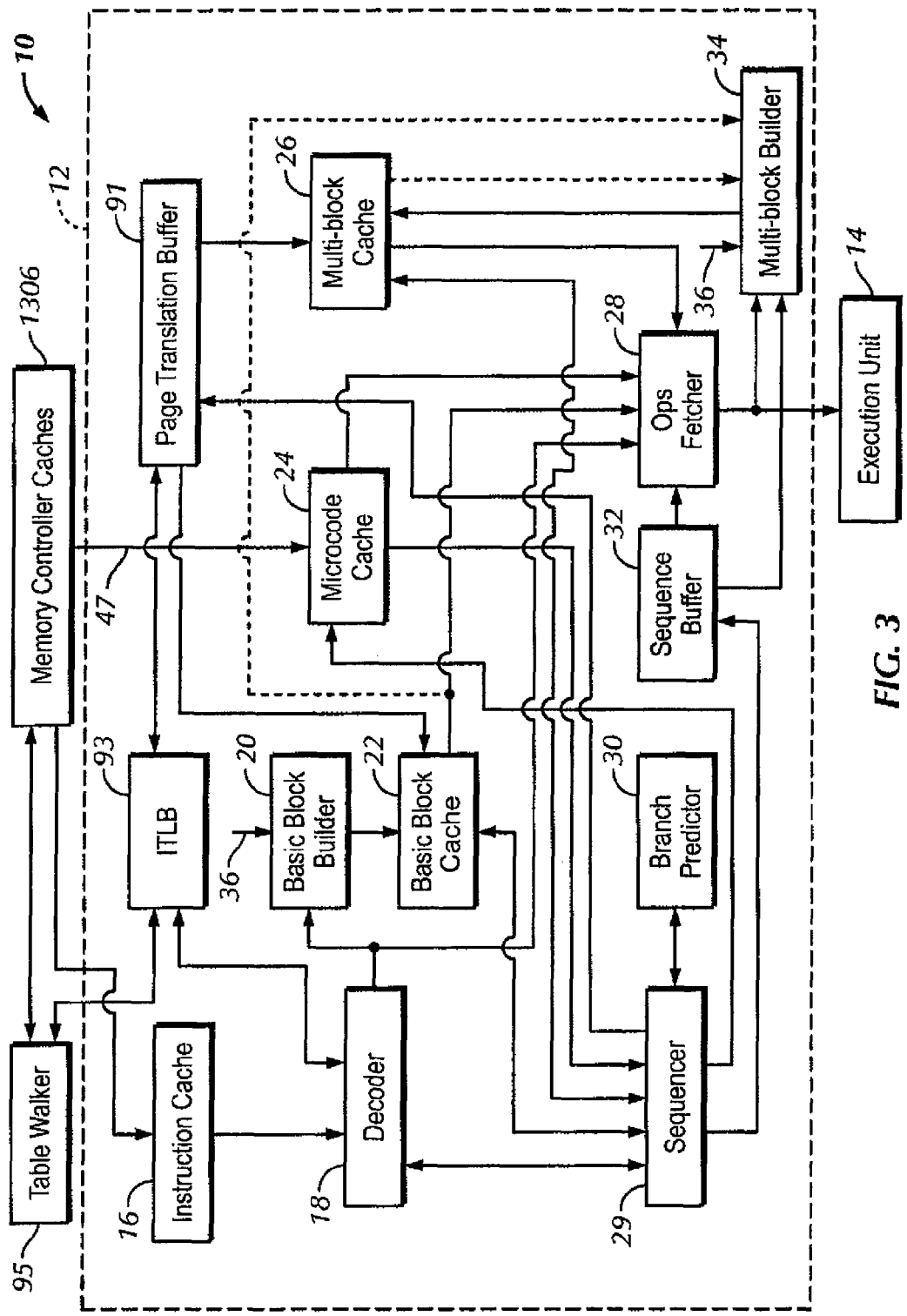
FIG. 3 shows a processor core including a trace unit coupled to an execution unit and to a table walker (TW), in accordance with an embodiment of the present invention.

Referring now to FIG. 3, a processor core 10 is shown to include a trace unit 12 coupled to an execution unit 14 and to a table walker (TW) 95, in accordance with an embodiment of the present invention. "Processor" as used herein is synonymous referred to as "microprocessor". "Execution unit", as used herein is synonymously referred to as "back end".

The execution unit 14 generally executes a sequence of operations (also known as "sequence of code") provided thereto, by the trace unit 12. The trace unit 12 generally builds sequences of operations for use by the execution unit. In so doing, the trace unit 12 operates to reduce the workload of the execution unit 14 by optimizing the sequence of operations in a basic block and/or multi-block trace. The trace unit 12 also attempts to sequence traces ahead of the execution unit 14 so that the execution unit 14 does not need to wait for operations to execute thereby increasing instruction execution throughput.

In accordance with an embodiment of the present invention, the trace unit 12 is shown to include an instruction cache circuit 16, a decoder circuit 18, a basic block builder circuit 20, a basic block cache circuit 22, a microcode cache circuit 24, a multi-block cache circuit 26, an operations fetcher circuit 28, a sequencer circuit 29, a branch predictor circuit 30, a sequence buffer circuit 32, a multi-block builder circuit 34, a page translation buffer (PTB) (also known as "page translation cache (PTC)") 91 and an instruction translation look-aside buffer (ITLB) 93. The ITLB 93 of the trace unit 12 is shown coupled to the table walker 95.

In an alternative embodiment, the basic block cache circuit 22 and the multi-block cache circuit 26 collectively comprise the trace cache circuit 11 of FIG. 2.

The basic block builder circuit 20 and the multi-block builder circuit 34 are collectively referred to as a trace builder circuit 36. While the trace builder circuit 36 is a single circuit in one embodiment of the present invention, in an alternative embodiment, the trace builder circuit 36 is physically more than one circuit. For example, the basic block builder circuit 20 of the trace builder circuit 36 is a physically-separate circuit than the multi-block builder circuit 34 of the trace builder circuit 36.

While in the embodiment of FIG. 3, the basic block and multi-block cache circuits 22 and 26 are shown to be physically separate circuits, alternatively, they may physically be the same circuit, as shown in FIG. 2.

In FIG. 3, the instruction cache circuit 16 is shown coupled to the decoder circuit 18 and, through the decoder circuit 18, receives requests from the sequencer circuit 29. The decoder circuit 18 is shown coupled to the basic block builder circuit 20 and to the operations fetcher circuit 28. The basic block builder 20 is shown coupled to the basic block cache circuit 22. The basic block cache circuit 22 is shown coupled to the multi-block builder circuit 34, the operations fetcher circuit 28 and to the sequencer circuit 29. The PTB 91 is shown coupled to the sequencer circuit 29 and is further shown to provide information to the basic block cache circuit 22 and the multi-block cache circuit 26. The PTB 91 is further shown coupled to the ITLB 93, which is shown coupled to the table walker 95 and the decoder circuit 18.

The multi-block builder circuit 34 is shown coupled to the operations fetcher circuit 28 for receiving traces used to build a multi-block trace. Optionally, the multi-block builder circuit 34 is coupled to the basic block cache circuit 22 and the multi-block cache circuit 26 for receiving traces used to build a multi-block trace.

The operations fetcher circuit 28 is shown coupled to the sequencer circuit 29, the microcode cache circuit 24, the basic block cache circuit 22, the multi-block cache circuit 26, the sequence buffer circuit 32 and the decoder circuit 18. The sequencer circuit 29 is shown coupled to the branch predictor circuit 30, the multi-block cache circuit 26, the microcode cache circuit 24 and the basic block cache circuit 22. The operations fetcher circuit 28 is shown coupled to the execution unit 14.

The instruction cache circuit 16 is a cache, which is a known form of memory, and is generally used to store instructions for optimization by the trace unit 12 before execution thereof by the execution unit 14. The instruction cache circuit 16 provides the stored sequence of instructions to the decoder circuit 18. Instructions, as are referred to herein, are any Reduced Instruction Set Computer (RISC)- or Complex Instruction Set Computer (CISC)-based instruction code, such as but not limited to the x86 instruction code.

The decoder circuit 18 receives the sequence of instructions from the instruction cache circuit 16 and decodes the received sequence of instructions into a sequence of operations.

In one embodiment of the present invention, the decoder circuit 18 is operable to detect a decode time instruction mode that is one of a plurality of instruction modes, and based, in part, on the decode time instruction mode, the decoder circuit 18 decodes the sequence of instructions into a decoder trace.

A decoder trace is based on the sequence of instructions from the instruction cache circuit 16. During decoding, the instruction mode is detected and embedded into the decoder trace. An instruction mode includes information such as the number of parallel bits used in the architecture of the processor core, such as 16 parallel bits vs. 32 parallel data bits vs. 64 parallel bits, which are referred to as 16-bit mode, 32-bit mode, or 64-bit mode, respectively. Alternatively, any other parallel number of bits may be used by the processor core.

Information, in an instruction mode, other than the number of parallel bits used by a processor core, include default data size, default stack size, relative addressing modes, whether a data segment is good or bad and whether or not data is used and any other information relevant to the decoding of instructions.

Optimization generally causes operations within the sequence of operations to be re-ordered and serves to reduce the workload of the execution unit 14. Basic block traces, which are at least, in part, based on the sequence of instructions generated by the instruction cache circuit 16, are further optimized. Multi-block traces, which are based on basic block traces or multi-block traces or any combination thereof are still further optimized. One reason for further optimization of a multi-block trace relative to a basic block trace is its size. Multi-block traces are typically longer sequences of operations than basic block traces and in this respect, there are more ways of re-arranging operations to cause further optimization thereof.

Optimization of basic block and multi-block traces is similar. An alternative embodiment may use dissimilar optimization, such as complementary optimization.

Exemplary optimization techniques used by the embodiment of FIG. 3 include elimination or removal of certain operations, which essentially serves to reduce the execution unit 14's workload, removal of dependencies between operations, which also essentially serves to reduce the execution unit 14's workload; and more efficient grouping or packing of operations, which essentially benefits the efficiency of the trace unit 12, by causing more compact or denser traces to be built.

An example of elimination of certain operations includes removing dead code or code that does not offer any value if executed. In one embodiment of the present invention, grouping of operations is done by the use of operation "triplet", as will be discussed with reference to subsequent figures.

In an exemplary embodiment, all traces are executed atomically, i.e. completely executed or completely aborted. When a trace is aborted, none of the operations within the trace have any effect on the architectural state. In other words, trace execution is atomic in that the trace's effects are either committed in their entirety to the architectural state, or prevented in their entirety from having any impact on the architectural state.

If a trace is aborted, the architectural state of the various components of the trace unit 12 and the execution unit 14 are returned to their states as they were prior to the start of the trace. Architectural state is commonly understood as the part of the processor core which holds the state of a process, such as the state of control registers or general purpose registers.

The multi-block builder circuit 34 receives basic block and multi-block traces for building a multi-block trace. In one embodiment of the present invention, the multi-block builder circuit 34 is coupled to the operations fetcher circuit 28 for receiving the basic block and multi-block traces. Alternatively, the multi-block builder circuit 26 receives basic block and multi-block traces from the basic block cache circuit 22 and the multi-block cache circuit 26, respectively.

In one embodiment of the present invention, the sequencer circuit 29 operates to select a next sequence of operations from among the decoder sequence of operations (or traces), the basic block sequence of operations (or traces), and the multi-block sequence of operations (or traces). In an alternative embodiment of the present invention, the sequencer circuit 29 sequences the next microcode trace, to be executed by the execution unit 14, by addressing the next microcode trace in the microcode cache 24. Upon identifying the next microcode trace, the microcode cache circuit 24 provides the next microcode trace to be executed to the execution unit 14 for execution thereof.

In operation, the sequencer circuit 29 determines the order in which traces are sent to the execution unit 14 and which traces to promote, which traces to combine, and fetches operations from any of the sources: the decoder circuit 18, the basic block cache circuit 22, the multi-block cache circuit 26; or the microcode cache circuit 33, to send to the execution unit 14. At the same time the sequencer circuit 29 is sending the fetched operations to the execution unit 14, it also sends the fetched operations to the one or both of the builder circuits 20 and 34.

In the case of a capacity constraint occurrence, where the size of a trace is larger than a predetermined value that is typically determined based on the size of a cache entry in either of the basic block or multi-block cache circuits, a decoder trace is sent to the execution unit 14. This is one example of a bypass mode.

A microcode trace is used when, for example, a sequence of instructions is either complex or rare. The execution of rare instructions need not be efficient. Certain complex instructions, such as "string manipulation" need to be optimized, and are done so manually into microcode traces. During manual optimization, the objective is to try to make the operations compact or create traces that include the least number of operations possible.

An example of a microcode trace is based on segmentation changing code known to be used by x86 code programmers. In the case of segmentation changing code, microcode traces, rather than decoder, basic block or multi-block traces are used and no additional optimization thereof is performed.

A microcode trace is generally not desirable from a performance standpoint because a single instruction can correspond to multiple traces, which degrades performance efficiency. Accordingly, microcode traces are advantageously optimized to execute as fast as possible so as to mitigate performance hits associated therewith.

A microcode trace is represented by a sequencing action. That is, the decoder circuit 18 determines that a sequencing action is microcode and terminates a current basic block trace. Upon termination of the current basic block trace, by the decoder circuit 18, a sequencing action results in a 'call' to a microcode trace identified at a particular address in the microcode cache circuit 24. The microcode trace is retrieved, from the microcode cache circuit 24, by the operations fetcher circuit 28 and is provided, by the operations fetcher circuit 28, to the execution unit 14 for execution thereof.

Thereafter, either the sequencer circuit 29 sequences the next basic block trace, another trace, or additional microcode traces are sequenced and executed. A microcode trace includes a control transfer and sequencing action.

The sequencer circuit 29 performs various critical functions. Among which, identifying the next trace to be executed by the execution unit 14, and in doing so the trace unit 12 decouples the sequencing time from the execution time. The sequencing time refers to the number of clock cycles used for sequencing a next trace. A typical sequencing time is once every four clock cycles although in other embodiments other sequencing times are employed. A "cycle", as used herein, refers to a clock cycle.

In one method and embodiment of the present invention, the sequencer circuit 29 sequences ahead of the execution unit 14 and instructs the branch predictor circuit 30 to predict all predictions associated with a sequencing action. The next address resulting from a sequencing action is predicted by the branch predictor circuit 30. A predicted result is also known as a "projected result".

Figure 3A:
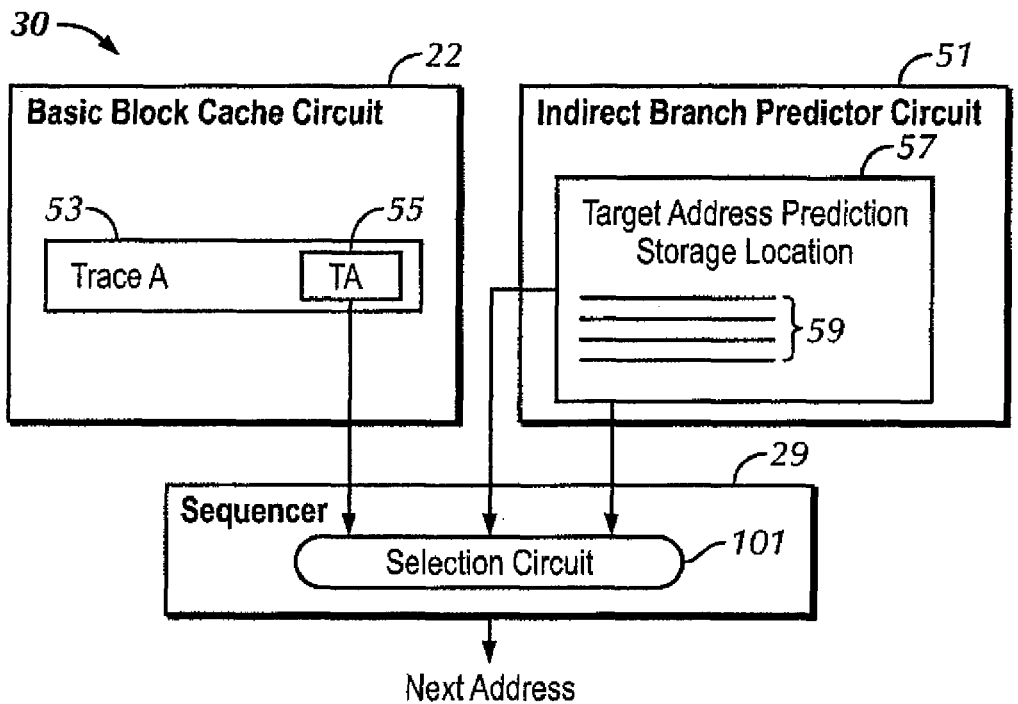

For example, a sequencing action that might result in three possible target addresses will have three possible target addresses associated with it. The different target addresses are generated by the branch predictor circuit 30 and stored in a target address predictions storage location 57 as shown in FIG. 3(a). The foregoing results in higher power consumption and higher performance by the trace unit 12.

Referring now to FIG. 3(a), further details of the interaction between the sequencer circuit 29, the branch predictor circuit 30 and one of the cache circuits is shown relative to determining a target address, in accordance with an embodiment of the present invention. In FIG. 3(a), the basic block cache circuit 22 is shown coupled to the sequencer circuit 29, which is shown coupled to the branch predictor circuit 30. The branch predictor circuit 30 is shown to include an indirect branch predictor circuit 51 for storing alternate target addresses in the target address prediction storage location 57. Within basic block cache circuit 22 is a collection of trace cache entries, an example of which is trace A 53. While the basic block cache circuit 22 is shown to include traces, such as the trace A 53, in FIG. 3(a), the multi-block or microcode cache circuits are similarly employed for determining a target address.

Trace A 53 is shown to include a target address (TA) 55, which is an address, or address pointer, of a next predicted target address. The sequencer circuit 29 is shown to include a selection circuit 101 for selecting between two target address, one of which is the TA in the trace A 53 and the other of which is provided by the indirect branch predictor circuit 51.

Storage location 57 has stored therein a number of possible target addresses 59 that are each a predicted result of an indirect branch operation by the branch predictor circuit 30. For example, the result(s) predicted for an indirect branch instruction are stored in the indirect branch predictor circuit 51. The TA 55 is one of a number of possible target addresses, each of which is stored in the storage location 57, and is one of the addresses 59. The trace A 53 is built with a primary TA, which is shown included as a part of the trace A 53, and if this prediction is determined to be wrong, i.e. mis-prediction, another possible or alternate target address is retrieved from the addresses 59, by the sequencer circuit, 29. As instructed by the indirect branch predictor circuit 51, the retrieved address is then used as the next address when the trace is sequenced.

In operation, the TA of the trace A 53 is provided as input to the selection circuit 101. The selection circuit 101 further is provided with a target address from the addresses 59 by the indirect branch predictor circuit 51. The indirect branch predictor circuit 51 also provides control signal(s) to the selection circuit 101, which determines which address to select between the TA of the trace A 53 and the target address from the indirect branch predictor circuit 51.

In an alternative embodiment, multiple traces are built, each with a different target address, and stored in a corresponding cache circuit. One of the multiple traces is ultimately executed by the execution unit 14 and the rest are either invalidated or maintained depending on design choices.

Figure 3B:
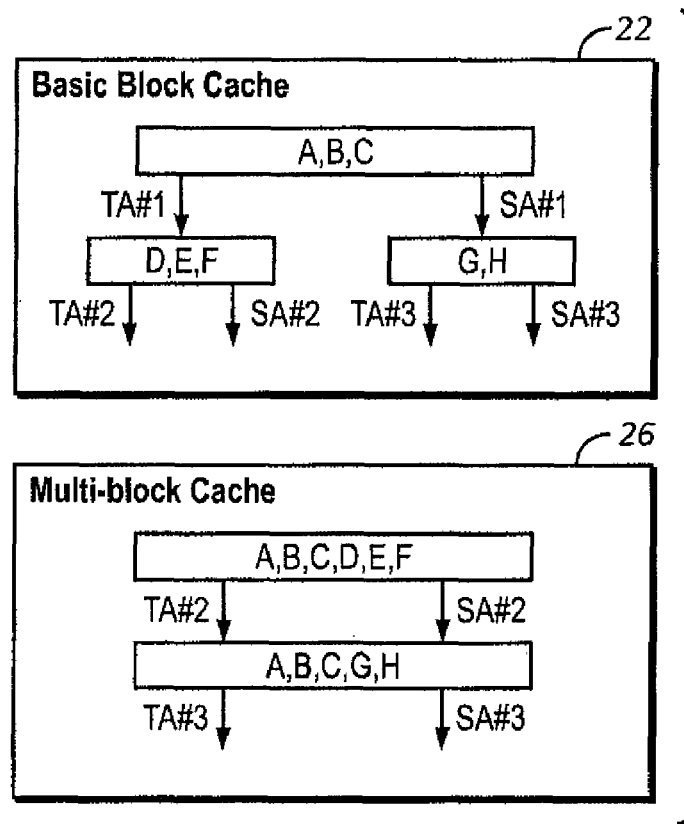

FIG. 3(b) shows an example of a basic block trace 'ABC', where ABC represents operations, in the basic block cache circuit 22. The trace ABC includes a TA that points to trace 'DEF' and a sequential address (SA) that points to trace 'OH'. Trace ABC is stored in the basic block cache circuit 22 from which multiple multi-block traces 'ABCDEF' and 'ABCGH' are built and stored in the multi-block cache circuit 26.

The built multi-block trace ABCDEF represents a sequence of operations that represents a sequence of instructions. The sequence of operations, represented by the trace ABCDEF, is independent of the operations ABC and DEF, it is rather, based on the sequence of instructions from which ABC and DEF are built. This similarly applied to multi-block trace ABCGH. That is, the sequence of operations, represented by the trace ABCDGH, is independent of the operations ABC and GH, it is rather, based on the sequence of instructions from which ABC and GH are built.

Each of the traces ABCDEF and ABCGH is referred to as an 'alternate' trace and obviously includes a different predicted address. Additional multi-block traces may be built if there are further branches that can be taken after each set of operations 'DEF' or GH. The multi-block traces ABCDEF and ABCGH are both associated with a single basic block trace, i.e. trace ABC. The built and unused traces are invalidated, or not, depending on the design choices employed, such as the rules for invalidation of traces. The foregoing example of more than one trace with a predicted result obviously requires a higher capacity cache circuit, as all built traces or at least a subset thereof, are stored in a cache circuit.

Referring back to FIG. 3, the sequencer circuit 29 also decides whether or not to promote a trace, to validate a trace, and whether or not a trace is obsolete. Validation of a trace includes ensuring proper instruction mode of the trace. That is, during decoding of instructions by the decoder circuit 18, the instruction mode that is used to decode the instructions is noted and embedded in the trace being built. In one embodiment of the present invention, the instruction mode used to decode the instructions of a trace is in the trace verification information part of the trace. During trace validation, the current instruction mode of the processor core is verified against the actual instruction mode that was used during building of the trace being verified. If this verification proves to be unsuccessful, i.e. the current instruction mode of the processor core is not found to match the actual instruction mode that was used during building of the trace, the trace is invalidated. If not, the trace is identified as a valid trace, at least as to its instruction mode. There are other reasons for invalidation a trace; one such reason is if one or more instructions, which form the basis of a trace, are modified. Other reasons will be noted herein in the context in which they arise.

Verification of a trace refers to a trace being validated or trace validation.

Invalidation of a trace results in preventing (also known as "blocking") the trace from being executed by the execution unit 14.

Alternatively, the instruction mode is reflected by a flag that is part of the trace and stored in a cache circuit.

The sequencer circuit 29 also activates the decoder circuit 18 and possibly the basic block builder circuit 20, to build a basic block trace in the event a trace is determined to not exist in the basic block cache circuit nor in the multi-block cache circuit, and is further discussed relative to subsequent figures. In the event a trace is determined to not exist, bypass mode is recognized in one embodiment of the present invention. The sequencer circuit 29 also serves to update information in the branch prediction circuit 30, which, at times, requires cleanup when the branch prediction circuit 30 has inaccurately predicted.

Due to the inclusion of a variety of information within a trace, the sequencer circuit 29 can advantageously afford to operate at a slower rate, which promotes power savings. Additionally, the branch predictor circuit 30 is advantageously afforded more sophistication thereby improving branch prediction accuracy and sequencing. Moreover, use of multi-block traces as often as is typically done lowers the demands on the sequencer circuit 29. It has been shown that during operation of the processor core 10, approximately 85% of instructions are from traces in the multi-block cache circuit 26.

The goal of the trace unit 12 is generally to keep the execution unit 14 busy to the extent where the latter is used substantially optimally. One of many of the ways in which this is accomplished is by providing decoder traces to the execution unit 14 when the operations fetcher circuit 28 is not providing traces to the execution unit 14. More specifically, a decoder trace is "bypassed" to the operations fetcher circuit 28 if the latter has no other traces to send to the execution unit 14 and the next trace should be from the decoder circuit 18.

In operation, the sequencer circuit 29, using the branch predictor circuit 30, is configured to generate a prediction for the result of a particular control transfer instruction, and to select, based on the predicted result, a next sequence of the operations to be provided to the execution unit 14. The sequencer circuit 29, then, operates to provide an indication of the next sequence of operations to the instruction cache circuit 16, the basic block cache circuit 22, and the multi-block cache circuit 26.

The instruction cache 16, the decoder circuit 18, and the basic block cache circuit 22 are also configurable such that the instruction cache 16 provides zero or more program instructions to the decoder circuit 18. An example of zero program instructions is the case of error handling, in which case no program instructions are provided to the decoder circuit 18.

The sequencer circuit 29 determines the next sequence of operations to be executed by first checking for the latter in the basic block and multi-block cache circuits 22 and 26. If the next trace is not found in either of the basic block and multi-block cache circuits 22 and 26, the sequencer circuit 29 resorts to the instruction cache 16 for instructions, which are decoded by the decoder circuit 18, i.e. as a decoder trace, as the next trace to be executed.

In an alternative embodiment of the present invention, the basic block cache circuit 22, the multi-block cache circuit 26 and the instruction cache circuit 16 are accessed substantially simultaneously. In this embodiment, while performance improves, power consumption is increases.

When a trace in a cache circuit is found, this is referred to herein as a 'hit' and when a trace is not found in a cache circuit, this is referred to as a 'miss'.

As previously noted, there are generally four types of traces (or sequences of operations) that are generated by the trace unit 12. One such type is a decoder trace (or decoder sequence of operations), generated by the decoder circuit 18. Another such type is a basic block trace (or a basic block sequence of operations) generated by the basic block builder circuit 20. A third type of trace is a multi-block trace (or multi-block sequence of operations) generated by the multi-block builder circuit 34. Yet a fourth and optional type of trace is a microcode trace (or microcode sequence of operations).

A memory controller, located externally to the processor core 10, receives instructions stored in its memory and provides information, such as microcode instructions. Alternatively, the memory controller and its memory may be included in the same semiconductor device that houses the trace unit 12.

In one embodiment of the present invention, basic block, multi-block, and microcode traces are cached. In an alternative embodiment thereof, in addition to basic block, multi-block and microcode traces being cached, decoder traces are also cached. An average multi-block trace includes four and a half basic block traces and a typical basic block trace includes five x86 instructions, in the case where x86 instructions are used. It is understood that the foregoing are merely exemplary trace sizes and other sizes thereof are contemplated.

The basic block builder circuit 20 is operable to receive at least a portion of the decoder trace that is generated by the decoder circuit 18, and to generate, based thereon, a basic block trace, and to provide the built basic block trace to the basic block cache circuit 22. At least a portion of the decoder trace represents a portion of the sequence of instructions received by the decoder circuit 18, where the received portion of the sequence of instructions includes, at most, one control transfer instruction that, when present, ends the portion of the sequence of instructions. A control transfer instruction is an instruction that directs the flow of instructions in a sequential or non-sequential order.

Examples of control transfer instructions include, but are not limited to, a 'JUMP' instruction, or a 'BRANCH' instruction. In this manner, the first encountered control transfer, in the received portion of sequence of instructions, is used to denote the end of the basic block unless capacity constraints are used to do so. Upon detection of the end of a basic block, the decoder circuit 18 provides the basic block to the basic block builder 20 for building a basic block trace.

In one embodiment of the present invention, the basic block builder circuit 20 builds a basic block trace through one or more unconditional control transfer instructions. Examples of such unconditional control transfer instructions include unconditional jumps or unconditional subroutine calls. Examples of conditional control transfer instructions include indirect branches, conditional branches and conditional subroutine calls. In so doing however, it is preferable to apply certain restrictions to the basic block trace, such as restricting the resultant trace to have a sequential next trace address that is effectively managed by the trace unit 12 and to restrict the resultant trace to span a manageable number of PTB pointers, which are discussed in further detail below.

A basic block trace is at least a portion of the sequence of operations received from the decoder circuit 18, which is based on a basic block, which ends by the control transfer instruction. Alternatively, the basic block trace ends due to a capacity constraint.

After the building of a basic block trace, the basic block builder circuit 20 provides the built basic block trace to the basic block cache circuit 22 for caching thereof. The built trace is executed by the execution unit 14. In the embodiment where multiple multi-block traces are built, each based on a unique prediction, a number of alternate traces associated with the same sequence of instructions, may be maintained. To accomplish the foregoing, however, the multi-block cache circuit 26 is required to be large enough, in capacity, to accommodate additional traces.

One of the ways in which traces are optimized is by eliminating "NOP" or "no operation" operations, which are readily generated by the decoder circuit 18 when decoding instructions. The basic block builder circuit 20 and the multi-block builder circuit 34 automatically remove as many NOPs as possible. Removal of unnecessary NOPs results in efficient use of the basic block cache circuit 22 and the multi-block cache circuit 26.

Multi-block traces are invalidated for various reasons. One of which is when a multi-block trace includes one or more mis-predicted interior branches (or mis-prediction). An example of a mis-predicted branch is the result of a 'jump' or non-sequential instruction, such as conditional control transfer, where the result is a target address erroneously predicted to be the result of the control transfer. In such a case, the multi-block trace is invalidated.

The basic block builder circuit 20 is coupled to the basic block cache circuit 22 and provides basic block traces, after having built them, to the basic block cache circuit 22 for caching thereof. The basic block builder circuit 20 receives decoder traces and uses them to build a basic block.

Similarly, the multi-block builder circuit 34 is coupled to the multi-block cache circuit 26, and provides multi-block traces, after having built them, to the multi-block cache circuit 26 for caching thereof. The multi-block builder circuit 34 uses basic block traces from the basic block cache circuit 22, or multi-block traces from the multi-block cache circuit 26, or a combination thereof, to build a multi-block trace.

To build a multi-block trace from a basic block trace, the latter would have to be promoted. Promoting a basic block trace occurs when the number of times a branch instruction has been consistently noted to have branched to the same target address, as reflected by bias, is equal to or exceeds a promotion threshold (or predetermined value). Promotion occurs when it is more efficient for a trace to be combined with other traces for execution. A trace is promoted if its bias is the same or higher than the promotion threshold and if its final control transfer is predictable. The test for comparing a trace's bias to the promotion threshold may alternatively, result in promotion of the trace if the trace's bias is higher than the promotion threshold or the trace's bias is less than the promotion threshold or the trace's bias is less than or equal to the promotion threshold. Promotion threshold is a dynamically alterable value, yet, in an alternative embodiment, it may be fixed.

Promotion of a basic block trace and a multi-block trace are substantially the same. Multi-block trace optimization, however, tends to be more effective than basic block trace optimization because larger chunks of operations are combined in a multi-block trace, therefore, leaving more opportunity for optimization in the form of internal rearrangement of the operations.

Other examples of optimization include removal of certain flags used in x86 instructions. This is perhaps best understood by way of an example. Arithmetic operations (such as addition), logical operations, and the like, produce flags, for example, carry flags, overflow flags, zero flags, and other types of flags. These flags are used as input to a next operation, which may be another arithmetic operation or are used as input to control transfer instructions, such as branch and conditional branch. The part of the result of such operations that appears in the form of a flag is not always needed because the flag of a next operation essentially overrides a previous flag. For operations where the flags are not used, such flags are advantageously removed by the builder circuit 36 even though the instruction code might include the use of such flags, which essentially removes unnecessary dependencies among instructions.

A multi-block trace is a trace that is built from one or more basic block traces or one or more multi-block traces or a combination thereof. A basic block trace is promoted into a multi-block trace for various reasons, one of which is the number of times a basic block trace has been executed. A multi-block trace represents the first portion of the sequence of instructions, as does a basic block trace however, a multi-block trace is further optimized and allowed to continue past a control transfer instruction. That is, a multi-block trace combines at least two traces by continuing past control transfer instructions. Thus, the trace unit 12 optimizes across a control transfer instruction whereas known prior art methods of optimization, such as software compilers, are generally incapable of optimizing across conditional control transfer instructions because they are ignorant as to which way the branch instruction will go.

The sequencer circuit 29 is responsive to decoder traces, basic block traces, multi-block traces and microcode traces. The sequencer circuit 29 is accordingly coupled to the decoder circuit 18, for receiving decoder traces, to the basic block cache circuit 22, for receiving basic block traces, to the multi-block cache circuit 26, for receiving multi-block traces, and to the microcode cache circuit 24, for receiving microcode traces. The sequencer circuit 29, with collaboration from the branch predictor circuit 30, generates and provides the source and location of traces to the sequence buffer circuit 32. The sequence buffer circuit 32 stores the source and location of traces generated by the sequencer circuit 29, and ultimately provides the generated source and location to the operations fetcher circuit 28. The operations fetcher circuit 28, after receiving the source and location of the trace from the sequence buffer circuit 32, uses this information to select a source for the next sequence of operations (or trace). More specifically, the information is used by the operations fetcher circuit to identify which of the four types of traces is to be provided to the execution unit 14.

The hardware described above, including any logic or transistor circuit, may be generated automatically by computer based on a description of the hardware expressed in the syntax and the semantics of a hardware description language, as known by those skilled in the art. Applicable hardware description languages include those provided at the layout, circuit netlist, register transfer, and schematic capture levels. Examples of hardware description languages include GDS II and OASIS (layout level), various SPICE languages and IBIS (circuit netlist level), Verilog and VHDL (register transfer level) and Virtuoso custom design language and Design Architecture-IC custom design language (schematic capture level). The hardware description may also be used, for example, in various behavior, logic and circuit modeling and simulation purposes.

Figure 4:
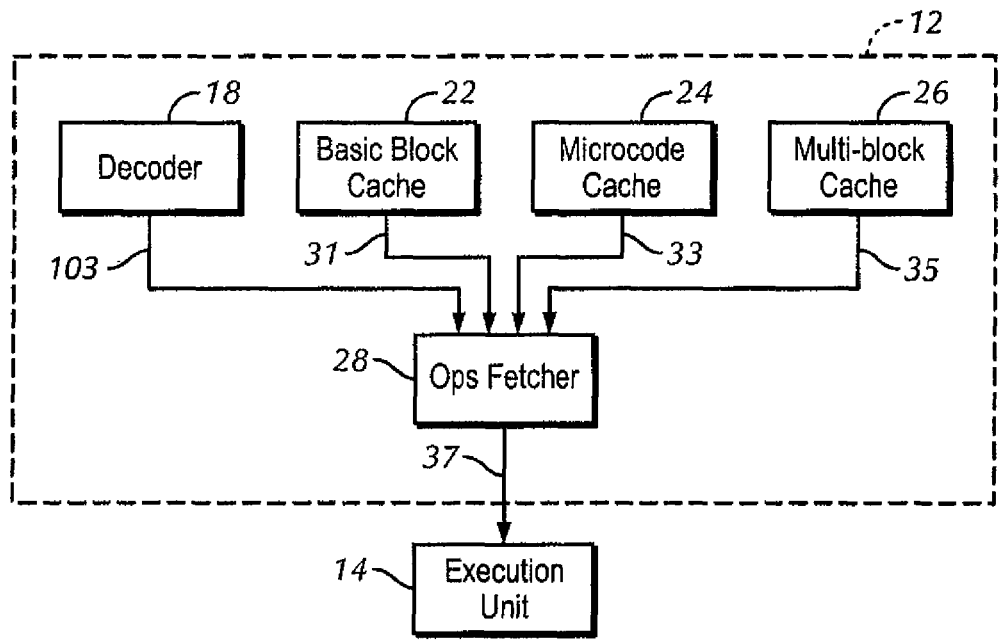
FIG. 4 shows the overall flow of the four types of traces to the execution unit 14, in accordance with an embodiment of the present invention.

FIG. 4 shows the overall flow of the four types of traces to the execution unit 14, in accordance with an embodiment of the present invention. As shown in FIG. 4, the operations fetcher circuit 28 is operable to receive the four types of traces, i.e. decoder trace 103, basic block trace 31, multi-block trace 35 and microcode trace 33, from various sources. The microcode cache circuit 24 is shown to receive a microcode trace 47 from the externally-located memory controller. The microcode trace 47 is cached in the microcode cache circuit 24 and when it is accessed, it is provided as microcode trace 33. The decoder trace 103 is shown provided, by the decoder circuit 18, to the operations fetcher circuit 28. The basic block trace 31 is shown provided, by the basic block cache circuit 22, to the operations fetcher circuit 28. The multi-block trace 35 is shown provided, by the multi-block cache 26, to the operations fetcher circuit 28. The microcode trace is shown provided, by the microcode cache circuit 24, to the operations fetcher circuit 28. The operations fetcher circuit 28, as directed by the sequencer circuit 29, selects one of the four traces and provides the selected trace as the next trace to be executed by the execution unit 14.

Typically, the decoder circuit 18 decodes one instruction per clock cycle, although in certain cases, an instruction requires more than one clock cycle to be decoded.

The decoder circuit 18 receives a sequence of instructions from the instruction cache circuit 16 and decodes the same into a sequence of operations (or trace). In one embodiment of the present invention, the decoder circuit 18 is generally basic block boundary-aware. That is, it identifies the end of a basic block, in the sequence of instructions being decoded, by detecting a control transfer therein, which advantageously reduces the workload performed by the basic block builder circuit 20.

Alternatively, the decoder circuit 18 is unaware of basic block boundaries and merely decodes instructions into operations. The end of a basic block is typically identified by the first control transfer encountered in the sequence of instructions, however, in some cases, no control transfer ends the basic block, and rather, the basic block boundary is defined by a predetermined capacity constraint. Capacity constraint refers to a predetermined or capacity threshold number of operations that are allowed to be included in a trace, which is a design choice. The capacity threshold is determined based on typical basic block trace length (size) and cache efficiency.

In an embodiment of the present invention, where the decoder circuit 18 is unaware of basic block boundaries, a pre-scanning circuit (not shown) that only knows how to determine a basic block, is employed. Yet alternatively, the output of the decoder circuit 18 is coupled to a circuit (not shown) operative to partition the sequence of decoded instructions into basic blocks.

The decoder trace, after having been generated by the decoder circuit 18, is provided to the sequencer circuit 29 for determining the source of the next sequence of operations, as needed by the operations fetcher circuit 28. The sequencer circuit 29 determines the source of the next sequence of operations in collaboration with the branch predictor circuit 30, which will be further discussed relative to a subsequent figure.

During the building of a multi-block trace, the sequencer circuit 29 provides promotion information, or 'bias', to the multi-block builder 34. In an exemplary embodiment of the present invention, bias is represented in the form of a flag.

Figure 5:
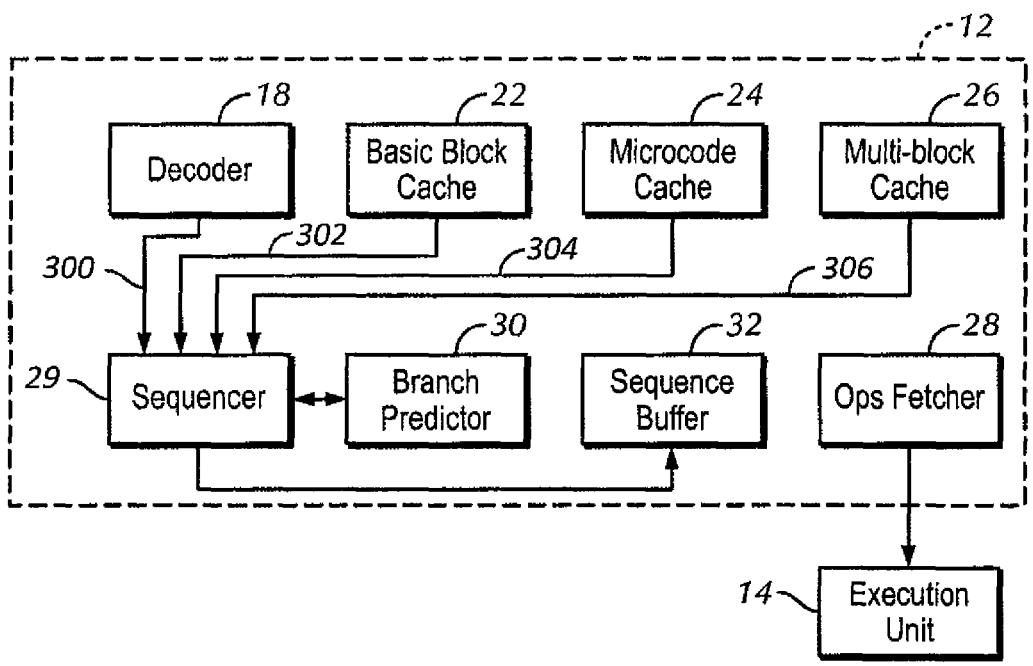
FIG. 5 shows sequencing information used by the sequencer circuit 29 in determining the next trace to be executed by the executed unit 14, in accordance with an embodiment of the present invention.

FIG. 5 shows sequencing information used by the sequencer circuit 29 in determining the next trace to be executed by the executed unit 14, in accordance with an embodiment of the present invention. The decoder circuit 18 is shown to provide decoder trace sequencing information 300 to the sequencer circuit 29. The basic block cache circuit 22 is shown to provide basic block trace sequencing information 302 to the sequencer circuit 29. The multi-block cache circuit 26 is shown to provide multi-block trace sequencing information 306 to the sequencer circuit 29 and the microcode cache circuit 24 is shown to provide microcode trace sequencing information 304 to the sequencer circuit 29.

The sequencing information 300-306 are each included in their respective trace and cached in their respective cache circuits, if appropriate. For example, the sequencing information 302 is cached in the basic block cache circuit 22 and the sequencing information 306 is cached in the multi-block cache circuit 26 and the sequencing information 304 is cached in the microcode cache circuit 24. However, the sequencing information 300 is not cached. Further details regarding the sequencing information is presented relative to subsequent figures.

Figure 6:
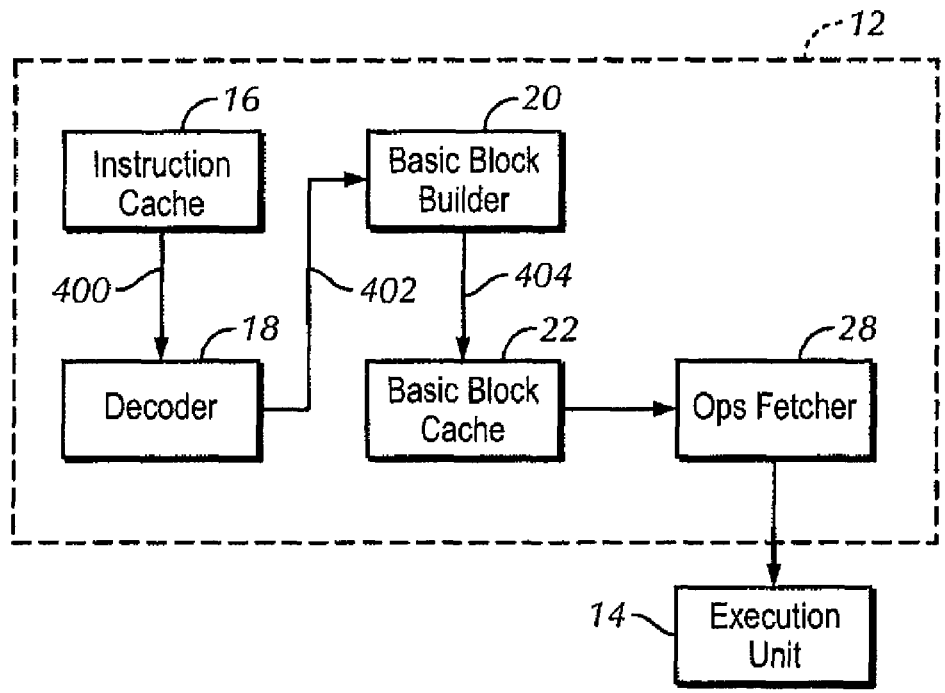
FIGS. 6-9 show different trace and instruction flows for different functions performed by the trace unit 12, in accordance with an embodiment of the present invention.

FIGS. 6-9 show different trace and instruction flows for different functions performed by the trace unit 12, in accordance with an embodiment of the present invention. In FIG. 6, a basic block is built when a sequence of instructions 400 is provided to the decoder circuit 18 by the instruction cache 16. The decoder circuit 18 decodes the sequence of instructions 400 into a sequence of operations 402. The sequence of instructions 400 ends with a control transfer instruction. The control transfer instruction that ends the sequence of instructions 400 is either the last instruction of the sequence of instructions 400 or is an indicator of the end of the sequence of instructions 400 in which case it is not included in the sequence of instructions 400 as an instruction. If the trace builder 29 is sequencing ahead and the basic block builder 20 is busy building traces, there is a wait period for the next trace.

Alternatively, the sequence of instructions 400 ends due to a predetermined capacity constraint. A basic block trace may be limited in size, i.e. a certain number of operations, due to the size of the cache circuit being used. The width of an entry of a cache circuit is a factor used in defining the capacity constraint. The number of operation triplets is the "width" of the entry of a cache circuit. Operation triplets, as will be further discussed later, result from dividing a sequence of operations into triplet so that they may be efficiently executed, substantially in parallel, by the execution unit 14.

Referring still to FIG. 6, the basic block builder 20 builds the trace 404 which is stored in the basic block cache circuit 22.

Figure 7:
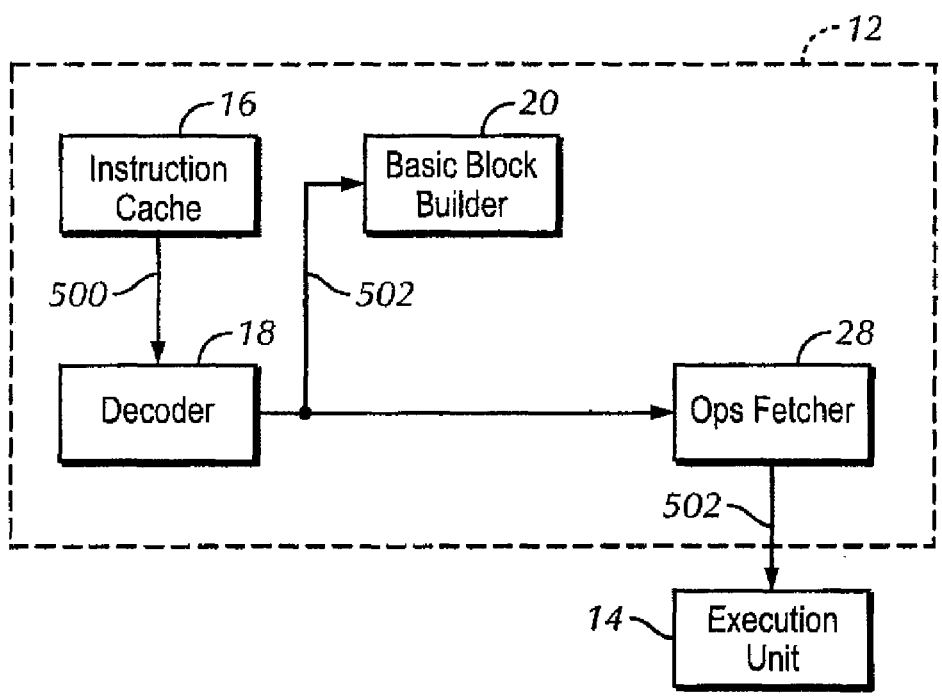

FIG. 7 shows the flow of traces 502 and instructions 500 during bypass mode and building a basic block trace. Bypass mode occurs when a trace to be executed is not 'hit' or found in any of the cache circuits and the next trace to be executed is then the decoder trace with little to no optimization. In bypass mode, even when the basic block builder 20 is busy, there is advantageously no waiting period for the next trace, unlike in non-bypass, FIG. 6, where there is a waiting period.

In FIG. 7, the decoder circuit 18 is shown to provide a decoder trace 502 to the basic block builder 20 as well as to the operations fetcher circuit 28. The operations fetcher circuit 28 then provides the decoder trace 502 to the execution unit 14 for execution thereof. The decoder circuit 18 also provides the decoder trace 502 to the basic block builder 20 so that the latter can start to work on building a basic block trace based on, at least a portion, of the decoder trace 502 if the basic block builder 20 is not busy. The portion of the sequence of operations is that portion of the sequence of operations that is based on the sequence of instructions whose end is determined essentially by a control transfer or capacity constraint, defines a basic block boundary. By building and caching a basic block trace, the next time the same basic block trace is used, it is substantially immediately available to the execution unit 14, thereby increasing the performance of the trace unit 12.

Alternatively, when in bypass mode, a basic block trace is not built and the decoder circuit 18 does not provide the decoder trace 502 to the basic block builder 20, which results in operations being provided to the execution unit 14 sooner thereby decreasing latency.

Figure 8:
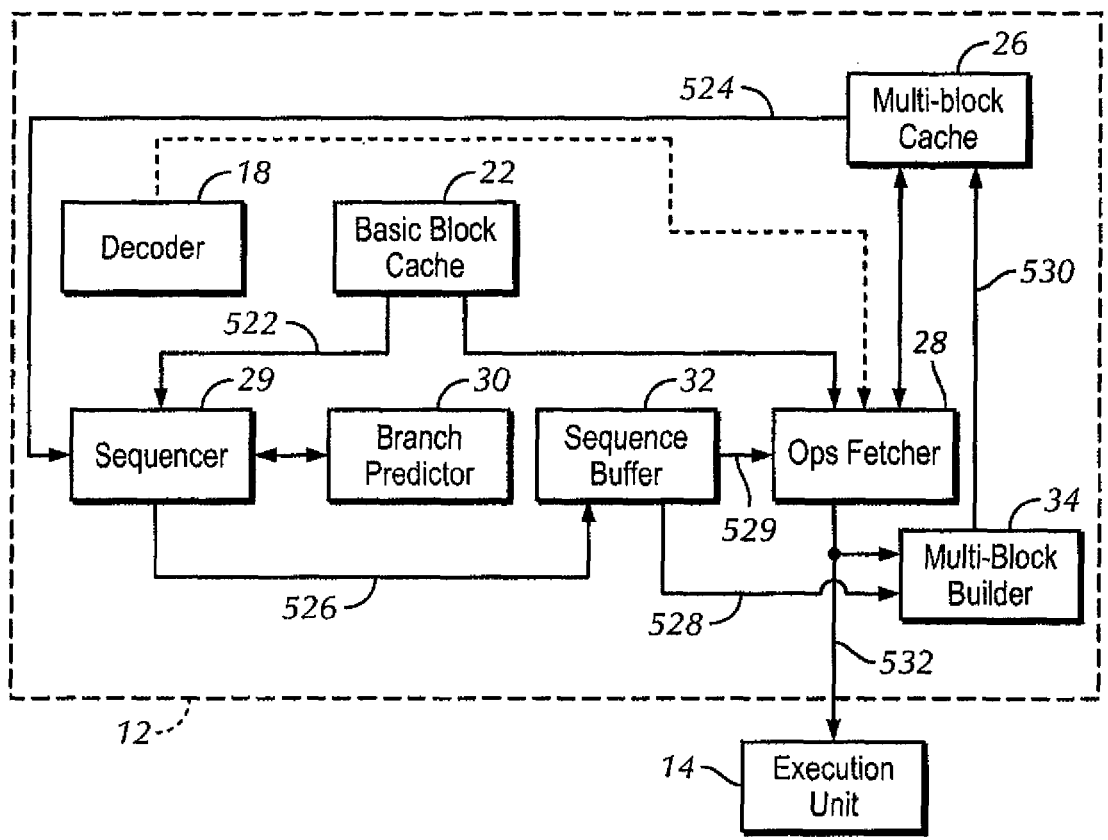

FIG. 8 shows the flow of traces during building a multi-block trace. In the case where the multi-block trace being built includes at least one basic block trace, basic block trace 522, which includes sequencing and promotion information related thereto, is retrieved from the basic block cache circuit 22 by the sequencer circuit 29. In the case where the multi-block trace being built includes more than one basic block trace, multiple basic block traces, which include related sequencing and promotion information, are retrieved from the basic block cache 22. In the case where the multi-block trace being built includes at least one previously-built multi-block trace 524, which include sequencing and promotion information related thereto, is retrieved, by the sequencer circuit 29, from the multi-block cache circuit 26.

Next, the sequencer circuit 29 provides the traces that are potential candidates making up a multi-block trace to be built, including their corresponding trace address(es) and promotion information 526, to the sequence buffer circuit 32 for storage therein. The sequence buffer circuit 32 provides trace address 529 to the operations fetcher circuit 28. The trace address 529 identifies the location of a corresponding trace within its respective cache circuit.

The stored traces 528 are transferred from the sequencing buffer 32 and the operations fetcher circuit 28 to the multi-block builder circuit 34. Upon building of the multi-block trace 530, using the stored traces 528, the built multi-block trace is provided to the multi-block cache 26 for caching thereof. Within the cached multi-block trace, there is included instruction mode and other trace-related information discussed in further detail relative to the contents of the cache circuits. Once stored in the cache circuit 26, the built multi-block trace is fetched upon a 'hit' of the cache circuit 26, i.e. finding of the multi-block trace that is believed to be sequenced, retrieved by the operations fetcher circuit 28, and provided as the next sequence of operations to be executed 532, to the execution by the execution unit 14.

A multi-block trace is generally a combination of at least two traces, which are basic block traces, multi-block traces or a combination thereof. An exemplary multi-block trace includes operation(s) that represent at least one interior control transfer, a final control transfer or both or neither. The interior control transfers are generally assertions based on predicted results. The final control transfer ends a multi-block trace. In the case where a basic block trace that is included in a multi-block trace is found to be invalid, the entire build is aborted. An example of this is when the instruction mode that was used to build a basic block trace that is included in a multi-block trace is found to be different than the instruction mode used to build the rest of the multi-block trace in which case the basic block and the multi-block builds are aborted at sequencing time.

In one embodiment of the present invention, to find the next trace to be executed, the sequencer circuit 29 first tries to search the multi-block cache 26 and if there is no 'hit', it then tries the basic block cache circuit 22 and if there is no 'hit', the decoder trace is provided to the execution unit 14. Upon a 'hit' of a multi-block trace within the multi-block cache circuit 26, the multi-block trace is fetched and provided to the execution unit 14. Similarly, upon a 'hit' of a basic block trace within the basic block cache circuit 22, the basic block trace is fetched and provided to the execution unit 14.

Alternatively, in addition to building multi-block traces from basic block and/or multi-block traces, the multi-block builder circuit 34 can also build a multi-block trace from the decoder traces (retrieved through the operations fetcher circuit 28, which retrieves the decoder traces from the decoder circuit 18).

The operations of a trace, as stored in a cache circuit, are stored as "triplet", or sets of three operations with each operation of the set beting processed by an independent unit within a superscalar execution unit 14. Execution unit 14 is generally replicated multiple times in a superscalar execution unit so that all execution units therein operate in parallel and independent of one another to increase execution speed. In the case where triplets are employed each of the operations is executed or operated on by one of the multiple execution units and there are three execution units, each for executing an operation. Alternatively, a different number of operations comprises the "oplets" or number of operations and the number of "oplets" is based on the number of execution units in the superscalar execution unit (or the width thereof).

Figure 9:
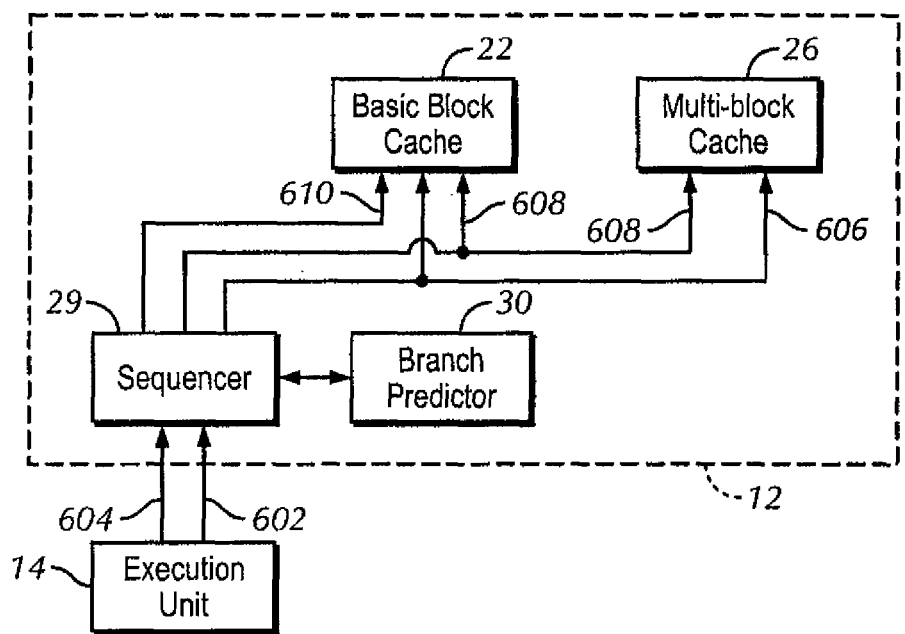

FIG. 9 shows the flow of traces from the execution unit 14 to the trace unit 12. Feedback from the execution unit 14 is used by the trace unit 12 to update information regarding traces, such as aborting, invalidating or committing a trace.

In FIG. 9, the execution unit 14 is shown to provide trace commit information 602 to the sequencer circuit 29. The trace commit information 602 is an indicator of successful executions of the operations within the trace by the execution unit 14, in which case, the sequencer circuit 29 updates the bias, which keeps track of the number of times the trace has been executed. Upon receiving the trace commit information 602, the sequencer circuit 29 performs certain functions, such as freeing checkpoints.

Promotion threshold is programmably alterable to adjust the sequencing of trace to the environment in which the processor core 10 is being used. For example, in the case where the environment is one where too many mis-predictions occur, the promotion threshold is increased to more selectively build traces. An example of a mis-prediction is when the interior control transfer indicates a branch that is erroneously taken. In the case where not enough traces are built, as reflected in the lack of efficient utilization of the cache circuits, promotion threshold is decreased allowing for more traces to be sequenced. This might occur after power-up of the processor core 10. A basic block trace is promoted to a multi-block trace when its bias meets or exceeds a threshold (or predetermined) value, as reflected by its bias.

The execution unit 14 additionally provides trace abort information 604 to the sequencer circuit 29. The trace abort information 604 is used to invalidate a trace or stop the trace from being built. Upon the invalidation of a trace, the sequencer circuit 29 provides information regarding invalidation of the trace to the basic block cache circuit 22 and the multi-block cache circuit 26, and performs cleanup.

For example, in the case where a trace is being aborted or invalidated, the execution history information 606, in the multi-block cache circuit 26 and the basic block cache circuit 22 is accordingly updated. The execution history information 606 is stored in the execution history information component 1002 of the cache circuit, as will be later shown. In the case where a basic block is invalidated, the sequencer circuit 29 transmits an invalidate trace command 608 to the basic block cache and multi-block cache circuits 22 and 26.

In one embodiment of the present invention, aborting a trace does not cause invalidation of a trace in the corresponding cache circuit. For example, aborting a multi-block trace does not result in aborting basic block traces from which the aborted multi-block trace was built. The basic block traces or any of them however, will be aborted due to a problem with one or more operations therein. When a final branch mis-prediction is detected, the trace which includes the mis-prediction is committed, the next trace that was mis-predicted is aborted and the next trace down the correct path is sequenced. When an interior branch mis-prediction is detected, the multi-block trace including the mis-prediction is aborted and it is invalidated in the multi-block cache circuit 26. A trace having the same starting address as that of the multi-block trace with the mis-prediction is re-sequenced. When a problem with an operation in either a basic block or a multi-block trace is detected, the trace is aborted and re-sequenced and invalidated in its corresponding cache circuit.

In yet another embodiment of the present invention, where a multi-block trace is being invalidated, a basic block trace that is included in the multi-block trace may or may not be invalidated in the basic block cache circuit 22.

The sequencer circuit 29 provides an indirect branch target address 610, which is used the first time an indirect branch instruction is encountered, to report the target address (or pointer) used during execution. The target address or target address pointer of a trace is stored in a target address (TA) field, as sequencing information, of an auxiliary information component that is associated with the trace, in a corresponding cache circuit. This is done the first time an indirect branch is detected and executed. If later executions on the indirect branch are also mis-predicted, the correct alternate target addresses are stored in the circuit 57 of FIG. 3(*a*).

A multi-block trace must be built using the same instruction mode as that which was used during decoding of instructions included in the multi-block trace being built. Therefore, any basic block traces that are included in the multi-block necessary have been built using the same instruction mode, otherwise, the multi-block build is aborted.

Referring to FIG. 10, further details of the branch predictor circuit 30 are shown to include a branch predictor history circuit 800, a conditional branch predictor circuit 802, an indirect branch predictor circuit 804, and a call return stack predictor circuit 806, in accordance with an embodiment of the present invention. In one embodiment of the present invention, the indirect branch predictor circuit 804 is the same as the indirect branch predictor circuit 51.

The branch predictor history circuit 800 generally maintains the outcome of the last N number of branches, N being an integer value. This information is then used by the conditional branch predictor circuit 802 and the indirect branch predictor circuit 804.

The conditional branch predictor circuit 802 generally predicts the possible target addresses resulting from a conditional branch operation, which are stored as alternate target addresses in the locations 57 (of FIG. 3(*a*)). As previously noted with respect to FIG. 3(*a*), the sequencer circuit 29, during sequencing, the sequencer circuit 29 causes use of the target address selected by the branch predictor circuit 30.

In alternative embodiment of the present invention, multiple possible traces are generated for each possible target address and sequenced. Obviously only one of the possible traces is ultimately executed by the execution unit 14. There are variations on this theme in that the sequencer circuit 29 optionally chooses to only keep one of the possible traces hoping that that is the trace that is ultimately executed, i.e. the prediction is correct. Obviously, this degrades performance because predictions are not always correct, in which case, the sequencer circuit 29 has to then go back to sequencing another trace with another prediction.

In a high performance environment, the sequencer circuit 29 advantageously causes the branch prediction circuit 30 to predict all possible prediction outcomes and thereafter caches the same but ultimately only one of these possible predictions is provided to the execution unit 14. A high performance environment requires greater power consumption.

In the case where the environment is not one of high performance and power savings is more vital, the sequencer circuit 29 causes the branch predictor circuit 30 to produce only one or less than the number of possible predictions. In this scenario, power consumption advantages are realized. Examples of some of the above-noted scenarios will be shown and discussed shortly.

Referring still to FIG. 10, an example of a conditional branch is shown by an exploded view of the branch predictor history circuit 800. When a trace 808, having a conditional branch instruction incorporated therein, is encountered, in one embodiment of the present invention, the conditional branch predictor circuit 802, in a high power, high performance environment, is caused to select between two possible addresses, which are each included in a trace, i.e. one is to trace 812 and other is to trace 810. The trace 812 is the next address to be sequenced if the branch is not taken and the trace 810 is the next address to be sequenced if the branch is taken. When the branch is not taken, the next address to be sequenced is essentially the sequential address (or SA). Sequencing actions are actions taken to sequence the next trace and conditional branch, however, there are other types of sequencing actions that are frequently used to alter instruction or trace flow, which will be enumerated and discussed relative to cache circuits.

In the alternative embodiment where the two possible traces are built, one of the two built traces 810 and 812 is executed and the other that remains unexecuted is invalidated. In an alternative embodiment of the present invention, where the size of the cache circuit is less important, both traces may be kept.

The indirect branch predictor circuit 804 predicts multiple target addresses based on the possible outcomes of an indirect branch instruction. An example of an indirect branch is shown by an exploded view of the indirect branch predictor circuit 804. When a trace 814, having a indirect branch instruction incorporated therein is encountered, in one embodiment of the present invention, the indirect branch predictor circuit

804, in a high power, high performance environment, is caused to 816, another is in the trace 818, yet another is in the trace 820.

Each of the traces 816-820 includes a possible target address that depends on the outcome of the indirect branch. Because at the time of building a trace, information regarding which target address is executed is yet unavailable to the sequencer circuit 29, all traces 816-820 are built and stored in a respective cache for possible use by the execution unit 14. The execution unit 14 communicates back to the sequencer circuit 29 information regarding which target address is executed and then the sequencer circuit 29 generates the indirect branch target address for initial execution 610 to the basic block cache 22 and the sequencer circuit 29 then proceeds to invalidate the trace(s) with mis-predicted target addresses to make available cache space.

In one embodiment of the present invention, when one of the traces 816, 818 or 820 is executed, the remaining unexecuted traces are invalidated. In an alternative embodiment where the size of the cache is less important, all traces may be kept.

In FIG. 10, the call return stack predictor circuit 806 operates substantially similarly to the indirect branch predictor circuit 804 in that the call or return are always taken and there is no-branch-not-taken possibility as in the case of the conditional branch predictor circuit 802. However, target addresses of a call and return could be many different addresses. When a call or a return instruction is encountered, the call or branch is considered taken. There is no conditional call. Calls are indirect or relative. If the call is relative, it is going to the same address every time.

An indirect call can have multiple target addresses, substantially like an indirect branch instruction. When an indirect call is encountered, the indirect branch predictor circuit 804 is used because it is basically an indirect branch. Returns generally yield high prediction accuracies because from what location the return came from is generally known, thus, lending to a more accurate prediction of where to go back to when returning. No conditional returns are possible in x86 instructions.

In a high power, high performance environment, all three predictor circuits 802-806 operate in parallel. Thus, when the sequencer circuit 29 is sequencing a particular trace, it requests that all three predictor circuits 802-806 provide what each has predicted to be the next target address, i.e. the predicted target address. When the sequencer circuit 29 is sequencing the particular trace, it is unaware of what the next sequencing action is, or where it is coming from and therefore asks all three predictor circuits. As an example, the sequencer circuit 29 asks the indirect branch predictor circuit that assuming the sequencing action to be an indirect branch, what would the target address(es) be and at the same time, it asks the conditional branch predictor 802 that assuming the sequencing action to be a conditional branch, to predict if the branch is taken or not.

The sequencer circuit 29 also requests of the call return stack predictor circuit 806 that assuming the sequencing action to be a 'return', what would be the return address (or target return address). All three prediction circuits 802-806 respond to the sequencer circuit 29 with their respective responses. The sequencer circuit 29 then determines the actual sequencing action and chooses the appropriate response accordingly. This effectively increases the speed of processing of the sequencing action because if there is a wait time associated with determining exactly what type of control transfer is used upon which the sequencing action is based, then the prediction is delayed.

An example of the foregoing, high performance approach to prediction is presented in Table 1.

TABLE I

|  | Time Unit | | |
| --- | --- | --- | --- |
|  | 1 | 2 | 3 |
| Sequencer | x | x | x |
| Conditional Branch Predictor | x | x | x |
| Indirect Branch Predictor | x | x | x |
| Call Return Stack | x | x | x |

Table 1 shows a three-time unit sequencing with the predictor circuits 802-806 all predicting in parallel (or simultaneously). In a power saving (or low power, low performance) mode, less than all three prediction circuits 802-806 predict.

TABLE 2

|  | Time Unit | | |
| --- | --- | --- | --- |
|  | 1 | 2 | 3 |
| Sequencer | x |  | x |
| Conditional Branch Predictor |  | x |  |
| Indirect Branch Predictor |  |  |  |
| Call Return Stack |  |  |  |

An example thereof is provided in Table 2 where the conditional branch predictor circuit 802 is the only prediction circuit predicting because the sequenced trace was determined to have a conditional branch sequencing type. Any of the other prediction circuits can be predicting in place of the prediction circuit 802 although conditional branches are the most common type of control transfer experienced. The sequencing action embedded in a trace generally is determinative of which prediction circuit is activated. Alternatively, any combination of the prediction circuits may be predicting thereby yielding different power consumption rates.

FIG. 10(*a*) shows, in flow chart form, the steps 100 performed, by the sequencer circuit 29, when sequencing a current trace. A current trace is a trace that is being currently sequenced.

At step 105, the sequencing operation of the current trace starts. Next, at step 102, the operation, within the current trace, that represents the first instruction of the sequence of instructions corresponding to the current trace is used as the trace address to find a matching address in the basic block or multi-block cache circuits 22 and 26. A trace address is the address of the first instruction appearing in the trace. This is done to essentially locate the current trace in either of the basic block or multi-block cache circuits.

At 104, a determination is made as to whether or not the current trace is found in either of the basic block or multi-block cache circuits. If the current trace is determined to have been located in the multi-block cache circuit 26, the process continues to 108 where trace verification is performed and the found trace is verified, or not. Trace verification is discussed in further detail with respect to subsequence figures. If the trace is not successfully verified, the trace found in the multi-block cache circuit 26 is invalidated at step 114.

On the other hand, if the found trace is successfully verified, the process continues to step 130 where a flag is entered into the sequence buffer 32 indicating whether or not the current trace's final branch is predictable enough to promote the found trace into a new multi-block trace. Next, at step 132, the found multi-block trace is entered in the sequencing buffer 32. Next, step 122 is performed where a determination is made as to which trace is the next trace to be sequenced based on the sequencing information included within the current trace and the result(s) produced by the branch predictor circuit 30.

If at 104, the current trace is found in the basic block cache circuit 22 but not the multi-block cache circuit, the process continues to 110 where the found basic block trace is verified and if unsuccessfully verified, the process continues to the step 112 where the found basic block trace is invalidated in the basic block cache circuit 22. If the found basic block trace is successfully validated at step 110, the process continues to step 120.

At step 120, the sequencing buffer 32 is flagged with whether or not the final branch of the current trace, as evidenced by a representation of the final control transfer instruction, is predictable enough to promote the current trace. That is, a promotion flag indicative of the promotion status of the current trace is stored in the sequencing buffer 32. Next, at step 116, the basic block trace is entered into the sequencing buffer 32 and the process continues to and performs step 122.

After steps 114 and 112, the process returns to step 102 where the current trace is attempted to be found in the basic block or multi-block cache circuits again.

In the event no hit is detected of the cache circuits 22 and 26, i.e. the current trace is not found in either of the cache circuits, the process continues to step 106 from 104 where a decoder trace is formed by activating the decoder circuit 18, which decodes instructions starting from the current trace's starting address until a capacity constraint or a representation of a control transfer instruction is detected, either of which denotes the end of the decoder trace. After the step 106, at 118, a determination is made as to whether or not the sequencing operation is far enough ahead of the execution unit 14 to keep the latter busy and if the determination proves to be false, step 128 is performed. If the determination at 118 proves to be true, step 124 is performed.

At step 128, the bypass mode (or path) is activated followed by performance of the step 122.

If at 118, it is determined that the sequencing operation is far enough ahead of the execution unit 14 to keep the latter busy, step 106 is performed followed by the step 124. At step 106, a decoder trace is formed by activating the decoder circuit 18, which decodes instructions starting from the current trace's starting address until a capacity constraint or a representation of a control transfer instruction is detected, either of which denotes the end of the decoder trace.

After the step 106, at step 124, the sequencer circuit 29 instructs the basic block builder circuit 20 to build a new basic block trace. Next, at step 126, the newly-built basic block trace is entered into the sequencing buffer 32. Next, step 122 is performed.

After step 122, the sequencing of the current trace is complete and at step 134, the sequencer circuit 29 advances to sequencing of the next trace.

Figure 10A:
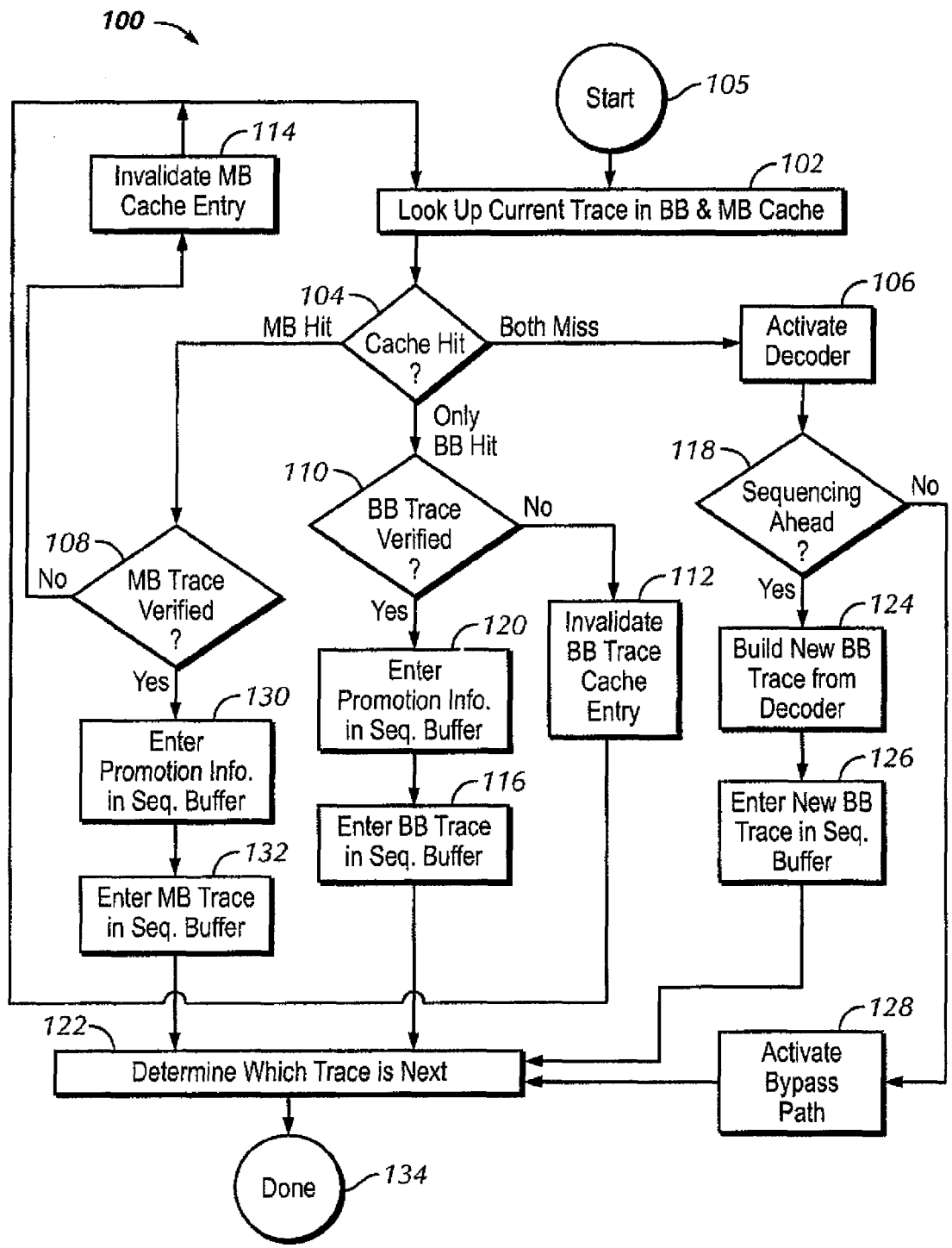
Figure 10B:
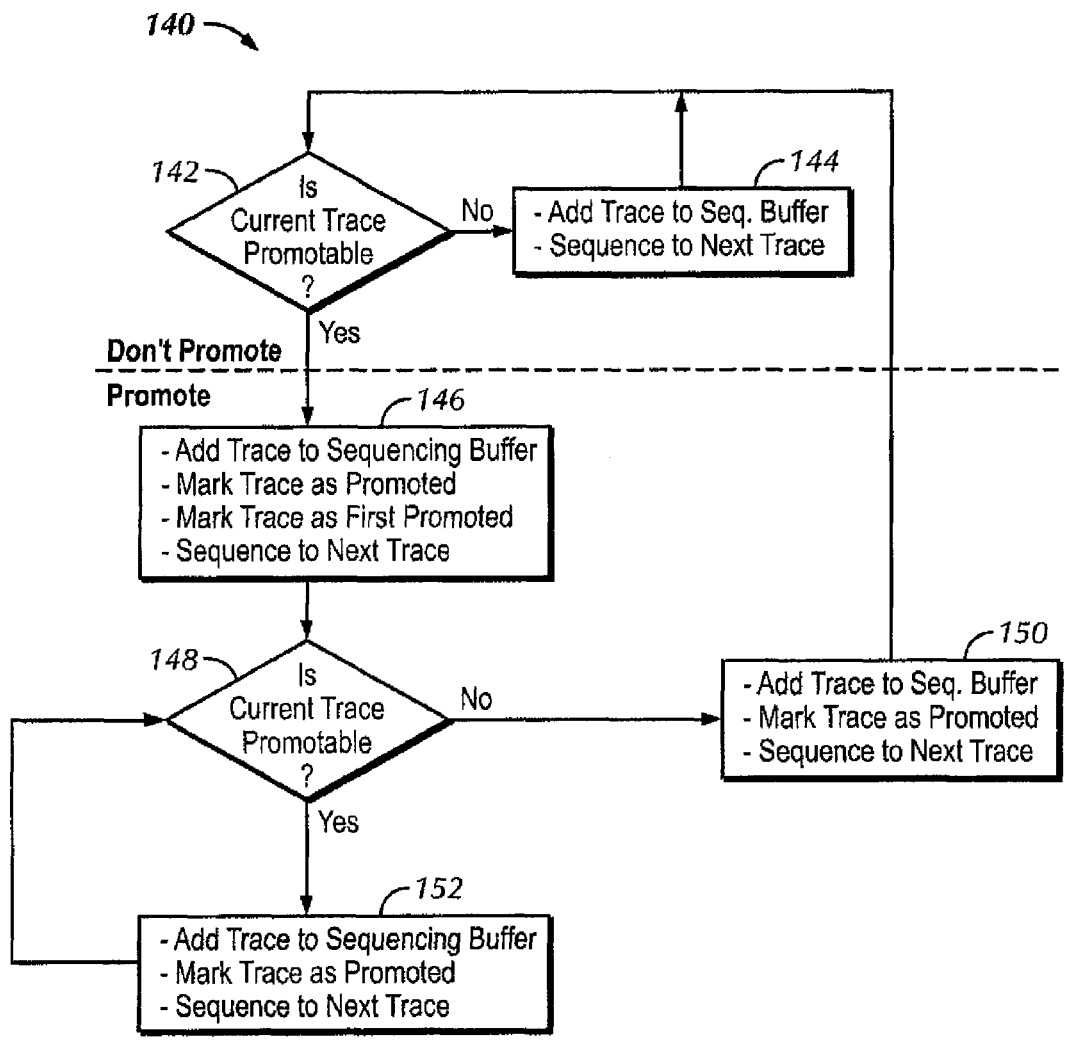

FIG. 10(b) shows a flow chart of the steps 140 performed by the sequencer circuit 29 in promoting traces. The steps 140 include steps 142-152, of which steps 142 and 148 corresponds to steps 130 or 120 of FIG. 10(a). Steps 146 and 152 of FIG. 10(b) corresponds to steps 132 or 116 of FIG. 10(a).

In FIG. 10(b), at step 142, a determination is made as to whether or not the current trace is promotable based on its bias. That is, if the bias of the current trace is equal to or greater than a promotion threshold, the process continues to step 146 and if not, the process continues to step 144 where the current trace is added to the sequencing buffer 32 (or the step 116 in FIG. 10(a) is executed) and the next trace is sequenced. Alternatively, the determination of the comparison of the bias to the promotion threshold may be made if the bias is less than the promotion threshold or less than or equal to the promotion threshold or greater than the promotion threshold.

If at 142, it is determined that the current address is promotable, promotion of the current trace occurs as follows. First, at step 146, the current trace is added to the sequencing buffer 32 and marked as promoted and further marked as the first trace of a potential multi-block trace built therefrom and the next trace is sequenced.

Next, at step 148, a determination is made as to whether or not a newly-arrived trace, which is now the current trace is promotable. The trace is added or entered into the sequence buffer 32 and marked as promoted, at step 152 if the trace is determined to be promoted, and if not, the trace is added to the sequence buffer 32, marked as promoted and the next trace is sequenced at step 150. At step 150, the current trace may not be marked as promotable under certain conditions, such as the trace being non-speculatively executed, in which case it is not marked as promoted in step 150. At step 152, the current trace is added to the sequence buffer 32 and marked as promoted and the next trace is sequenced.

It should be noted that while bias is one of the factors used to determine promotability, other factors may be employed, such as the trace being non-speculative, too many interior control transfer instructions and others.

Figure 10C:
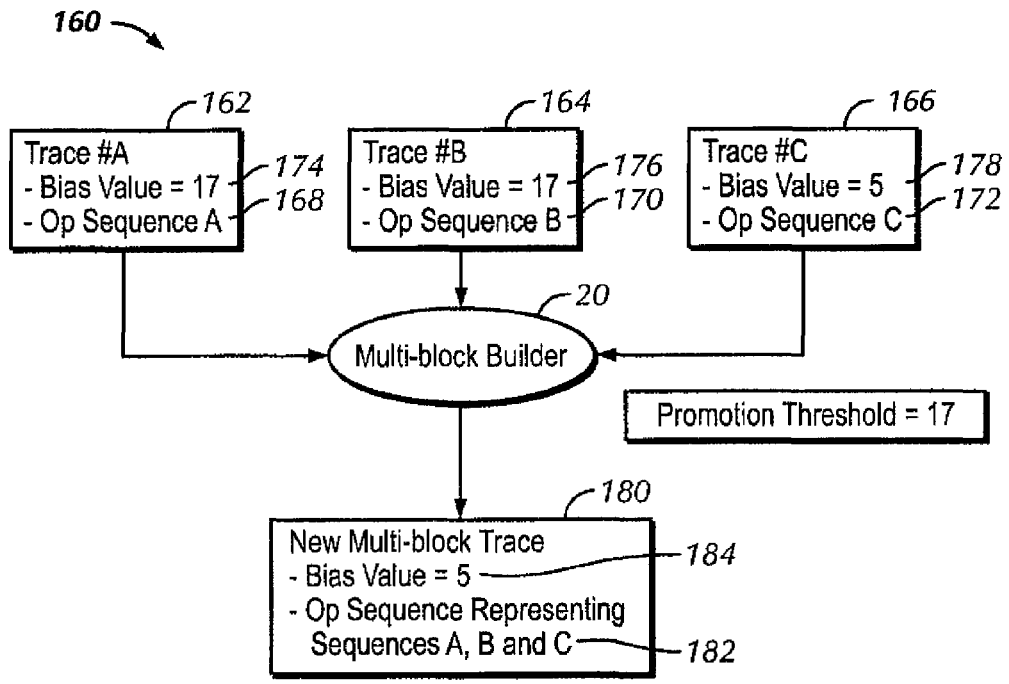

FIGS. 10(c) and (d) show examples of building multi-block trace. In FIG. 10(c), the example 160 shows a trace A 162, a trace B 164 and a trace C 166 that are combined to build the multi-block trace. The trace 162 is shown to include operation sequence A 168, the trace 164 is shown to include operation sequence B 170 and the trace 166 is shown to include the operation sequence C 172.

The trace 162 is further shown to include a bias 174, the trace 164 is further shown to include a bias 176, and the trace 166 is further shown to include a bias 178. The bias of traces 162 and 164 are each the value 17 and the bias of trace 166 is the value 5. The promotion threshold value is set to 17, thus, as the traces 162 and 164 have biases with values equal to the promotion threshold, i.e. 17, these traces are promoted but the trace 166, having a bias with a value less than 17 is not promoted; yet the latter is included in the built multi-block trace because the previously-promoted trace is used to determine the inclusion of the next trace in the built trace. The traces 162, 164 and 166 are thus retrieved by the multi-block builder circuit 20 (or the multi-block builder circuit 34) from the output of the operations fetcher circuit 28 and the former builds the new multi-block trace 180. Any of the traces 162, 164 or 166 may be a basic block trace or a multi-block trace. The trace 180 is shown to include an operation sequence ABC 182 that represents the sequences A, B and C of traces 162, 164 and 166, respectively, and a bias 184 with a value of 5, which prevents it from being promoted yet.

While the multi-block trace 180 is shown to have a bias 184 in FIG. 10(c), in some cases an initial bias is assigned to the bias 184, which may be a fixed (or static value) or a configurable alterable value.

Dynamic analysis refers to analyzing promotability and updating bias accordingly. Static analysis refers to fixing bias.

Figure 10D:
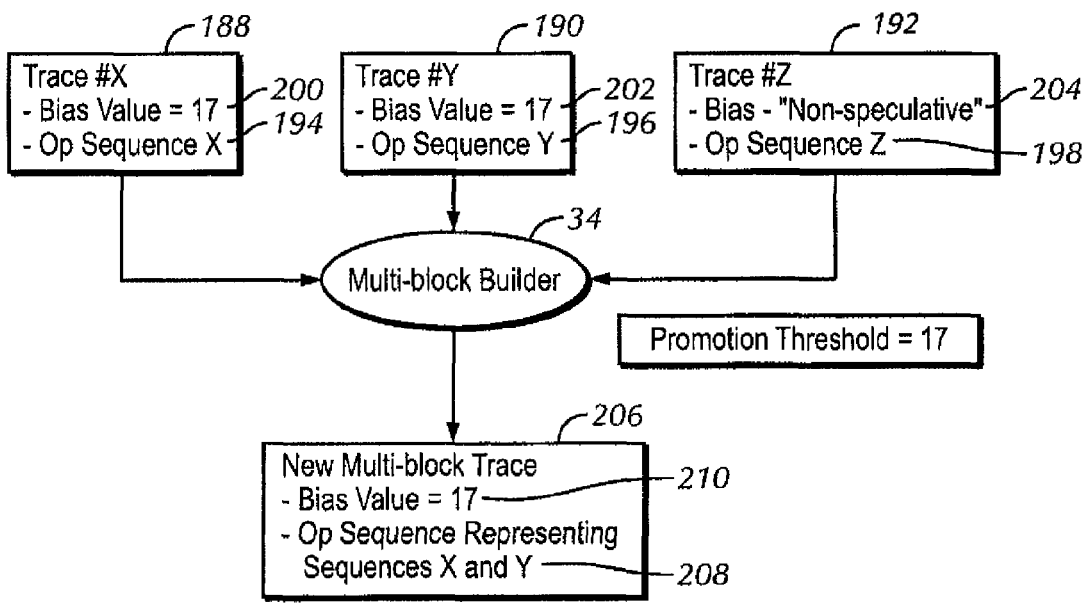
Figure 10E:
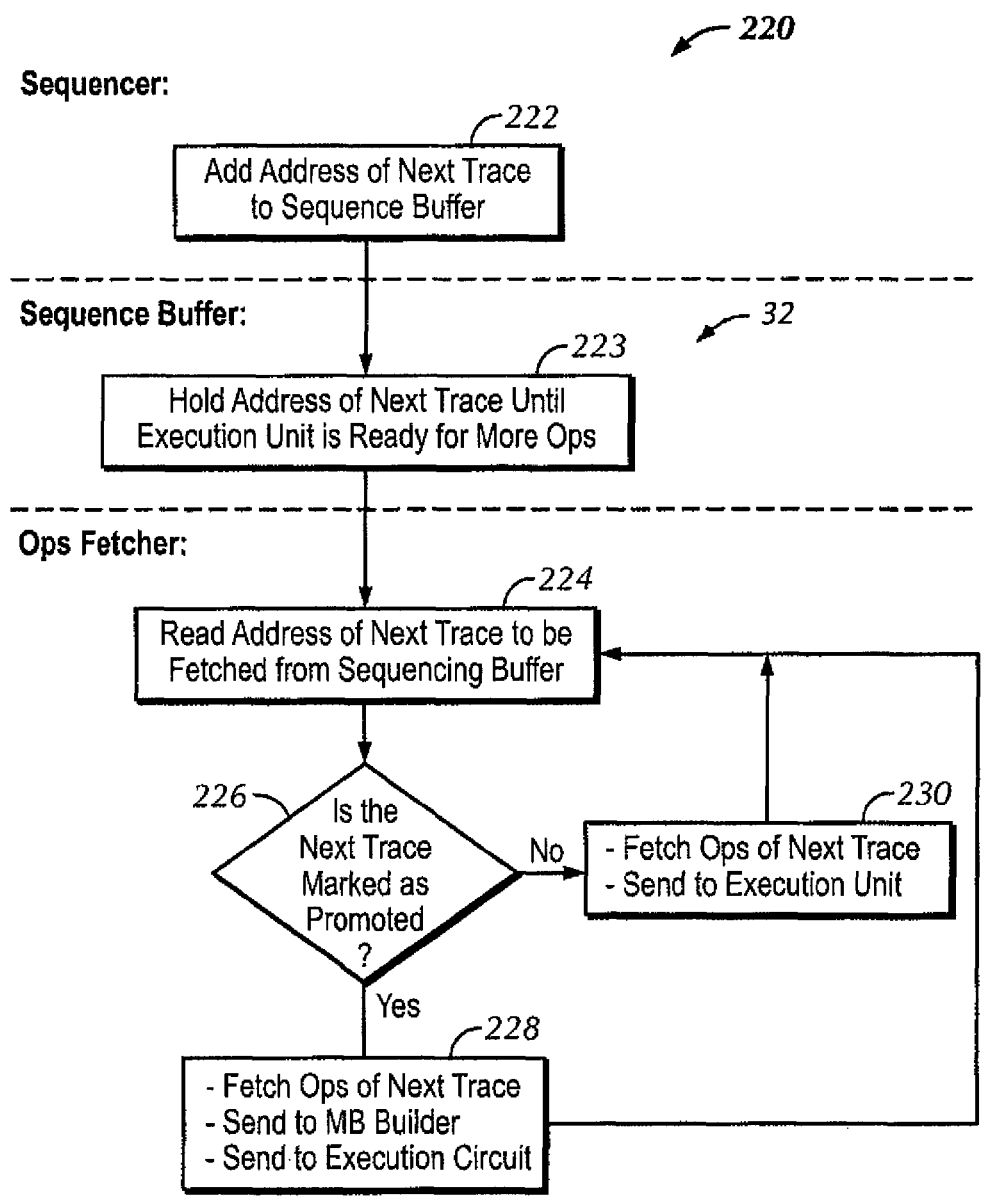
Figure 10F:
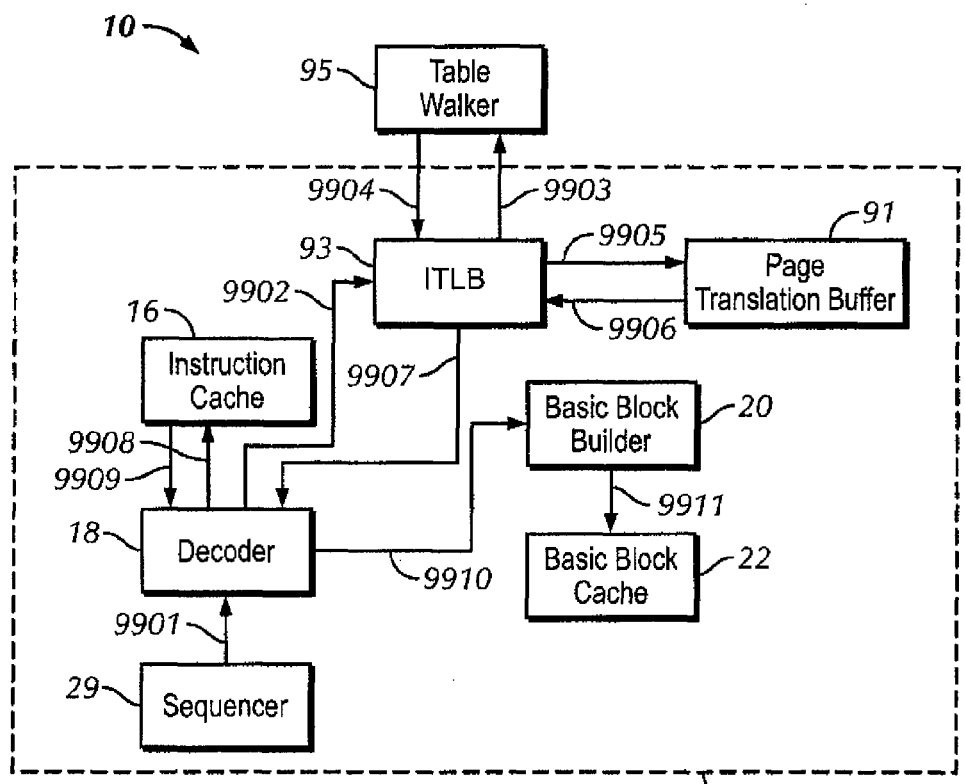
Figure 10G:
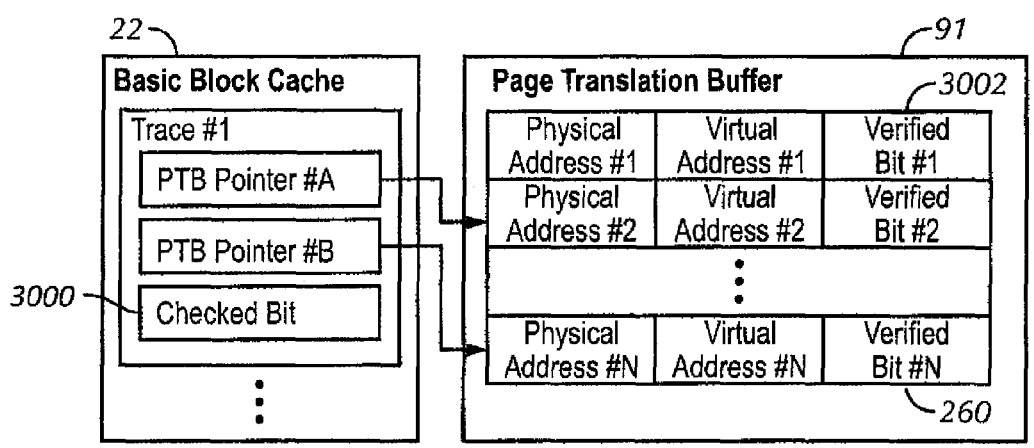
Figure 10H:
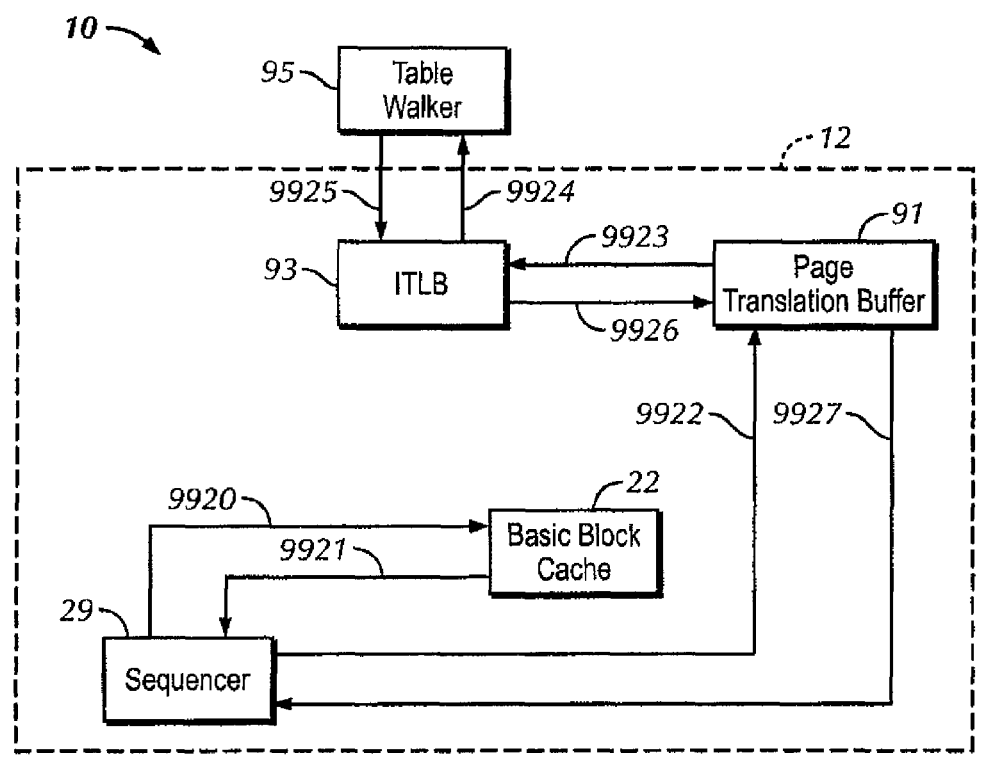
Figure 10I:
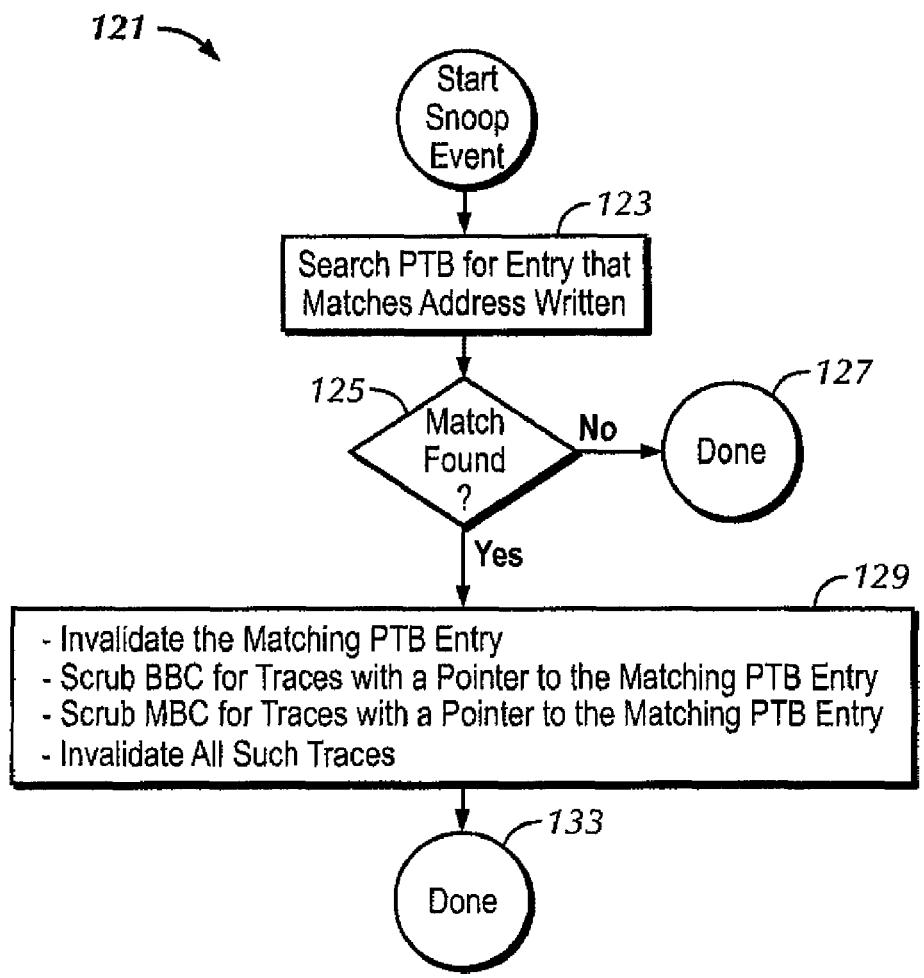

Referring now to FIG. 10(d), another example 186 of building a multi-block trace 206 is presented. In the example 186, trace X 188, trace Y 190 and trace Z 192 are potential candidates for building the trace 206 and the promotion threshold is set to 17, as in the example of FIG. 10(c). The trace 188 is shown to have a bias 200, which is set to 17 and the trace 190 is shown to include a bias 202, which is shown set to 17.

But the bias 204, of the trace 192, is a "non-speculative" flag indicating that the trace 192 is not to be promoted. The trace 188 is shown to include operation sequence X 194, the trace 190 is shown to include operation sequence Y 196, and the trace 192 is shown to include operation sequence Z 198.

The traces 188 and 190 are combined by the multi-block builder 34 to build the trace 206, which includes the operation sequence representing the sequences X and Y only, and not including the sequence Z of the trace 192 because the latter is not promotable and it has the certain condition referred to relative to the step 150 of FIG. 10(*b*). The bias 210 of the trace 206 is shown to be set to 17, nevertheless, it is not promoted and may or may not be promoted in the future, but it is stored in its corresponding cache circuit.

FIG. 10(*e*) shows a flow chart of the steps 220 performed by the sequencer circuit 29 and the operation fetcher circuit 28 for adding or entering a trace to the sequence buffer 32 and fetching operations to be sent to the execution unit 14.

In FIG. 10(*e*), the step 222 is performed, by the sequencer circuit 29, adding a trace to the sequence buffer 32. This step is the same as either of the steps 132 or 116 of FIG. 10(*a*). Next, the address of the added trace is held in the sequence buffer 32 until the execution unit 14 is ready for more operations. Next, the step 224 is performed by the operations fetcher circuit 28. Steps 224, 226, 228 and 230 are performed by the operations fetcher circuit 28. At step 224, the sequence buffer 32 is read for the address of the next trace to fetch. Next at 226, a determination is made as to whether or not the trace is marked as promoted and if so, the process continues to step 228 and if not, the process continues to step 230. At step 228, operations are fetched, by the operations fetcher circuit 28, and sent to the multi-block builder circuit 34 and to the execution unit 14 and the process then continues to the step 224.

If at 226, it is determined that the trace is not marked as being promoted, the process continues to step 230 where the operations fetcher circuit 28 fetches operations and sends the fetched operations to the execution unit 14 after which the process continues to step 224.

FIG. 10(*f*) shows a flow of information through various structures of the trace unit 12 in decoding instructions and building basic block traces. The sequencer circuit 29 provides a virtual address (VA) 9901 to the decoder circuit 18. The VA 9901 specifies the next instruction to be decoded into a decoder trace, which is also optionally built into a basic block trace.

Then the decoder circuit 18 provides request 9902 to the instruction translation look aside buffer (ITLB) 93. The ITLB 93 serves to translate VAs provided by the decoder circuit 18 to both the physical address (PA) that corresponds to the VA 9901 and, a pointer to the entry within table 260 within page translation buffer (PTB) 91 that contains this PA/VA pair. The ITLB 93 responds to the request 9902 by providing response 9905, which includes both the PA and the PTB pointer, to the PTB 91.

Sometimes, the ITLB 93 may or may not include the PA and PTB pointer information for response 9905, in which case the ITLB 93 may need to send request 9903 to the table walker 95. Request 9903 contains the VA from the decoder circuit 18. The TW 95 receives VAs, generated by the ITLB 93, and translates them to PAs. Response 9904 from the TW 95 to the ITLB 93 includes the corresponding PA.

Accordingly, the VA 9901 is provided to the ITLB 93 by the decoder circuit 18, the ITLB 93 translates the VA to a PA to be used by the PTB 91 and the decoder circuit 18. The generated PA is provided to the PTB 91 by the ITLB 93 and used to index a PTB table to obtain a corresponding VA. The PA generated by the ITLB 93 is provided as a pointer/index to the basic block builder circuit 20.

Similarly in some embodiments of the present invention and/or under operating conditions, the ITLB 93 may need to send request 9905 to the PTB 91. The VA in request 9903 and the corresponding PA in response 9904 (PANA pair) are included in request 9905. The PTB 91 includes a table, i.e. PTB table, for maintaining mapping of the PAs, which are for addressing instructions in the instruction cache circuit 16, to the VAs, which are used for sequencing and addressing both basic block traces and multi-block traces. The response 9906 from the PTB 91 includes a pointer to the specific entry within PTB table. The PTB table is held in the PTB 91 and is shown in FIG. 10(*g*). If the PTB table does not contain an entry for this PANA pair, then the PTB 91 creates such an entry.

After receiving the response 9907 from the ITLB 93, the decoder circuit 18 retrieves instructions from the instruction cache circuit 16 by providing the physical address (PA) to the latter. The PA provided by the decoder circuit 18 is used to identify an instruction in the instruction cache circuit 16. The instruction is then provided to the decoder circuit 18 for decoding thereof, thereby generating a decoder trace.

Some instruction sets, for example, the well known x86 instruction set, include instructions of variable length. Particularly in such instruction sets, a single instruction may span the boundary between two adjacent pages of virtual memory/ physical memory. Accordingly, in some embodiments of the present invention, the responses described above to a single VA may include either one or two PANA pairs and either one or two PTB pointers.

In some cases, trace verification is "distributed". That is, the verification process is performed by different subunits or components of the trace unit 12. For example, the PTB 91 and ITLB 93 are used in verifying validity of the page translations. The sequencer circuit 29 is used in verifying that the processor core's instruction mode is the same. In other cases, trace verification is "on demand". That is, the verified bit 3002 of the PTB 91 and the checked bit 3000 in a trace being verified are employed. These bits allow performing the verification process when indicated or "on demand" instead of every time a trace is sequenced.

The PTB pointer or pointers that the ITLB 93 provides to the decoder circuit 18 becomes part of the decoder trace. As shown in FIG. 10(*g*), these PTB pointer(s) also become part of any basic block traces or multi-block traces that are built from that decoder trace. These PTB pointer(s) are used to locate a trace in the basic block cache circuit 22 (or the multi-block cache circuit 34, as the case may be) in case of self modifying code (SMC) events, as described herein with respect to FIG. 10(*i*).

FIG. 10(*g*) shows the correspondences between the PTB address or pointer within the basic block cache circuit 22 and the PA within the PTB 91. Each trace within the basic block cache circuit 22 includes one or more PTB pointers and a "checked" bit 3000. Each PTB pointer potentially corresponds to a PA within the PTB table 260 of the PTB 91. The PTB pointer and its correspondence to a PA results in invalidating the corresponding trace due to the presence of SMC or cross modifying code. The PTB 91, in FIG. 10(*g*), is shown to include PANA pairs as well as a "verified" bit 3002 corresponding to each PANA pair.

In the embodiment of FIG. 10(*g*), two PTB pointers are included in each trace of the basic block cache circuit 22 and each point to or index a unique PA in the table 260. Where there is an SMC event and a match between the PTB pointer of a trace within the basic block cache circuit 22 and a PA in the table 260 is found, the corresponding trace need be and is invalidated in the basic block cache circuit 22, and its corresponding entry in the table 260 is similarly invalidated. The multi-block cache circuit 26 is similarly scrubbed.

In some embodiments of the present invention, multi-block traces held in the multi-block cache circuit 26 may contain up to four PTB pointers. Even if no single instruction spans a memory page boundary, the sequence of instructions that are represented either by a basic block trace or by a multi-block trace may span one or more page boundaries, particularly if these traces include representations of control transfers that are interior to the sequence of instructions.

The verified bit 3002 of the table 260 of the PTB 91 is used in the following manner. An entry in the table 260 is allocated and its verified bit 3002 is set. Any time there is a change to the page translations, the verified bit 3002 of all of the entries of the table 260 are cleared. When the sequencer circuit 29 sequences a trace and needs to verify an entry in the PTB 91 (or the table 260 thereof), if the entry being verified is detected as being clear, the sequencer circuit 29 resorts to the ITLB 93 to verify the virtual to physical mapping (VA/PA) and if this verification is successful, the verified bit 3002 in the PTB 91 is set—and as long as this bit remains set, there is no need to invoke the ITLB 93 to verify this entry in the PTB 91 in the future. If the verification is unsuccessful, the trace is no longer accurate and will be invalidated.

It should be noted that, in one embodiment of the present invention, the PTB 91 and particularly the table 260 thereof, is advantageously used for both SMC and trace verification. For SMC or cross modifying code, the table 260 need only hold PAs, as VAs are not needed, whereas, for trace verification, both PAs and VAs are held in the table 260. Alternatively, two tables may be employed, one for holding PAs and another for holding PANA pairs although this would require additional memory capacity.

FIG. 10(*h*) shows a flow of information through various structures of the trace unit 12. The purpose of this information flow is to verify the address translations that were used to build a trace. This information flow occurs each time a trace is sequenced to be executed next.

Decoder traces are not cached in some embodiments of the present invention. On the other hand, the processes of building basic block traces and multi-block traces, and then caching such traces for later execution enables substantial performance improvements. However, during the time interval between when a trace is decoded and built and the time that the trace is executed the memory controller may have altered the mappings between VAs and PAs. Traces are generally addressed, specified, and sequenced according to VAs, but the instructions that are represented in a trace are generally accessed by PAs. A particular cached trace, or a particular trace that is in flight to be executed, is invalid if the VA to PA mappings that were used when the trace was built to access the instructions that are represented by the trace have changed.

When the sequencer circuit 29 selects a trace as the next one to be executed, it sends request 9920 to the basic block cache circuit 22. Request 9920 includes the VA of the first instruction represented by that trace. The basic block cache circuit 22 replies with response 9921, which indicates either a cache miss, that is, that the basic block cache circuit 22 does not contain a trace with that starting address, or a cache hit, that is, that the basic block cache circuit 22 has a trace with that starting address. In the case of a cache hit, response 9921 also includes all of the PTB pointers that represent the PANA pairs that were used to build that trace and further includes the checked bit 3000. If the checked bit 3000 is not set, then the sequencer circuit 29 sends request 9922 to the PTB 91. Request 9922 includes all of the PTB pointers that are held in that particular trace as cached. The PTB 91 responds to the request 9922 by providing response 9927, which indicates either that none of the page translations used in building that particular trace have changed, or that one or more of those translations have changed and the trace must be invalidated.

However, the PTB 91 may or may not hold the information confirming all PANA. In some embodiments of the invention and/or under operating conditions, the PTB 91 may need to send request 9923 to the ITLB 93. Request 9923 contains all PA/VA that the PTB is unable to confirm are still valid. Response 9926 from the ITLB 93 includes this validity information.

Similarly in some embodiments of the invention and/or under operating conditions, the ITLB 93 may need to send request 9924 to the TW 95. Request 9924 contains all PA/VA pairs that the ITLB 93 is unable to verify. The TW 95 responds to the request 9924 by providing response 9925, which indicates either that none of the page translations used in building that particular trace have changed, or that one or more of those translations have changed and the trace must be invalidated.

A similar trace verification process applies when the sequencer circuit 29 sequences for execution of a next multi-block trace held in the multi-block cache circuit 26. In some embodiments of the present invention, multi-block traces can contain up to 4 PTB pointers, whereas basic block traces held in the basic block cache 22 can only contain up to 2 PTB pointers. This difference is advantageous because multi-block traces tend to represent more instructions than basic block traces. Further, multi-block traces often contain representations of control transfers that may cross the boundaries of the PANA memory pages.

The use of the verified bit 3002 in the table 260 eliminates the need for request 9923 and the use of the checked bit 3000 in the basic block cache circuit 22 eliminates the need for response 9927.

FIG. 10(*i*) shows a flow chart of steps 121 performed, by the sequencer circuit 29, during a snooping event, which may or may not result in scrubbing. A snooping event refers to checking for any self-modifying or cross-modifying code, which results from instructions used to modify other instructions. In FIG. 10(*i*), the lookup step 123 is performed when a snooping event occurs and the PA is used to find a match thereof in the table 260 of the PTB 91. If, at 125, a match is detected, the presence of SMC or cross modifying code is noted and the process continues to step 129. If no match is found at 125, the snooping event is terminated at step 127. SMC or cross modifying code, are instructions that modify other instructions of the code. Checking for SMC is done during a snooping event to the cache circuits.

At step 129, the entry in the table 260 of the PTB 91 that corresponds to the found PA is invalidated. Next, an index or pointer, i.e. PTB pointer, corresponding to the found PA is used to "scrub" the basic block cache circuit 22 at step 129 and to "scrub" the multi-block cache circuit 26 and the process ends at 133. "Scrubbing" of the cache circuits refers to the process of scanning the cache circuits to compare the PTB pointer provided by step 123 with the PTB pointer included in each trace within the cache circuits. If a match is detected, the corresponding trace is invalidated. Furthermore, all copies of the corresponding trace, as they may exist in other structures of the trace unit 12, are also invalidated by the sequencer circuit 29.

Referring now to FIG. 11, exemplary contents of either of the basic block cache circuit 22 or the multi block cache circuit 26 is shown, in accordance with an embodiment of the present invention. Basic block cache circuit 22 or multi block cache circuit 26 are each configured to store four components. Exemplary contents of the basic block cache circuit 22 or multi block cache circuit 26 include: auxiliary info component 1001, execution history info component 1002, coherency info component 1003, and the operations component 1004.

In an embodiment of the present invention, each of the components 1001-1004 is located on a separate volatile memory device, such as a static random access memory (SRAM). Physical separation of the four components 1001-1004 minimizes the amount of cross-talk and interference in the cache circuits 22 or 26 and allows simultaneous access of any or all of the components 1001-1004. With each component being in a separate volatile memory, the component has dedicated input and output paths, which are independent of the other components' respective paths. These paths provide read/write access to various other circuits of the processor core 10, and by separating each component, it is easier to control which component may have read/write ability at any given time. Separation also allows for four different externally-located circuits accessing the components, to each access a component in parallel, without interfering with reading or writing into other components.

Alternatively, the components 1001-1004 are all a part of the same volatile memory, in which case the latter is preferably a multi-ported memory device allowing simultaneous access of the different components 1001-1004. Yet alternatively, any number of volatile memory devices is use to store the components 1001-1004.

Input path 1010 is used by the sequencer circuit 29, to write to the auxiliary information component 1001, when the sequencer circuit 29 needs to invalidate a trace. Input path 1012 is used by the sequencer circuit 29, to write to auxiliary information component 1001, when the sequencer circuit 29 updates the indirect branch trace addresses. Input path 1014 is used by the sequencer circuit 29, to write to execution history information component 1002, when the sequencer circuit 29 updates the bias of a trace. Input path 1016 is further used by the basic block builder circuit 20, or the multi block builder circuit 34, when a trace has been build and needs to be stored within the basic block cache circuit 22 or the multi block cache circuit 26.

The basic block builder circuit 20 optionally initializes the execution history information component 1002. For example, bias is set by the basic block builder circuit 20 during initialization.

Bias, as previously discussed, is a count of the number of times a branch has been consistently taken the same way and is variably alterable. During initialization, an initial promotion threshold is set to a value that is generally higher than that which might be set later during normal operation. This is because the first time a trace is built and stored in the cache circuit, a higher promotion threshold results in sequencing more traces and later, as traces are sequenced, the promotion threshold is potentially lowered to reduce the number of mis-predictions. Bias is generally stored in the execution history information component 1002 of the cache circuit.

Promotion threshold is set in accordance with the conditions of the environment in which the processor core 10 operates, as previously discussed. Under normal operations, based on currently-observed characteristics of the processor core 10, the promotion threshold is set. Another factor used to set bias is heuristics, such as rate of false predictions (or mis-predictions) of interior control transfers. Interior control transfers are essentially assertion upon which operations are built, or assertion operations. An assertion operation is used by the sequencer circuit 29 and the branch predictor circuit 30 to indicate the direction the prediction should have gone. The execution unit 14 verifies the accuracy of the prediction. More specifically, the branch predictor circuit 30 makes a prediction, the assertion operation indicates the direction of the prediction and the execution unit 14 checks the accuracy of the prediction to determine that the trace correctly committed, or not, and if not, the trace is invalidated.

Output path 1020 is used by the trace unit 12, to access auxiliary information component 1001, execution history information component 1002, and coherency information component 1003, when a trace is sequenced. Output path 1022 is used by the PTB 91, which snoops (listens to) the path during a self modifying code (SMC) snoop event. Output path 1024 is used by the ops fetcher circuit 28 when a trace is to be fetched from a corresponding cache circuit.

Referring now to FIG. 12, a basic block cache entry 1030 is shown as further exemplary details of the contents of the basic block cache circuit 22, in accordance with an embodiment of the present invention. Auxiliary information component 1001 is used to store a wide variety of information and flags standard to cache, regarding the sequences of operations stored within. Cache tag 1031 references addresses of the trace entry, to assist in locating information. Valid bit 1032 is used to indicate that a trace within the cache has become invalid. Rather than modify the entire contents of the cache at the trace's address, the corresponding valid bit value is instead modified to indicate that a trace is no longer valid. Trace verification info 1033 identifies what instruction mode was applied at decode time—i.e. 16-, 32-, or 64-bit. Sequencing information 1034 is shown to include sequencing action 1035, a target address (TA) 1036 and a sequential address (SA) 1037. The TA 1036 and SA 1037 are each either an address or a pointer to an address (or sequencing pointer) or an offset of an address pointer. In the case where SA/TA are a pointers, they either point to an address or are an offset used to calculate an address.

The SA is the source of the next sequential address of the trace, i.e. the address to which the sequencing action is taking the flow of operations if a branch is not taken, and the TA is the target address of the trace, i.e. the address to which the sequencing action is taking the flow of operations if the branch is taken.

Sequencing action 1035 is generated by the decoder circuit 18 during decode time and is based on the control transfer (or control transfer instruction) within the sequence of instructions being decoded by the decoder circuit 18. A sequence action is associated with every sequence of operations. In one embodiment of the present invention, the sequencing action 1035 can take on the following types: Sequential; Unconditional branch; Conditional branch; Indirect branch; Call relative; Call indirect; Return; or Microcode call.

Operations component 1004 includes sequences of operations in the form of operation triplets. Operation triplets (or triplets) are used to partition a sequence of operations based on the number of execution units used by the processor core 10 because multiple execution units result in substantially parallel processing of the triplets. When using triplets, there are three execution units, one for each 'oplet'. Partitioning the sequence of operations into triplet results in efficient execution of the operations. In an embodiment of the present invention, the execution unit 14 is three execution units, thus, a sequence of operations is partitioned into corresponding groups of three. Where a different number of execution units is employed, the number of 'oplets' varies accordingly.

The sequences of operations within the operations component 1004 are provided to the execution unit 14 for execution thereof. Accordingly, in one embodiment of the present invention, a trace, as used herein, which includes information other than operations, is not, in its entirety, provided to the execution unit 14.

In FIG. 12, an operation triplet 1038 is shown as the cached sequence of operations, which is a part of the operations component 1040 of the cache entry 1030 of FIG. 12. The triplet 1038 is shown to include operations 1039-1041 and overhead bytes 1042 that are associated with the operations 1039-1041. Generally, operations of a triplet are grouped in a manner as to take advantage of their grouping during execution time. An example of this is where each triplet of a sequence of operations includes operations to be executed by an execution unit, in parallel, while executing another triplet of the sequence of operations using another execution unit.

Overhead bytes 1042 include additional information and flags, encoded in an optimized form, regarding the corresponding triplet, such as the operations 1039-1041. An example of such information is "immediates" of the x86 instruction set, a way of storing constants for nearby operations. Thus, the overhead bytes 1042 provide access to various information used collectively by the triplets, thereby increasing efficiency during execution time. In FIG. 12, N (N being an integer number) number of triplets are shown cached, with the Nth triplet 1050 being the last cached triplet.

Coherency/SMC info component 1003 is used for trace verification to guard against SMC or cross modifying code in the manner described relative to previous figures and assists in identifying the location of various copies of a trace within the trace unit 12, such as in all cache circuits, when any copies of that trace have been modified through an SMC event. The coherency/SMC info component 1003 is used to invalidate all such copies.

Execution history component 1002 includes information regarding promotion of the basic block or multi-block traces, within the operations component 1004. The information in the execution history component is updated each time the sequencer sequences a trace, and predicts what sequence of operations should follow. Each time that a branch is predicted to go in the same direction as it did prior, the bias is incremented. For a basic block trace in basic block cache circuit 22, this will eventually result in the multi block builder circuit 34 combining the basic block with the basic block that has consistently followed it, after a promotion threshold is reached. For a multi block trace located within a multi block cache circuit 26, consistent and identical branching results in a new multi block trace being built the prior-existing multi block trace is combined with either a multi block or basic block trace that has consistently led, or followed, for the threshold number of times.

A basic block trace comprises the trace verification information 1033, the sequencing information 1034, the execution history information component 1002, the coherency/SMC information component 1003 and the sequence of operations 1038 or an N number of sequence of operations.

The trace verification information 1033 is used to verify a trace. The basic block and multi-block cache circuits each store optimized operations based on the decoding of x86 instructions. The current state of the processor core 10 affects how the x86 instructions are decoded. For this reason, the operations in each cache circuit have an implicit set of assumptions. These assumptions must be verified whenever the trace unit 12 requires use of a trace from either of the cache circuits. This is the process referred to as "trace verification".

FIG. 13 shows a multi-block cache entry 1100, in accordance with an embodiment of the present invention. The entry 1100 is shown to include an auxiliary information component 1102, an execution history information component 1104, a coherency/SMC information component 1106 and an operations component 1108. The components 1104-1108 are similar to the components 1002, 1003 and 1004, respectively.

The component 1102 is shown to include a cache tag 1110, a valid bit 1112, trace verification information 1114, internal branch directions 1116, internal call/return information 1118 and sequencing information 1120. The cache tag 1110, valid bit 1112, trace verification information 1114 and the sequencing information 1120 are similar to the cache tag 1031, the valid bit 1032, the trace verification information 1033 and the sequencing information 1034, respectively. The internal branch directions 1116 and the internal call/return information 1118 are collectively based on the control transfers within the instructions used to build the multi-block trace. There is typically more than one control transfer represented in a multi-block trace, a control transfer that does not cause the multi-block trace to end is referred to as an "interior control transfer" and a control transfer that causes the control transfer to end is referred to as a "final control transfer". The final control transfer is represented in the sequencing action.

A multi-block trace comprises the trace verification information 1112, the internal branch directions 1116, the internal call/return information 1118, the sequencing information 1120, the execution history information component 1104, the coherency/SMC information component 1106 and the sequence of operations or a sub-set thereof of the component 1108.

FIG. 14 shows a microcode cache entry 1200, in accordance with an embodiment of the present invention. The entry 1200 is a part of the microcode cache circuit 24, shown in prior figures. The entry 1200 is shown to include an auxiliary information component 1202 and an operations component 1204. The auxiliary information component 1202 is shown to include a cache tag 1206, a valid bit 1208, a fault handling information 1210 and a sequencing information 1212.

The auxiliary information component 1202 is similar to that of the basic block and multi-block cache circuits except for the fault handling information 1210, which is used when an exception is detected during execution of an operation and the operation is aborted and execution is re-directed to the microcode fault handler, as dictated by the fault handler 1210. The address of the fault handler is either the address of a default fault handler or the address of an alternate fault handler.

The operations component 1204 is similar to that of the basic block and multi-block cache circuits.

While the trace unit 12 of FIG. 3 is shown to be coupled to one execution unit, such as the execution unit 14, various structures thereof or the entire trace unit 12 may be shared among more than one execution unit. Alternatively, more than one processor core may be employed in a processor. Such various configurations are now shown and discussed relative to FIGS. 15-18. It should be noted however, that other similar configurations, while not shown or discussed, are anticipated.

Sharing a trace unit advantageously reduces circuitry or real estate, and therefore reduces costs; but may however, adversely affect performance, as the trace unit is busier and might have to interleave various functions, such as sequencing.

FIG. 15 shows a processor 1300 having multiple processor cores, in accordance with an embodiment of the present invention. In FIG. 15, the processor 1300 is shown to include an N number of processor cores (processor cores 1 to N). Processor core 1302, also shown labeled as processor core #1, is shown to include a trace unit 1312 in communication with an execution unit 1314 for transferring sequences of operations therebetween. Processor core 1304, also shown labeled as processor core #N, is shown to include a trace unit 1318 in communication with an execution unit 1320 for transferring sequences of operations therebetween. While only two of the N processor cores are shown in FIG. 15, additional intermediary processor cores may be employed.

The processor cores 1302 and 1304 are shown coupled to the memory controller and cache circuit 1306, which is the memory controller referred to in prior discussions. The memory controller and cache circuit 1306 is shown coupled to a microprocessor system controller 1310, which controls system operations of the processor 1300. The microprocessor system controller 1310 is also coupled to the processor cores 1302 and 1304. An input/output controller 1308 is shown coupled to the microprocessor system controller 1310 for interfacing therewith to provide input to and output from the processor 1300. In the embodiment of FIG. 15, each of the execution units of a processor core communicate with a dedicated trace unit.

FIG. 16 shows a processor 1400 sharing a trace unit 1406 among execution units 1404, 1408, in accordance with another embodiment of the present invention. In FIG. 16, the processor 1400 is shown to include a core pair complex 1402 coupled to the memory controller and cache circuit 1306 and the microprocessor controller 1310, which is shown, coupled to the input/output controller 1308. The core pair complex 1402 is shown to include an execution unit 1404 and an execution unit 1408 that share a common trace unit 1406. The trace unit 1406 provides operations 1410 to execution unit 1404 and operations 1412 to execution unit 1408. The processor embodiment of FIG. 16 is configured to share the trace unit 1406, in its entirety, between the execution units 1404 and 1408. Alternatively, portions of the trace unit may be shared by the execution units. It is understood that while only two execution units are shown in FIG. 16, any number of execution units may share the trace unit 1406.

FIG. 17 shows a processor 1448 having a trace unit that is shared, only in part, with multiple execution units, in accordance with yet another embodiment of the present invention. In FIG. 17, a core pair complex (or trace unit) 1449 is shown to include a trace sub-unit core 1450 and a trace sub-unit core 1454, which share a common trace sub-unit 1452. The trace sub-unit core 1450, the trace sub-unit core 1454, and the common trace sub-unit 1452 collectively comprise a trace unit. The trace sub-unit core 1450 is shown to provide operations to the execution unit 1404 and the trace sub-unit core 1454 is shown to provide operations to the execution unit 1408. An example of the common trace sub-unit 1452 is one that includes an instruction cache circuit, a decoder circuit, a basic block builder circuit and a microcode cache. Another example of a common trace sub-unit 1452 includes a basic block builder, a basic block cache circuit, a decoder circuit, a multi-block builder or a multi-block cache circuit, a microcode cache circuit, or any combination thereof. The circuitry not shared, such as instruction cache circuits would need to be duplicated and in this manner a part of the trace sub-unit cores 1450 and 1454.

It is understood that while only two execution units are shown in FIG. 17, any number of execution units may share the trace unit 1449.

An example of sharing parts of a trace unit among multiple execution units is shown in greater detail in FIG. 18. FIG. 18 shows a trace sub-unit core 1502 and a trace sub-unit core 1504 that are collectively a part of the same trace unit and a common trace sub-unit 1500, in accordance with an embodiment of the present invention. In FIG. 18, the common (or shared) trace sub-unit 1500 is shown to include a shared instruction cache circuit 1562, a shared decoder circuit 1560, a shared basic block builder circuit 1506, a shared microcode cache circuit 1508 and a shared multi-block builder 1510, all of which are shown shared by two execution units, i.e. execution unit #1 and execution unit #2.

The trace sub-unit core 1502 is shown to include a multi-block cache circuit 1570, a basic block cache circuit 1512, a sequencer and branch predictor circuit 1516, a sequencing buffer 1520, and an operations fetcher circuit 1524.

The cache circuit 1512 is shown to provide basic block traces 1576 to the sequencer and branch predictor circuit 1516. The multi-block cache 1570 is shown to provide multi-block traces 1534 to the sequencer and branch predictor circuit 1516. The sequencer and branch predictor circuit 1516 receives microcode traces 1528 from the shared (or common) microcode cache circuit 1508, as does the operations fetcher circuit 1524. The sequencer and branch predictor circuit 1516 receives decoder traces 1532 from the shared decoder circuit 1560. The sequencer and branch predictor circuit 1516, after sequencing of a trace, provides the trace address 1542 to the sequencing buffer 1520, which then provides the trace address 1544 to the operations fetcher circuit 1524. The operations fetcher circuit 1524 provides operations to the shared multi-block builder circuit 1510, which in the embodiment of FIG. 18 has the task of building multi-block traces for two execution units. Newly built multi-block traces generated by the multi-block builder 1510 are provided to corresponding multi-block cache circuits 1570 and 1572.

The trace sub-unit core 1504 is shown to include a multi-block cache circuit 1572, a basic block cache circuit 1514, a sequencer and branch predictor circuit 1518, a sequencing buffer 1522, and an operations fetcher circuit 1526.

The cache circuit 1514 is shown to provide basic block traces 1538 to the sequencer and branch predictor circuit 1518. The multi-block cache circuit 1572 is shown to provide multi-block traces 1536 to the sequencer and branch predictor circuit 1518. The sequencer and branch predictor circuit 1518 receives microcode traces 1530 from the shared (or common) microcode cache circuit 1508, as does the operations fetcher circuit 1526. The sequencer and branch predictor circuit 1518 receives decoder traces 1533 from the shared decoder circuit 1560. The sequencer and branch predictor circuit 1518, after sequencing of a trace, provides the trace address 1540 to the sequencing buffer 1522, which then provides the trace address 1546 to the operations fetcher circuit 1526. The operations fetcher circuit 1526 provides operations to the shared multi-block builder circuit 1510.

The decoder circuit 1560 decodes sequences of instructions for both execution units and the instruction cache circuit 1562 is used to cache instructions for both execution units. In FIG. 18, the basic block builder circuit 1506 and the multi-block builder circuit 1510 are shown to be shared by multiple execution units. It is understood that many combinations of sharing various functions and/or circuits by multiple execution units is readily achieved using the teachings of the various embodiments of the present invention.

The sequencing and branch predictor 1516 and the sequencing and branch predictor circuit 1526 are each a combination of the sequencer circuit 29 and the branch predictor circuit 30.

In alternative embodiments, the multi-block cache circuit or basic block cache circuit are shared by multiple execution units.

FIG. 19 shows an example of sequence of instructions 1700, or x86 instruction code, decoded into a decoder trace 1702 from which a basic block trace 1704 is built. As shown, the basic block trace 1704 is optimized and includes fewer operations than the decoder trace 1702. More specifically, in the example of FIG. 19, the number of operations to be executed is reduced from 12 to 9.

Each triplet includes three operations in the trace 1702 and the trace 1704. For example, the triplet 1038 includes the operations 1039, 1040 and 1041. The triplet 1038 is the decoded operations for the instruction "push ebp" in the instructions 1700. Each operation of a triplet is denoted by a letter, such as A, B or C. In one embodiment of the present invention, a single instruction is translated up to a multiple number of operation triplets, such as four operation triplets. Any instruction requiring more than four operation triplets is considered a microcode type of instruction. An exemplary basic block trace includes up to 8 triplets and an exemplary multi-block trace includes up to 16 triplets.

In an alternative embodiment, a software basic block, readily known to those in the industry, becomes multiple basic block traces that are situated adjacent to each other.

A number of key performance, power, and circuit area advantages of the trace unit 12 according to the present invention arise from the trace unit building and caching basic block traces, multi-block traces, or both. During the process of building traces, the sequence of operations of the trace is optionally and advantageously optimized.

Appendix A describes how to determine the highest priority abort trigger in an atomic trace.

Appendix B describes exception and abortion handling of atomic traces in an execution unit.

A wide variety of such optimizations may be employed in various embodiments of the present invention. Some of these are described in Appendix C. Other optimizations, having to do with the renaming of physical registers by the execution unit 14, are described in this appendix. In particular, the fact that registers renaming occurs at execution time enables the basic block builder circuit and the multi-block builder circuit to optimize the sequence of operations of a trace in certain ways. These optimizations are described in Appendix C.

Appendix D describes a processor with optimized operation sequences for basic block and multi-block trace caches.

Appendix E describes a processor with basic block and multi-block trace caches.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An instruction processing circuit for a processor, where the instruction processing circuit is adapted to provide one or more sequence of operations, based on one or more sequence of instructions, to an execution circuit of the processor, where the instruction processing circuit comprises:

a decoder circuit operable to receive at least one sequence of instructions and to decode the at least one sequence of instructions into a sequence of operations of a first type;

a basic block builder circuit operable to receive a portion of the sequence of operations of the first type and to generate therefrom a sequence of operations of a second type;

a multi-block builder circuit separate from the basic block builder circuit and operable to receive a portion of the sequence of operations of the second type and to generate therefrom a sequence of operations of a third type;

a branch predictor circuit operable to generate a branch operation prediction from the sequence of operations of the first type, the sequence of operations of the second type, and the sequence of operations of the third type, wherein the branch predictor circuit comprises a first predictor circuit corresponding to branch operations of a first type and a second predictor circuit corresponding to branch operations of a second type; and a sequencer circuit operable to select a next sequence of operations from among the sequence of operations of the first type, the sequence of operations of the second type, the sequence of operations of the third type, and the branch operation prediction for providing to the execution circuit, wherein the sequencer circuit is operable, in a first environment, to cause the first predictor circuit to generate a prediction of the branch operations of the first type concurrently with the second predictor circuit generating a prediction of the branch operations of the second type, wherein the sequencer circuit is operable, in a second environment, to cause the first predictor circuit to generate the prediction of the branch operations of the first type sequentially with the second predictor circuit generating the prediction of the branch operations of the second type.

2. An instruction processing circuit for a processor, where the instruction processing circuit is adapted to provide at least one sequence of operations to an execution circuit of the processor, where the instruction processing circuit receives a sequence of instructions and, based thereon, generates a sequence of operations, and where the instruction processing circuit comprises:

decoder means for receiving at least one sequence of instructions and for decoding the at least one sequence of instructions into a decoder sequence of operations;

first builder means for receiving at least a portion of the decoder sequence of operations and for building therefrom a basic block sequence of operations;

second builder means, separate from the first builder means, for receiving at least a portion of the basic block sequence of operations and for building therefrom a multi-block sequence of operations;

branch predictor means for generating a branch operation prediction from the decoder sequence of operations, the basic block sequence of operations, and the multi-block sequence of operations, wherein the branch predictor means comprises a first predictor means corresponding to branch operations of a first type and a second predictor means corresponding to branch operations of a second type; and sequencing means for selecting a next sequence of operations from among the decoder sequence of operations, the basic block sequence of operations, the multi-block sequence of operations, and the branch operation prediction for providing to the execution circuit, wherein the sequencing means is operable, in a first environment, to cause the first predictor means to generate a prediction of the branch operations of the first type concurrently with the second predictor means generating a prediction of the branch operations of the second type, wherein the sequencer means is operable, in a second environment, to cause the first predictor means to generate the prediction of the branch operations of the first type sequentially with the second predictor means generating the prediction of the branch operations of the second type.

3. A non-transitory computer-readable medium containing a description expressed in a hardware description language which is interpreted by a computer to specify a circuit that performs a method for optimizing performance of a timing-constrained circuit, comprising:

a decoder circuit operable to receive at least one sequence of instructions and to decode the at least one sequence of instructions into a sequence of operations of a first type;

a basic block builder circuit operable to receive a portion of the sequence of operations of the first type and to generate therefrom sequence of operations of a second type;

a multi-block builder circuit, separate from the basic block builder circuit and operable to receive a portion of the sequence of operations of the second type and to generate therefrom a sequence of operations of a third type;

a branch predictor circuit operable to generate a branch operation prediction from the sequence of operations of the first type, the sequence of operations of the second type, and the sequence of operations of the third type, wherein the branch predictor circuit comprises a first predictor circuit corresponding to branch operations of a first type and a second predictor circuit corresponding to branch operations of a second type; and a sequencer circuit operable to select a next sequence of operations from among the sequence of operations of the first type, the sequence of operations of the second type, the sequence of operations of the third type, and the branch operation prediction for providing to the execution circuit, wherein the sequencer circuit is operable, in a first environment, to cause the first predictor circuit to generate a prediction of the branch operations of the first type concurrently with the second predictor circuit generating a prediction of the branch operations of the second type, wherein the sequencer circuit is operable, in a second environment, to cause the first predictor circuit to generate the prediction of the branch operations of the first type sequentially with the second predictor circuit generating the prediction of the branch operations of the second type.

4. A non-transitory computer-readable medium processing one or more sequences of operations comprises:

receiving at least one sequence of instructions;

decoding the at least one sequence of instructions into a sequence of operations of a first type;

receiving a portion of the sequence of operations of the first type and generating therefrom a sequence of operations of a second type;

receiving a portion of the sequence of operations of the second type and generating therefrom a sequence of operations of a third type;

generating, using a branch predictor circuit, a branch operation prediction from the sequence of operations of the first type, the sequence of operations of the second type, and the sequence of operations of the third type, wherein the branch predictor circuit comprises a first predictor circuit corresponding to branch operations of a first type and a second predictor circuit corresponding to branch operations of a second type; and selecting a next sequence of operations from among the sequence of operations of the first type, the sequence of operations of the second type, the sequence of operations of the third type, and the branch operation prediction for providing to the execution circuit, wherein the sequencer circuit is operable, in a first environment, to cause the first predictor circuit to generate a prediction of the branch operations of the first type concurrently with the second predictor circuit generating a prediction of the branch operations of the second type, wherein the sequencer circuit is operable, in a second environment, to cause the first predictor circuit to generate the prediction of the branch operations of the first type sequentially with the second predictor circuit generating the prediction of the branch operations of the second type.

* * * * *